(12) United States Patent
Bott

(10) Patent No.: US 10,216,549 B2
(45) Date of Patent: Feb. 26, 2019

(54) METHODS AND SYSTEMS FOR PROVIDING APPLICATION PROGRAMMING INTERFACES AND APPLICATION PROGRAMMING INTERFACE EXTENSIONS TO THIRD PARTY APPLICATIONS FOR OPTIMIZING AND MINIMIZING APPLICATION TRAFFIC

(71) Applicant: Seven Networks, LLC, Marshall, TX (US)

(72) Inventor: Ross Bott, Half Moon Bay, CA (US)

(73) Assignee: SEVEN NETWORKS, LLC, Marshall, TX (US)

( * ) Notice: Subject to any disclaimer, the term of this patent is extended or adjusted under 35 U.S.C. 154(b) by 0 days.

(21) Appl. No.: 14/474,248

(22) Filed: Sep. 1, 2014

(65) Prior Publication Data

US 2015/0363244 A1    Dec. 17, 2015

Related U.S. Application Data

(63) Continuation of application No. PCT/US2014/042791, filed on Jun. 17, 2014.
(Continued)

(51) Int. Cl.
*G06F 3/00* (2006.01)
*G06F 9/44* (2006.01)
(Continued)

(52) U.S. Cl.
CPC .......... *G06F 9/541* (2013.01); *H04L 47/2475* (2013.01); *H04L 47/28* (2013.01); *H04L 69/04* (2013.01); *H04L 69/162* (2013.01); *H04L 69/329* (2013.01); *H04W 4/18* (2013.01); *H04W 28/02* (2013.01); *H04W 28/06* (2013.01)

(58) Field of Classification Search
None
See application file for complete search history.

(56) References Cited

U.S. PATENT DOCUMENTS 6,118,771 A    9/2000  Tajika et al.
6,408,007 B1   6/2002  Park
(Continued)

FOREIGN PATENT DOCUMENTS

EP    1771033 A2    4/2007

OTHER PUBLICATIONS

ISR for International Application No. PCT/US2014/042017 filed Jun. 11, 2014.
(Continued)

*Primary Examiner* — Tuan C Dao
*Assistant Examiner* — William C Wood
(74) *Attorney, Agent, or Firm* — NK Patent Law

(57) ABSTRACT

Methods and systems for providing APIs and API extensions to third party applications for optimizing and minimizing application traffic are provided. According to one aspect, a method for optimizing and minimizing application traffic in a wireless network includes defining an application programming interface (API) for controlling application traffic between an application client residing on a mobile device that operates within a wireless network and an application server not residing on the mobile device and using the API to optimize application traffic in the wireless network.

26 Claims, 34 Drawing Sheets

Related U.S. Application Data

(60) Provisional application No. 61/836,112, filed on Jun. 17, 2013.

(51) Int. Cl.
*G06F 9/46* (2006.01)
*G06F 13/00* (2006.01)
*G06F 9/54* (2006.01)
*H04L 29/06* (2006.01)
*H04W 28/02* (2009.01)
*H04W 4/18* (2009.01)
*H04L 12/859* (2013.01)
*H04L 12/841* (2013.01)
*H04L 29/08* (2006.01)
*H04W 28/06* (2009.01)

(56) References Cited

U.S. PATENT DOCUMENTS

| | | | |
|---|---|---|---|
| 7,260,115 | B1 | 8/2007 | DeFord |
| 7,391,769 | B2 | 6/2008 | Rajkumar et al. |
| 7,688,857 | B2 | 3/2010 | Jang et al. |
| 7,697,457 | B2 | 4/2010 | Igarashi et al. |
| 7,721,337 | B2 | 5/2010 | Syed |
| 7,945,688 | B1* | 5/2011 | Lango et al. ............... 709/231 |
| 7,974,250 | B2 | 7/2011 | Jang et al. |
| 8,060,154 | B1 | 11/2011 | Bali et al. |
| 8,160,000 | B2 | 4/2012 | Balasubramanian |
| 8,332,500 | B1 | 12/2012 | Singleton et al. |
| 8,351,997 | B2 | 1/2013 | Liu et al. |
| 8,385,242 | B2 | 2/2013 | Huoviala et al. |
| 8,441,965 | B2 | 5/2013 | Jazra |
| 8,509,193 | B2 | 8/2013 | Hassan et al. |
| 8,750,207 | B2 | 6/2014 | Jeong et al. |
| 8,831,658 | B2 | 9/2014 | Meylan et al. |
| 8,838,086 | B2 | 9/2014 | Giaretta et al. |
| 8,904,206 | B2 | 12/2014 | Black et al. |
| 9,118,575 | B2 | 8/2015 | Granlund et al. |
| 9,178,965 | B2 | 11/2015 | Kondratiev |
| 2001/0036822 | A1 | 11/2001 | Mead et al. |
| 2002/0075844 | A1* | 6/2002 | Hagen ............... H04L 63/0442 370/351 |
| 2002/0107042 | A1 | 8/2002 | Murnaghan et al. |
| 2003/0009571 | A1 | 1/2003 | Bavadekar |
| 2003/0046433 | A1 | 3/2003 | Luzzatti et al. |
| 2003/0055555 | A1 | 3/2003 | Knockeart et al. |
| 2003/0152052 | A1 | 8/2003 | Kekki et al. |
| 2003/0172112 | A1 | 9/2003 | Vignaud |
| 2004/0111518 | A1 | 6/2004 | Schuyler |
| 2004/0125800 | A1 | 7/2004 | Zellner |
| 2004/0192312 | A1 | 9/2004 | Li et al. |
| 2004/0264396 | A1 | 12/2004 | Ginzburg et al. |
| 2005/0198511 | A1* | 9/2005 | Tomkow ............... H04L 51/30 713/176 |
| 2005/0221871 | A1 | 10/2005 | Kim |
| 2006/0149845 | A1 | 7/2006 | Malin et al. |
| 2006/0179147 | A1 | 8/2006 | Tran et al. |
| 2006/0195547 | A1 | 8/2006 | Sundarrajan et al. |
| 2006/0195840 | A1 | 8/2006 | Sundarrajan et al. |
| 2006/0240805 | A1 | 10/2006 | Backholm et al. |
| 2006/0259661 | A1 | 11/2006 | Feng et al. |
| 2006/0294388 | A1 | 12/2006 | Abraham et al. |
| 2007/0019717 | A1* | 1/2007 | Laroia ............... H04L 1/0004 375/222 |
| 2007/0021065 | A1 | 1/2007 | Sengupta et al. |
| 2007/0171921 | A1 | 7/2007 | Wookey et al. |
| 2007/0198634 | A1 | 8/2007 | Knowles et al. |
| 2007/0202850 | A1 | 8/2007 | Pantalone et al. |
| 2007/0244987 | A1 | 10/2007 | Pedersen et al. |
| 2007/0286136 | A1 | 12/2007 | Rittle et al. |
| 2008/0008165 | A1 | 1/2008 | Ikeda et al. |
| 2008/0045253 | A1 | 2/2008 | Mousseau et al. |
| 2008/0140794 | A1 | 6/2008 | Rybak |
| 2008/0148291 | A1 | 6/2008 | Huang et al. |
| 2008/0170852 | A1 | 7/2008 | Santoro et al. |
| 2008/0181213 | A1 | 7/2008 | Ovsiannikov et al. |
| 2008/0305839 | A1 | 12/2008 | Karaoguz et al. |
| 2009/0049482 | A1 | 2/2009 | Auerbach et al. |
| 2009/0172657 | A1* | 7/2009 | Makelainen et al. ......... 717/174 |
| 2009/0198766 | A1 | 8/2009 | Chen et al. |
| 2009/0232001 | A1 | 9/2009 | Gong et al. |
| 2009/0275320 | A1 | 11/2009 | Marshall |
| 2010/0083255 | A1 | 4/2010 | Bane et al. |
| 2010/0174939 | A1 | 7/2010 | Vexler |
| 2010/0180082 | A1 | 7/2010 | Sebastian et al. |
| 2010/0217965 | A1 | 8/2010 | Wolff |
| 2010/0250701 | A1 | 9/2010 | Harvell et al. |
| 2010/0293286 | A1 | 11/2010 | Nikkilä et al. |
| 2010/0312899 | A1 | 12/2010 | Herzog et al. |
| 2011/0047413 | A1 | 2/2011 | McGill et al. |
| 2011/0119478 | A1 | 5/2011 | Jackson |
| 2011/0153728 | A1 | 6/2011 | Einarsson et al. |
| 2011/0177847 | A1 | 7/2011 | Huang |
| 2011/0199905 | A1 | 8/2011 | Pinheiro et al. |
| 2012/0023226 | A1 | 1/2012 | Petersen et al. |
| 2012/0023236 | A1 | 1/2012 | Backholm et al. |
| 2012/0071141 | A1 | 3/2012 | Nicoara et al. |
| 2012/0135726 | A1* | 5/2012 | Luna et al. ............... 455/422.1 |
| 2012/0149352 | A1 | 6/2012 | Backholm et al. |
| 2012/0155296 | A1 | 6/2012 | Kashanian |
| 2012/0166865 | A1 | 6/2012 | Liu et al. |
| 2012/0170556 | A1 | 7/2012 | Tsfati et al. |
| 2012/0170557 | A1 | 7/2012 | Tsfati et al. |
| 2012/0173901 | A1 | 7/2012 | Soliman et al. |
| 2012/0185577 | A1 | 7/2012 | Giaretta et al. |
| 2012/0278400 | A1 | 11/2012 | Elson et al. |
| 2012/0281561 | A1 | 11/2012 | Shukla |
| 2012/0324110 | A1 | 12/2012 | Kohli |
| 2013/0017804 | A1 | 1/2013 | Jun et al. |
| 2013/0036428 | A1 | 2/2013 | Lei et al. |
| 2013/0046863 | A1* | 2/2013 | Bastian ............... H04L 47/2483 709/220 |
| 2013/0070640 | A1 | 3/2013 | Chapman |
| 2013/0078999 | A1 | 3/2013 | Martin et al. |
| 2013/0083713 | A1 | 4/2013 | Johansson et al. |
| 2013/0151649 | A1 | 6/2013 | Luna |
| 2013/0242781 | A1* | 9/2013 | Hui et al. ............... 370/252 |
| 2013/0279384 | A1 | 10/2013 | Wei |
| 2013/0316716 | A1 | 11/2013 | Tapia et al. |
| 2013/0329601 | A1* | 12/2013 | Yin ............... H04L 45/02 370/254 |
| 2013/0336179 | A1 | 12/2013 | Rubin et al. |
| 2014/0035722 | A1 | 2/2014 | Kincaid et al. |
| 2014/0237067 | A1 | 8/2014 | Todd |
| 2015/0212918 | A1 | 7/2015 | Cai |
| 2016/0212648 | A1* | 7/2016 | Xu ............... H04W 24/08 |

OTHER PUBLICATIONS

Non-Final Office Action mailed Jun. 11, 2015 for U.S. Appl. No. 13/815,921 and Notice of References Cited.
Non-Final Office Action mailed Jun. 24, 2015 for U.S. Appl. No. 14/223,689 and Notice of References Cited.
Non-Final Office Action mailed on May 29, 2015 for U.S. Appl. No. 13/115,740.
Final Office Action mailed Mar. 26, 2015 for U.S. Appl. No. 13/844,787.
Final Office Action mailed Mar. 20, 2015 for U.S. Appl. No. 13/844,704.
Final rejection mailed Aug. 20, 2015 for U.S. Appl. No. 13/758,842.
Non-Final Office Action mailed Jul. 17, 2015 for U.S. Appl. No. 13/178,598.
Non-Final Office Action mailed Jul. 16, 2015 for U.S. Appl. No. 13/758,842.
Final Office Action mailed Aug. 28, 2015 for U.S. Appl. No. 14/223,689 and Notice of References Cited.
Final Office Action mailed Aug. 20, 2015 for U.S. Appl. No. 13/758,842.
Non-Final Office Action mailed Oct. 1, 2015 for U.S. Appl. No. 13/844,787.

(56) References Cited

OTHER PUBLICATIONS

Final Office Action mailed Aug. 21, 2015 for U.S. Appl. No. 13/844,704 and Notice of References Cited.
Non-Final Office Action mailed Aug. 25, 2015 for U.S. Appl. No. 13/844,682 and Notice of References Cited.
Non-Final Rejection mailed Jul. 29, 2015 for U.S. Appl. No. 13/815,908.
Non-Final Office Action mailed Jul. 21, 2015 for U.S. Appl. No. 13/351,176.
Non-Final rejection mailed Aug. 21, 2015 for U.S. Appl. No. 13/844,704.
USPTO Final Office Action mailed Nov. 4, 2015 for U.S. Appl. No. 13/115,740.
USPTO, Final Rejection for U.S. Appl. No. 13/178,598, Jan. 4, 2016.
R. Kravets et al.: "Application-driven power management for mobile communication", Wireless Networks 6 (2000) 263-277.
USPTO, Non-Final Rejection for U.S. Appl. No. 14/223,689, Jan. 26, 2016.
USPTO, Final Rejection for U.S. Appl. No. 13/844,787, mailed on May 16, 2016.
USPTO, Non-Final Rejection for U.S. Appl. No. 13/115,740, mailed on Apr. 28, 2016.
USPTO, Non-Final Rejection for U.S. Appl. No. 14/474,324, mailed on Jul. 6, 2016.
Search result of Jun. 16, 2016, performed by the Examiner on https://iq.ip.com/discover (InnovationQ—IP.com) and attached to the Non-Final Rejection for U.S. Appl. No. 14/474,324, mailed on Jul. 6, 2016.
USPTO, Final Rejection in U.S. Appl. No. 14/474,324 dated Aug. 8, 2017.
USPTO, Non-Final Rejection in U.S. Appl. No. 15/699,717 dated Jun. 19, 2018.

\* cited by examiner

| Traffic Category/Application Category 500 ||
|---|---|
| Interactive traffic | Background traffic |
| User waiting for response | User not waiting for response |
| Application in foreground | Application in background |
| Backlight on | Backlight off |

*FIG. 5*

| Content Category 600 ||
|---|---|
| High priority | Low priority |
| Time critical | Non-time critical |

*FIG. 6*

| Mobile Application/Widget 755 | Local Proxy 765 | Host server 785 Server Cache 735 or Caching Proxy 775 | Application Server/ Content Provider 775 |
|---|---|---|---|
| Polls application server/provider 732 | Poll intercepted 734 | | |
| | Proxy detects that cache content is available for the polled content and is valid and thus retrieves a response to satisfy the poll 736 | | |
| Receives a response to the poll from a cache entry 738 | | | |
| Polls application server/provider 740 | Poll intercepted 742 | | |
| | Proxy detects that cache content is unavailable and decides to setup the polled source for caching 744 | | |
| | Poll request forwarded to the source 746 | | |
| | | | Receives the poll request from the application and provides a response to satisfy the current request 748 |
| Receives the response to satisfy the request from the application server/provider 750 | | | |
| | Tracks polling frequency of the application and sets up a polling schedule for the host server 752 | | |
| | Sends the cache setup to the host server 754 | | |
| | | Receives the cache setup including an identification of the application server/provider to be polled and a polling schedule 756 | |
| | | Polls the Application server/provider to monitor the response to the request 758 | |
| | | | Receives poll from host server and sends the response 760 |
| | | Same response received, pulls the application based on the polling schedule 762 | |
| | | | Receives poll from host server and sends the response 764 |
| | | Detects changed or new response; notifies the local proxy 766 | |
| | | Changed or new response stored in the server cache or the caching proxy 768 | |
| | Receives notification that new or changed data is available; invalidates relevant cache entries 770 | | |
| Polls application server/content provider 772 | Determines that no valid cache entry is available and retrieves the response from the server cache 774 | Receives request for the new response and sends the response to the local proxy 776 | |
| Request satisfied from the server cache or caching proxy 778 | | | |
| Polls application server/content provider 780 | Determines that no valid cache entry is available and forwards the poll to the application server/provider 782 | | |
| | | | Receives poll from and sends the response 784 |
| Request satisfied from the application server/provider 786 | | | |

*FIG. 7*

METHODS AND SYSTEMS FOR PROVIDING APPLICATION PROGRAMMING INTERFACES AND APPLICATION PROGRAMMING INTERFACE EXTENSIONS TO THIRD PARTY APPLICATIONS FOR OPTIMIZING AND MINIMIZING APPLICATION TRAFFIC

PRIORITY CLAIM

This application is a continuation of International Patent Application Serial No. PCT/US14/42791, filed Jun. 17, 2014, which claims the benefit of U.S. Provisional Patent Application Ser. No. 61/836,112, filed Jun. 17, 2013, the disclosures of each of which are incorporated herein by reference in their entireties.

TECHNICAL FIELD

This disclosure relates to signaling optimization in a wireless network. More specifically, it relates to methods and systems for providing APIs and API extensions to third party applications for optimizing and minimizing application traffic.

BACKGROUND

The constant connections and disconnections of a mobile device to services and entities within a telecommunication and/or data network increase the amount of signaling network traffic within that network, which lowers the performance of the network overall. This imposes a burden upon network operators that forces them to increase bandwidth and network access. To date, carriers have been able to invest in 4G and LTE networks to boost network capacity in hotspots. However, these solutions are reaching their limit. LTE and 4G are also showing that the perceived capacity of added bandwidth is causing users and applications to increase usage and data consumption. In the long run, it might add to the congestion problem rather than help.

Furthermore, in most cases, a mobile device may be receiving data from multiple sources (e.g., servers, websites, nodes of a network, etc.) in the service network. The router/communication network between the services and the client ensures that all services can communicate changes to the client over a single physical connection. However, a problem that may occur is that different services (without knowing of each other's actions) trigger the client to create that connection at different times, and there may be a lack of an efficient or optimal alignment of data transfer from the services to the client. Hence efficient utilization of the shared connection is lacking (or at least minimal or sub-optimal) and at times the single connection may in reality only provide an adequate or a realistic level of service for a single service or source of data.

While mobile or broadband networks may be designed for high-throughput of large amounts of data, they were not necessarily tailored to service the mobile applications that require frequent, low-throughput requests of small amounts of data. Existing networks also do not take into account different types of mobile traffic and priorities of the different types of traffic, for example, from a user experience perspective.

Such transactions put the mobile device radio in a high-power mode for a considerable length of time—typically between 15-30 seconds. As the high-power mode can consume as much as 100× the power as an idle mode, these network-initiated applications are power hungry and can quickly drain the battery. The issue has been exacerbated by the rapid increase of the popularity of applications with network-initiated functionalities, such as push email, news feeds, status updates, multimedia content sharing and other mobile applications, etc. Furthermore, the problem with constant polling is that mobile phones also rely on signaling to send and receive calls and SMS messages and sometimes these basic mobile functions are forced to take a backseat to unruly applications and other mobile clients.

Therefore, in light of these disadvantages associated with conventional interactions between applications residing on a mobile device and the network entities with which the mobile device and its applications may interact, there is a need for a more intelligent approach to this kind of traffic. More specifically, there is a need for methods and systems for providing APIs and API extensions to third party applications for optimizing and minimizing application traffic.

SUMMARY

According to one aspect, the subject matter described herein includes a method for optimizing and minimizing application traffic in a wireless network. In one embodiment, the method includes defining an application programming interface (API) for controlling application traffic between an application client residing on a mobile device that operates within a wireless network and an application server not residing on the mobile device, and using the API to optimize application traffic in the wireless network.

According to another aspect, the subject matter described herein includes a system for optimizing and minimizing application traffic in a wireless network. In one embodiment, the system includes a mobile device that operates within a wireless network. The mobile device includes an application client that interacts with an application server not residing on the mobile device, where the mobile device supports an application programming interface (API) for controlling application traffic between the application client and the application server, and where the API is used to optimize the application traffic.

According to yet another aspect, the subject matter described herein includes a computer program product for signaling optimization in a wireless network utilizing proprietary and non-proprietary protocols. The computer program product includes a non-transitory computer readable storage medium having computer readable code embodied therewith, the computer readable code configured for defining an application programming interface (API) for controlling application traffic between an application client residing on a mobile device that operates within a wireless network and an application server not residing on the mobile device, and using the API to optimize application traffic in the wireless network.

BRIEF DESCRIPTION OF THE DRAWINGS

Embodiments of the subject matter described herein will now be explained with reference to the accompanying drawings, wherein the like reference numerals represent like parts, of which:

FIG. 5 depicts a table showing examples of different traffic or application category types which can be used in implementing network access and content delivery policies by a distributed proxy and cache system for providing APIs and API extensions to third party applications for optimizing and minimizing application traffic according to an embodiment of the subject matter described herein;

FIG. 6 depicts a table showing examples of different content category types which can be used in implementing network access and content delivery policies by a distributed proxy and cache system for providing APIs and API extensions to third party applications for optimizing and minimizing application traffic according to an embodiment of the subject matter described herein;

FIG. 7 depicts an interaction diagram showing how polls having data requests from a mobile device (e.g., any wireless device) to an application server/content provider over a wireless network (or broadband network) can be can be cached on the local proxy and managed by the distributed caching system of a distributed proxy and cache system for providing APIs and API extensions to third party applications for optimizing and minimizing application traffic according to an embodiment of the subject matter described herein;

DETAILED DESCRIPTION

Figure 1A:
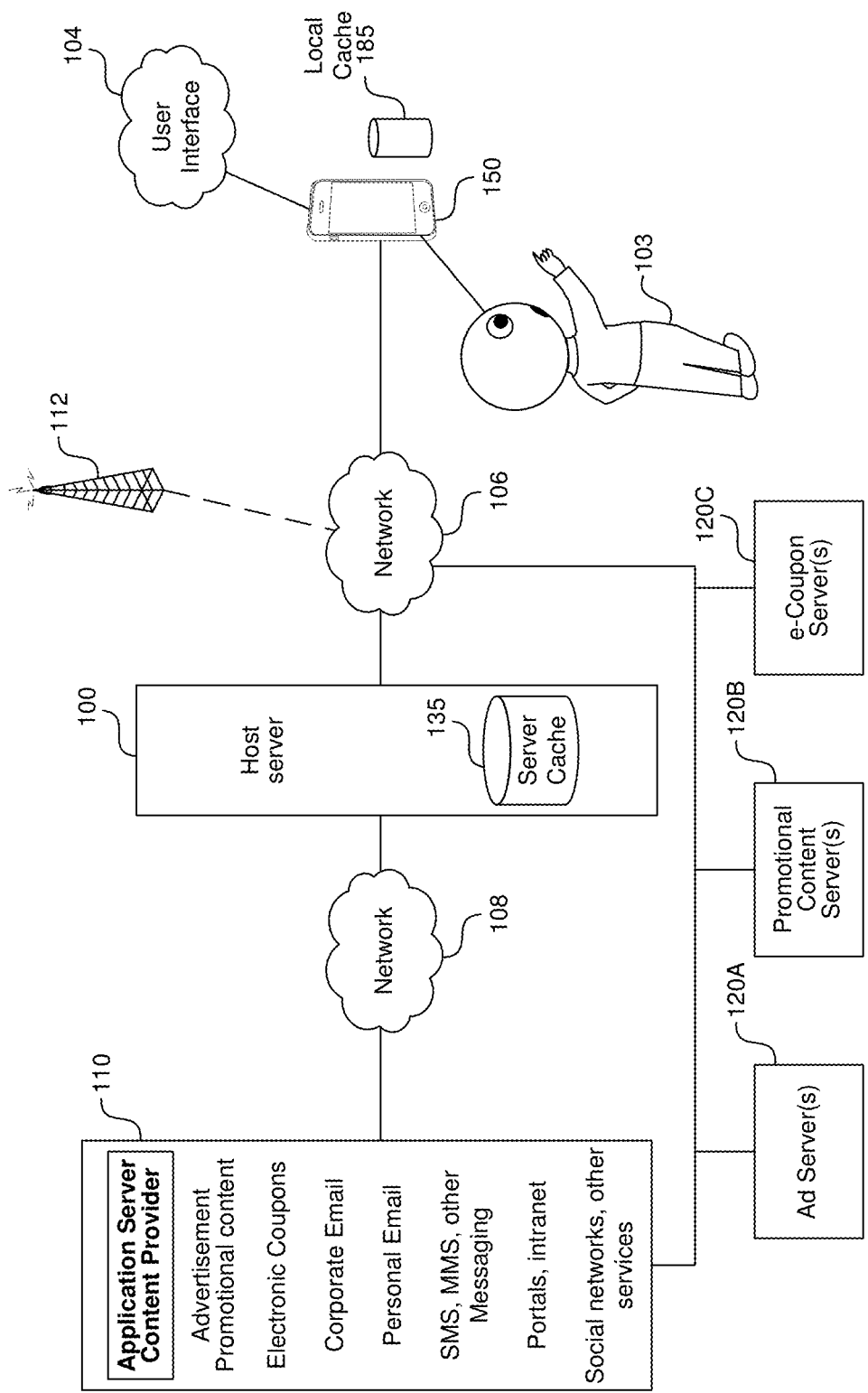
FIG. 1A illustrates an example diagram of a system for providing APIs and API extensions to third party applications for optimizing and minimizing application traffic according to an embodiment of the subject matter described herein.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

FIG. 1A illustrates an example diagram of a system for providing APIs and API extensions to third party applications for optimizing and minimizing application traffic according to an embodiment of the subject matter described herein. FIG. 1A illustrates a system in which a host server facilitates management of traffic, content caching, and/or resource conservation between mobile devices (e.g., wireless devices), an application server or content provider, or other servers such as an ad server, promotional content server, or an e-coupon server in a wireless network (or broadband network) for resource conservation. The host server can further provide APIs and API extensions to 3rd party applications for optimizing and minimizing application traffic through batching, or aligning traffic or "clumping".

In the embodiment illustrated in FIG. 1A, a host server 100 facilitates management of traffic, content caching, and/or resource conservation between mobile devices (e.g., wireless devices 150 or client devices 150), and an application server or content provider 110, or other servers such as an ad server 140A, promotional content server 140B, or an e-coupon server 140C in a wireless network (or broadband network) for resource conservation. The host server 100 can further become aware of mobile device radio states for use in selecting a suitable communications channel for sending messages generated by the host server or other control signals and facilitate using a user as an end point for profiling and optimizing the delivery of content and data in a wireless network.

The mobile/client devices 150 can be any system and/or device, and/or any combination of devices/systems that is able to establish a connection, including wired, wireless, cellular connections with another device, a server and/or other systems such as host server 100 and/or application server/content provider 110. Client/mobile devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 140A, promotional content servers 140B, and/or e-Coupon servers 140C as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and tablet), a handheld tablet (e.g., an iPad, the Galaxy series, the Nexus, the Kindles, Kindle Fires, any Android-based tablet, Windows-based tablet, Amazon-based, or any other tablet), any portable readers/reading devices, a hand held console, a hand held gaming device or console, a head mounted device, a head mounted display, a thin client or any Super Phone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 114 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation is performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management for resource conservation in networks (e.g., network 106 and/or 108) and devices 150, reside in a distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation). The proxy and cache system can be distributed between, and reside on, a given client device 150 in part or in whole and/or host server 100 in part or in whole. The distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation) are illustrated with further reference to the example diagram shown in FIG. 1C. Functions and techniques performed by the (distributed) proxy and/or cache components in the client device 150, the host server 100, and the related components therein are described, respectively, in detail with further reference to the examples of FIG. 2-5.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

With more detailed description below, and with particular reference to FIGS. 2E and 3E, one or more embodiments disclosed herein can provide application programing interfaces (APIs) and API extensions to 3rd-party applications to, for example, optimize and/or minimize application data traffic.

It is noted that, for convenience, a client (e.g., local local proxy 105, 175, 275) of the distributed caching system can be referred to herein as an "open channel client", or "OC client." Similarly, a server (e.g., host server 111, 100, 300 hosting proxy server 113, 145, 325) of the distributed traffic management, optimization, and/or caching system can be referred to herein as the host server, the proxy server, or "open channel server", or "OC server." The local proxy and the proxy server individually or together implementing the distributed traffic management, minimizing, optimization, and/or caching techniques (including the Signal Optimization and Extended Caching techniques) can be referred to as "open channel" or "OC."

In general, the present embodiments can be applicable any third-party applications in the marketplace (e.g., Apple, Google Play, Blackberry Intel Application market place). For example, the present embodiment may bring benefit in reducing data traffic for messaging applications, and as one example, utilizing the Google Cloud Messaging (GCM) for developers or other similar services.

The present disclosure includes so-called "Open Channel (OC) Push," or Push services provided by the host server or proxy server, which in the context of reducing application traffic (e.g., via the traffic shaping engine 375, FIG. 3E, and especially the alignment module 378, the batching module 377; or via the traffic shaping engine 255, FIG. 2E, and especially the alignment module 256, the batching module 257, further introduced below), includes, for example:

(1) Provide an API which is GCM-compatible, or compatible with other services which facilitates developers to send data from their servers to their mobile applications, both in terms of the API and the functionality. This can offer app developers functionality use of this without having to change (and, in some examples, not even re-test) their applications. These services, in general provide functionalities to send a message, usually lightweight, which alerts the mobile application that there is new content to be retrieved from the server, for example.

(2) Provide extensions to this API, which provide guidance to Optimization to allow better opportunities to minimize traffic.

For example, some embodiments enable receiving (e.g., via API) of a Delivery Window (e.g., a timing window) guidance for push notifications, which would allow the proxy server to clump (e.g., "align" or "batch") (e.g., via the traffic shaping engine 375, FIG. 3E, the traffic shaping engine 255, FIG. 2E) traffic up to the timing parameter limits of the delivery window.

For example, some embodiments enable receiving of foreground (FG)/background (BG) guidance for push notifications, e.g., allowing the application to provide guidance (e.g., to traffic shaping engines 255 and/or 375) to skip notification if application is in background.

Further, some embodiments provide receiving of Screen ON/Screen OFF, or device backlight guidance for push notification, allowing the app to provide guidance (e.g., to traffic shaping engines 255 and/or 375) to skip push notification if screen is OFF.

Additionally, some embodiments enable (e.g., to traffic shaping engines 255 and/or 375) a way for applications to be notified if screen is turned on and/or application goes to FG.

In some examples, the local proxy or a third party (e.g., 3rd party app) provides delivery window (e.g., timing) guidance. Note that the delivery window can be a timing window or a timing instance.

It is noted that the above-mentioned are just examples of extensions that API or API extensions of the current embodiments, and that there can be other suitable extensions as well.

(3) Provide extensions to this API to allow a premium Push service. In some embodiments, subscriber tiering and reporting functionalities can be provided in the clumping (e.g., data/traffic batching or aligning) context (e.g., as performed by traffic shaping engines 255 and/or 375).

Some embodiments can include implementations of Return receipts. Some example forms include:
i. Application is notified when the local proxy delivers the push notification to the app client.
ii. Application client gets the push notification, and has an API to confirm that it has displayed in on the screen.

Also, some embodiments can include implementations of High priority delivery. For example, the Application can specify priority (e.g., 1=Normal, 2=High, 3=Extreme). In an additional or alternative embodiment, Subscriber (or enterprise) would need to have special charging plan in place with carriers.

According to some embodiments, the host server or proxy server can also use the above to increase priority. For example, in one embodiment, API can be extended to allow special traffic reporting.

It is noted that the present disclosure can also include the specific context within which the 3rd party applications providing information (e.g., via an API and that is GCM compatible, or compatible with other similar services) occurs.

Figure 1B:
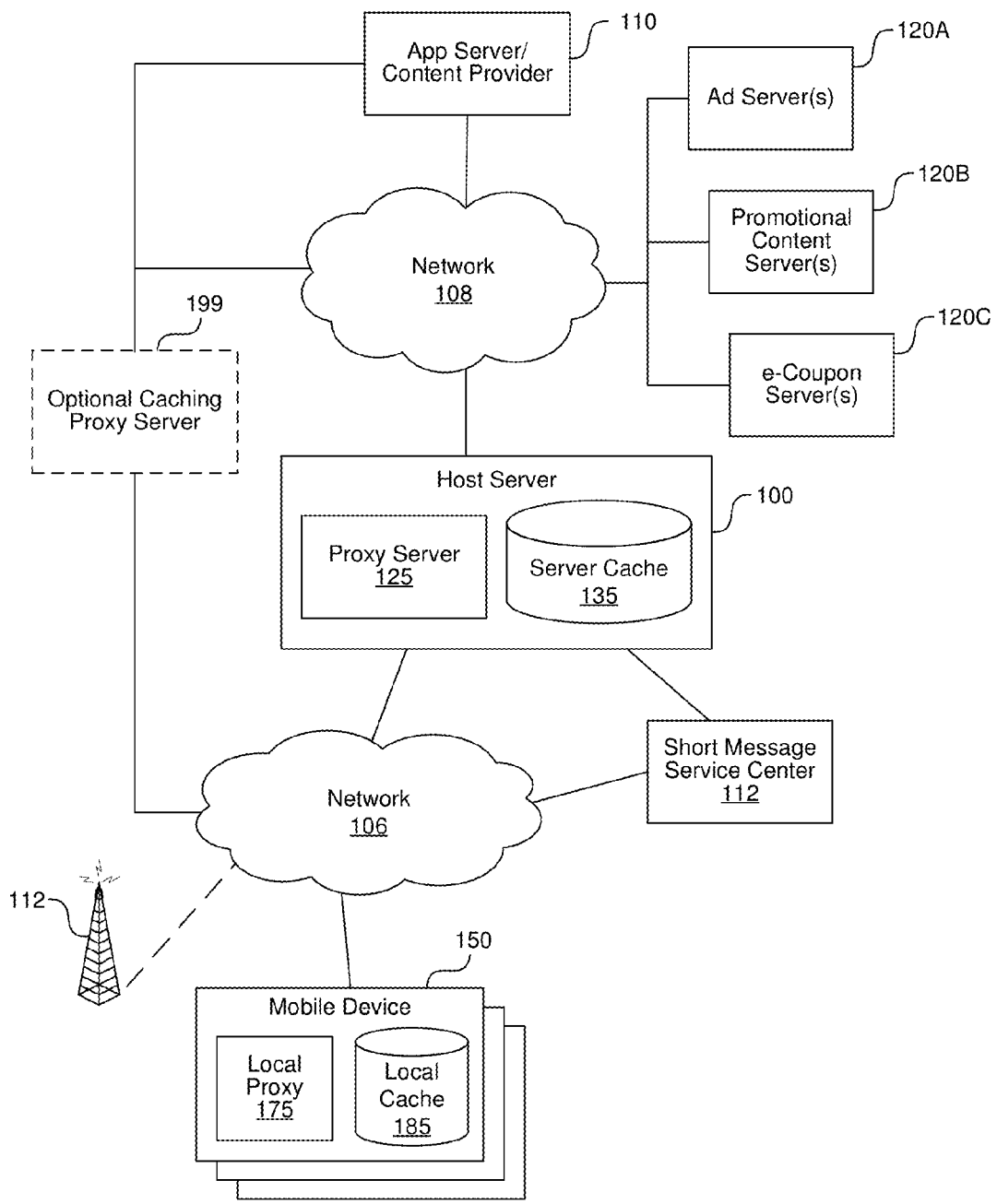
FIG. 1B illustrates an example diagram of a system for providing APIs and API extensions to third party applications for optimizing and minimizing application traffic according to an embodiment of the subject matter described herein.

FIG. 1B illustrates an example diagram of a system for providing APIs and API extensions to third party applications for optimizing and minimizing application traffic according to another embodiment of the subject matter described herein. FIG. 1B illustrates a proxy and cache system that is distributed between the host server and device which facilitates network traffic management between a device, an application server or content provider, or other servers such as an ad server, promotional content server, or an e-coupon server for resource conservation and content caching.

In the embodiment illustrated in FIG. 1B, the proxy and cache system is distributed between the host server 100 and device 150 which facilitates network traffic management between the device 150 and an application server or content provider 110, or other servers such as an ad server 140A, promotional content server 140B, or an e-coupon server 140C for resource conservation and content caching. The proxy system distributed among the host server 100 and the device 150 can further monitor mobile application activities for malicious traffic on a mobile device and/or automatically generate and/or distribute policy information regarding malicious traffic in a wireless network.

The distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation) can include, for example, the proxy server 145 (e.g., remote proxy) and the server cache, 135 components on the server side. The server-side proxy 145 and cache 135 can, as illustrated, reside internal to the host server 100. In addition, the proxy server 145 and cache 135 on the server-side can be partially or wholly external to the host server 100 and in communication via one or more of the networks 106 and 108. For example, the proxy server 145 may be external to the host server and the server cache 135 may be maintained at the host server 100. Alternatively, the proxy server 145 may be within the host server 100 while the server cache is external to the host server 100. In addition, each of the proxy server 145 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 140A, promotional content servers 140B, and/or e-Coupon servers 140C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 114, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 114. Content caching can also be entirely or partially performed by the remote proxy 145 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 145 component in the host server 100, for example, as connection metadata. The proxy server 145 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 145, when appropriate, as will be further detailed with references to the description associated with the examples of FIG. 2-5.

The local database 185 can be included in the local proxy 175 or coupled to the local proxy 175 and can be queried for a locally stored response to the data request prior to the data request being forwarded on to the proxy server 145. Locally cached responses can be used by the local proxy 175 to satisfy certain application requests of the mobile device 150, by retrieving cached content stored in the cache storage 185, when the cached content is still valid.

Similarly, the proxy server 145 of the host server 100 can also delay, expedite, or modify data from the local proxy prior to transmission to the content sources (e.g., the application server/content provider 110). In addition, the proxy server 145 uses device properties and connection metadata to generate rules for satisfying request of applications on the mobile device 150. The proxy server 145 can gather real time traffic information about requests of applications for later use in optimizing similar connections with the mobile device 150 or other mobile devices.

In general, the local proxy 175 and the proxy server 145 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 114, such as that provided by the network service provider, in communicating with the device 150 in achieving network traffic management. Note that 114 can also utilize any other type of alternative channel including USSD or other network control mechanisms. The host server 100 can forward content or HTTP responses to the SMSC 114 such that it is automatically forwarded to the device 150 if available, and for subsequent forwarding if the device 150 is not currently available.

In general, the disclosed distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation) allows optimization of network usage, for example, by serving requests from the local cache 185, the local proxy 175 reduces the number of requests that need to be satisfied over the network 106. Further, the local proxy 175 and the proxy server 145 may filter irrelevant data from the communicated data. In addition, the local proxy 175 and the proxy server 145 can also accumulate low priority data and send it in batches to avoid the protocol overhead of sending individual data fragments. The local proxy 175 and the proxy server 145 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 145 can work in conjunction to accumulate low priority data and send it in batches to reduce the number of times and/or amount of time when the radio is powered up. The local proxy 175 can synchronize the network use by performing the batched data transfer for all connections simultaneously.

Figure 1C:
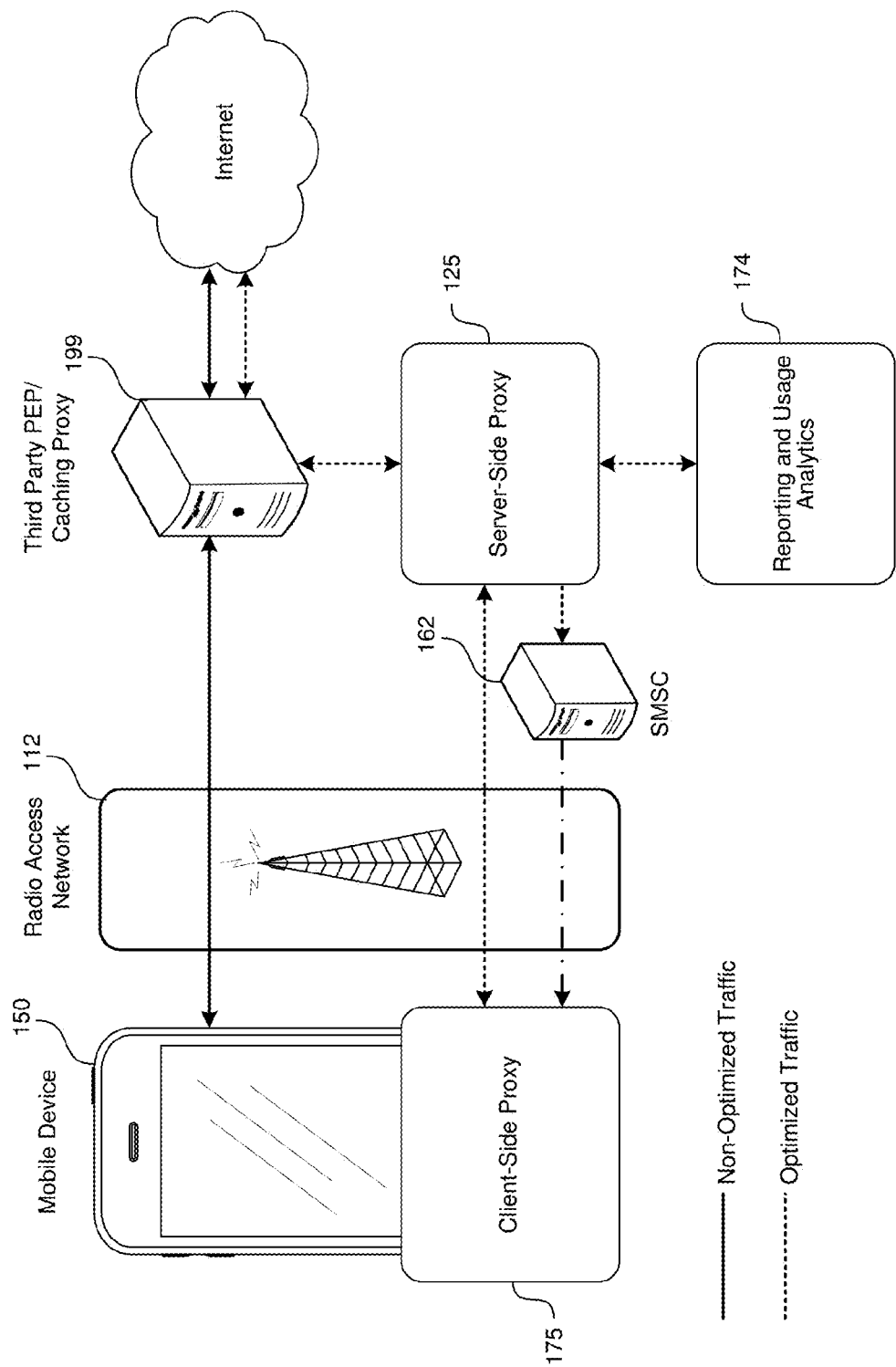
FIG. 1C illustrates an example diagram of the logical architecture of a distributed proxy and cache system for providing APIs and API extensions to third party applications for optimizing and minimizing application traffic according to an embodiment of the subject matter described herein.

FIG. 1C illustrates an example diagram of the logical architecture of a distributed proxy and cache system for providing APIs and API extensions to third party applications for optimizing and minimizing application traffic according to another embodiment of the subject matter described herein. In the embodiment illustrated in FIG. 1C, the distributed system can include, for example the following components:

Client Side Proxy 175: a component installed in the Smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIGS. 2A and 2B.

The server side proxy 145 can include one or more servers that can interface with third party application servers (e.g., 199), mobile operator's network (which can be proxy 199 or an additional server that is not illustrated) and/or the client side proxy 175. In general, the server side proxy 145 can be compliant with and is generally able to operate with standard or state of the art networking protocols and/or specifications for interacting with mobile network elements and/or third party servers. Additional components and features of the server-side proxy 145 are illustrated with further references to the examples of FIGS. 3A and 3B.

Reporting and Usage Analytics Server 174: The Reporting and Usage Analytics system or component 174 can collect information from the client side 175 and/or the server side 145 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 145, or it may be a component of the server-side proxy 145, residing partially or wholly therein.

Figure 1D:
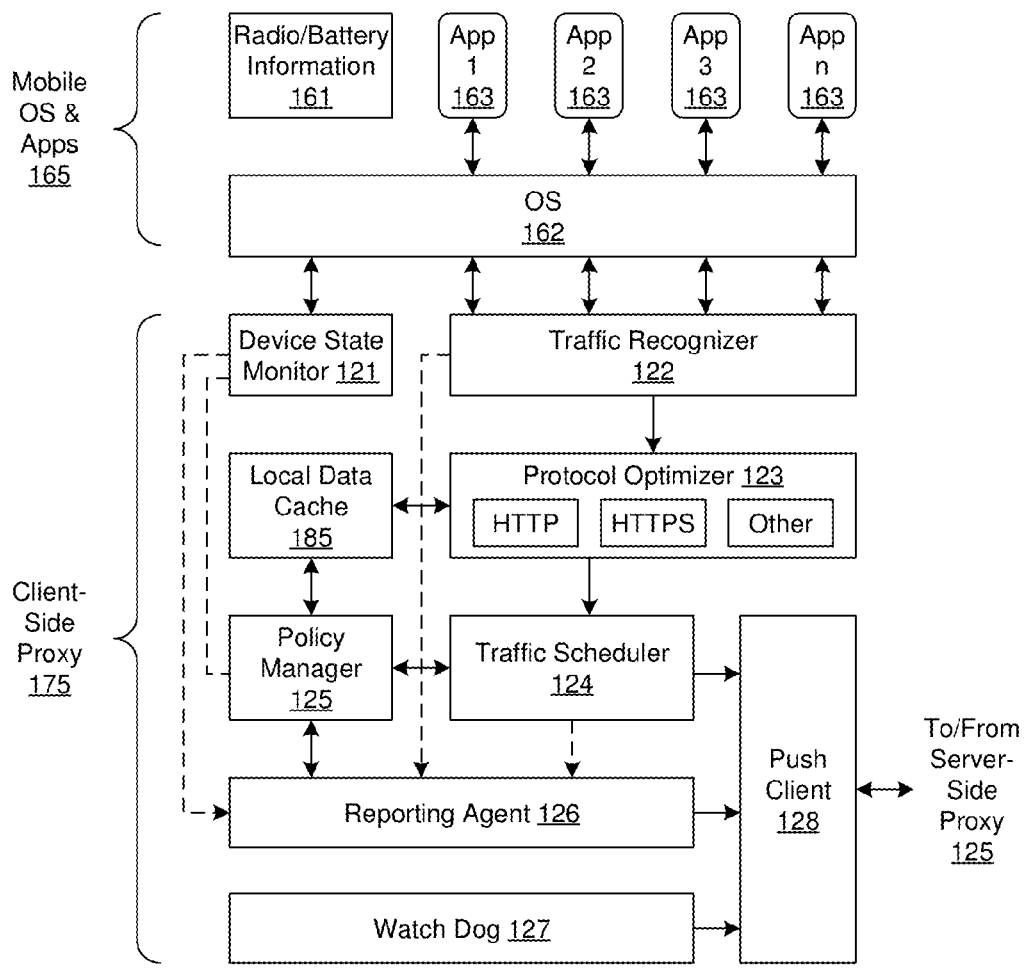
FIG. 1D illustrates an example diagram showing the architecture of client side components in a distributed proxy and cache system for providing APIs and API extensions to third party applications for optimizing and minimizing application traffic according to an embodiment of the subject matter described herein.

FIG. 1D illustrates an example diagram showing the architecture of client side components in a distributed proxy and cache system for providing APIs and API extensions to third party applications for optimizing and minimizing application traffic according to another embodiment of the subject matter described herein. In the embodiment illustrated in FIG. 1D, the client side components 175 can include software components or agents installed on the mobile device that enables traffic optimization and performs the related functionalities on the client side. Components of the client side proxy 175 can operate transparently for end users and applications 163. The client side proxy 175 can be installed on mobile devices for optimization to take place, and it can effectuate changes on the data routes. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests. Some example components of the client side proxy 175 are described as follows:

Device State Monitor 141: The device state monitor 141 can be responsible for identifying several states and metrics in the device, such as network status, display status, battery level, etc. such that the remaining components in the client side proxy 175 can operate and make decisions according to device state, acting in an optimal way in each state.

Traffic Recognizer 142: The traffic recognizer 142 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 145, and send to the protocol optimizer 143.

Protocol Optimizer 143: The protocol optimizer 143 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 143 to send responses to the applications 163.

Traffic Scheduler 144: The traffic scheduler 144 can temporally move communications to optimize usage of device resources by unifying keep-alive signaling so that some or all of the different applications 163 can send keep-alive messages at the same time (traffic pipelining). Traffic scheduler 144 may also decide to delay transmission of data that is not relevant at a given time (for example, when the device is not actively used).

Policy Manager 149: The policy manager 149 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server.

Watch Dog 147: The watch dog 147 can monitor the client side proxy 175 operating availability. In case the client side proxy 175 is not working due to a failure or because it has been disabled, the watchdog 147 can reset DNS routing rules information and can restore original DNS settings for the device to continue working until the client side proxy 175 service is restored.

Reporting Agent 146: The reporting agent 146 can gather information about the events taking place in the device and sends the information to the Reporting Server. Event details are stored temporarily in the device and transferred to reporting server only when the data channel state is active. If the client side proxy 175 doesn't send records within twenty-four hours, the reporting agent 146 may attempt to open the connection and send recorded entries or, in case there are no entries in storage, an empty reporting packet. All reporting settings are configured in the policy management server.

Push Client 148: The push client 148 can be responsible for the traffic to between the server side proxy 145 and the client side proxy 175. The push client 148 can send out service requests like content update requests and policy update requests, and receives updates to those requests from the server side proxy 145. In addition, push client 148 can send data to a reporting server (e.g., the reporting and/or usage analytics system which may be internal to or external to the server side proxy 145).

The proxy server 199 has a wide variety of uses, from speeding up a web server by caching repeated requests, to caching web, DNS and other network lookups for a group of clients sharing network resources. The proxy server 199 is optional. The distributed proxy and cache system (145 and/or 175) allows for a flexible proxy configuration using either the proxy 199, additional proxy(s) in operator's network, or integrating both proxies 199 and an operator's or other third-party's proxy.

Figure 1E:
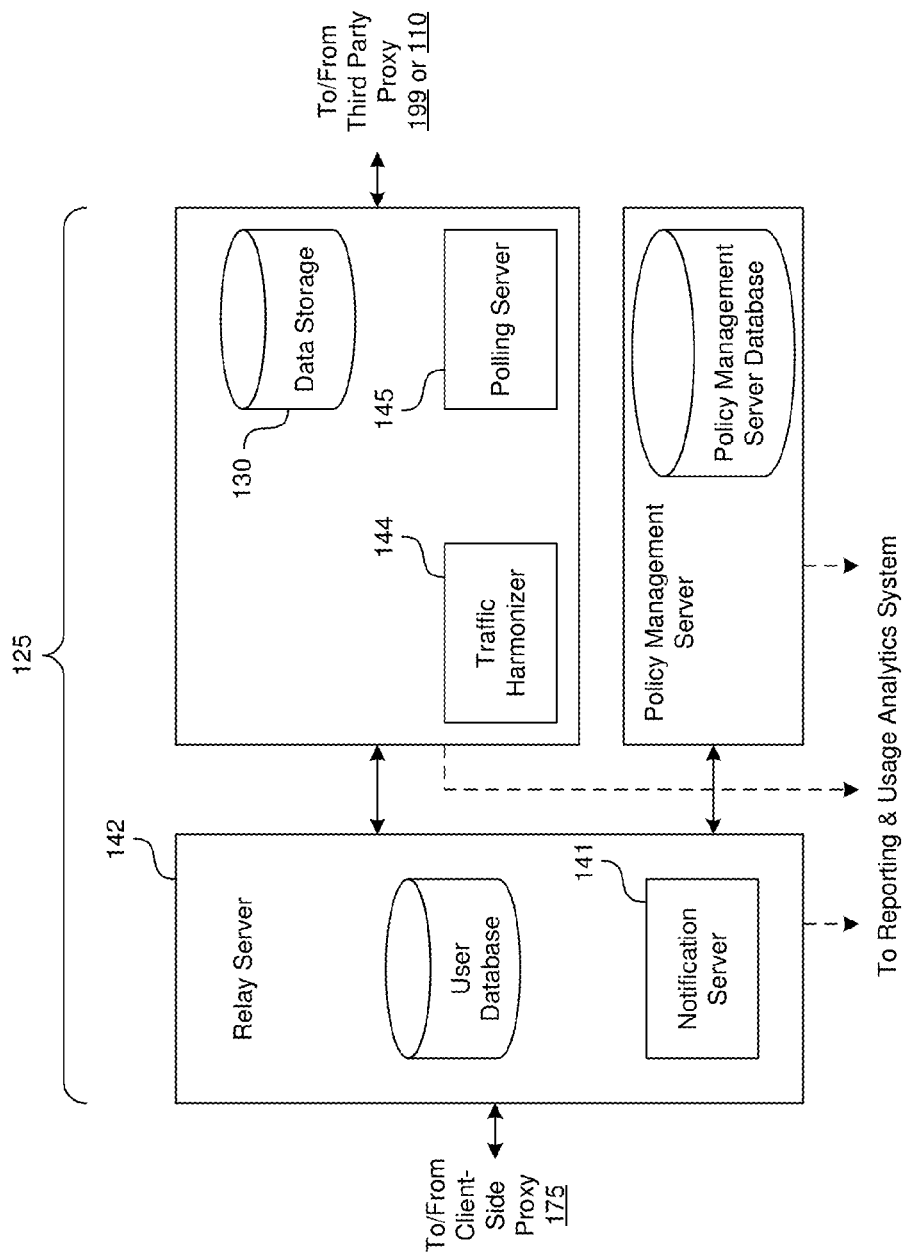
FIG. 1E illustrates a diagram of the example components on the server side of a distributed proxy and cache system for providing APIs and API extensions to third party applications for optimizing and minimizing application traffic according to an embodiment of the subject matter described herein.

FIG. 1E illustrates a diagram of the example components on the server side of the distributed proxy and cache system for providing APIs and API extensions to third party applications for optimizing and minimizing application traffic according to another embodiment of the subject matter described herein. In the embodiment illustrated in FIG. 1E, the server side 145 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 145 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 145, and provides the tools for producing reports and usage analytics that operators can use for analyzing application signaling and data consumption.

Figure 1F:
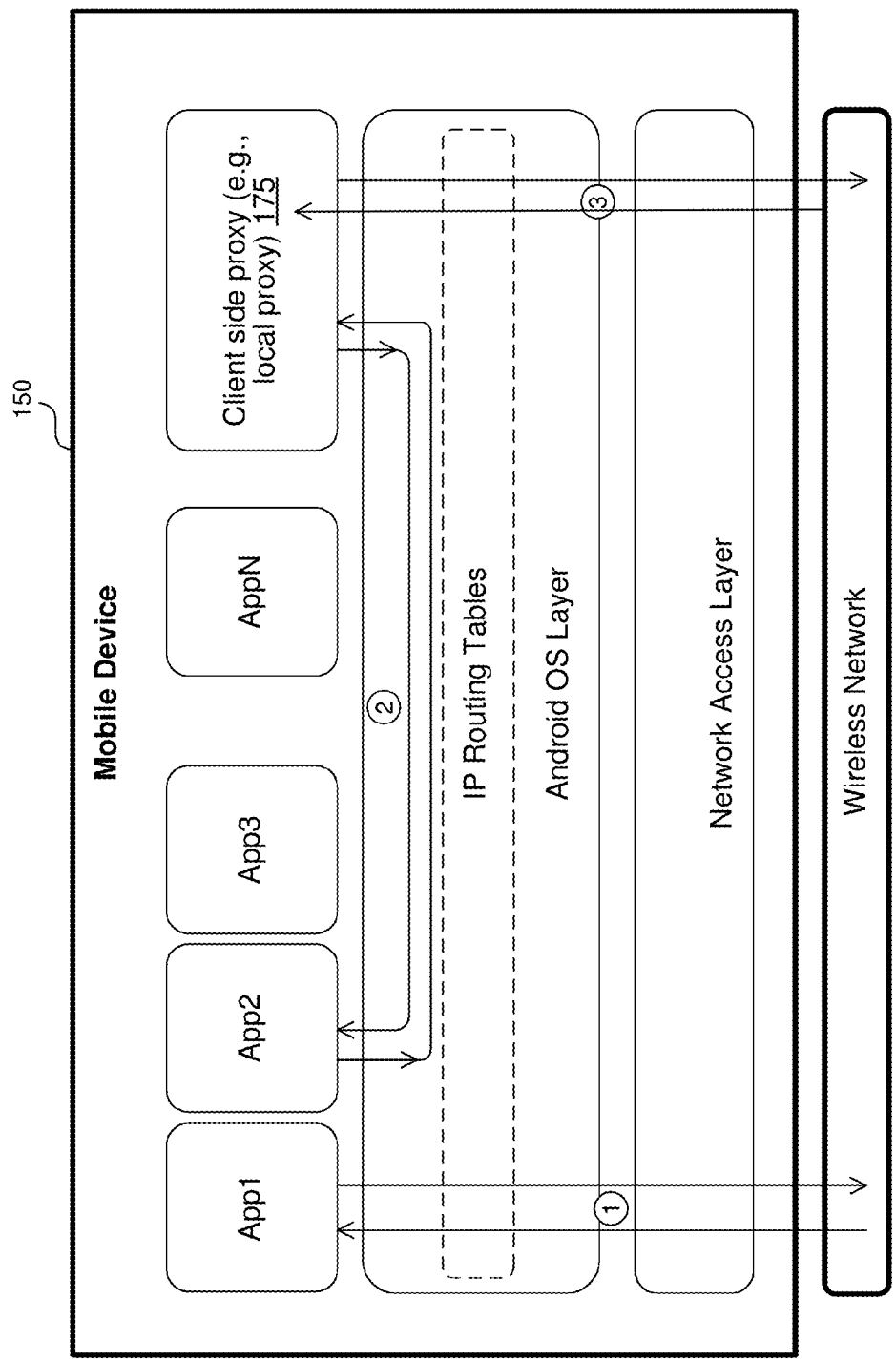
FIG. 1F illustrates an example diagram showing data flows between example client side components in a distributed proxy and cache system for providing APIs and API extensions to third party applications for optimizing and minimizing application traffic according to an embodiment of the subject matter described herein.

FIG. 1F illustrates an example diagram showing data flows between example client side components in a distributed proxy and cache system for providing APIs and API extensions to third party applications for optimizing and minimizing application traffic according to another embodiment of the subject matter described herein. In the embodiment illustrated in FIG. 1F, traffic from applications (e.g., App1, App2, App3 to AppN), client side proxy (e.g., local proxy) 175, IP Routing Tables (e.g., in the Android Operating System Layer), Network Access Layer and Wireless Network are depicted.

In one implementation, non-optimized application traffic flow (1), such as traffic from App1, can completely bypass the client side proxy 175 components and proceed directly through the operating system layer (e.g., the Android OS layer) and Network Access Layer to the wireless network. Traffic that that is not optimized can include, but is not limited to: rich media, like video and audio, as well as traffic from networks and applications that has been configured to bypass optimization and traffic pending optimization, and the like. In one embodiment, all traffic can be configured to bypass the client side/server side proxy.

In another implementation, optimized application traffic (2), such as traffic from App2, can be redirected from the application to the client side proxy 175. By default, this can be traffic on ports 80 (HTTP) and 53 (DNS), and selected traffic on port 443 (HTTPS), for example. However, traffic to other ports can be configured to be directed to the client side proxy.

In yet another implementation, traffic flow (3) can be between the client side proxy 175 and the origin servers (e.g., content server 110) via the Internet and/or between the client side proxy 175 and the server side proxy (e.g., proxy server) 145.

Figure 2A:
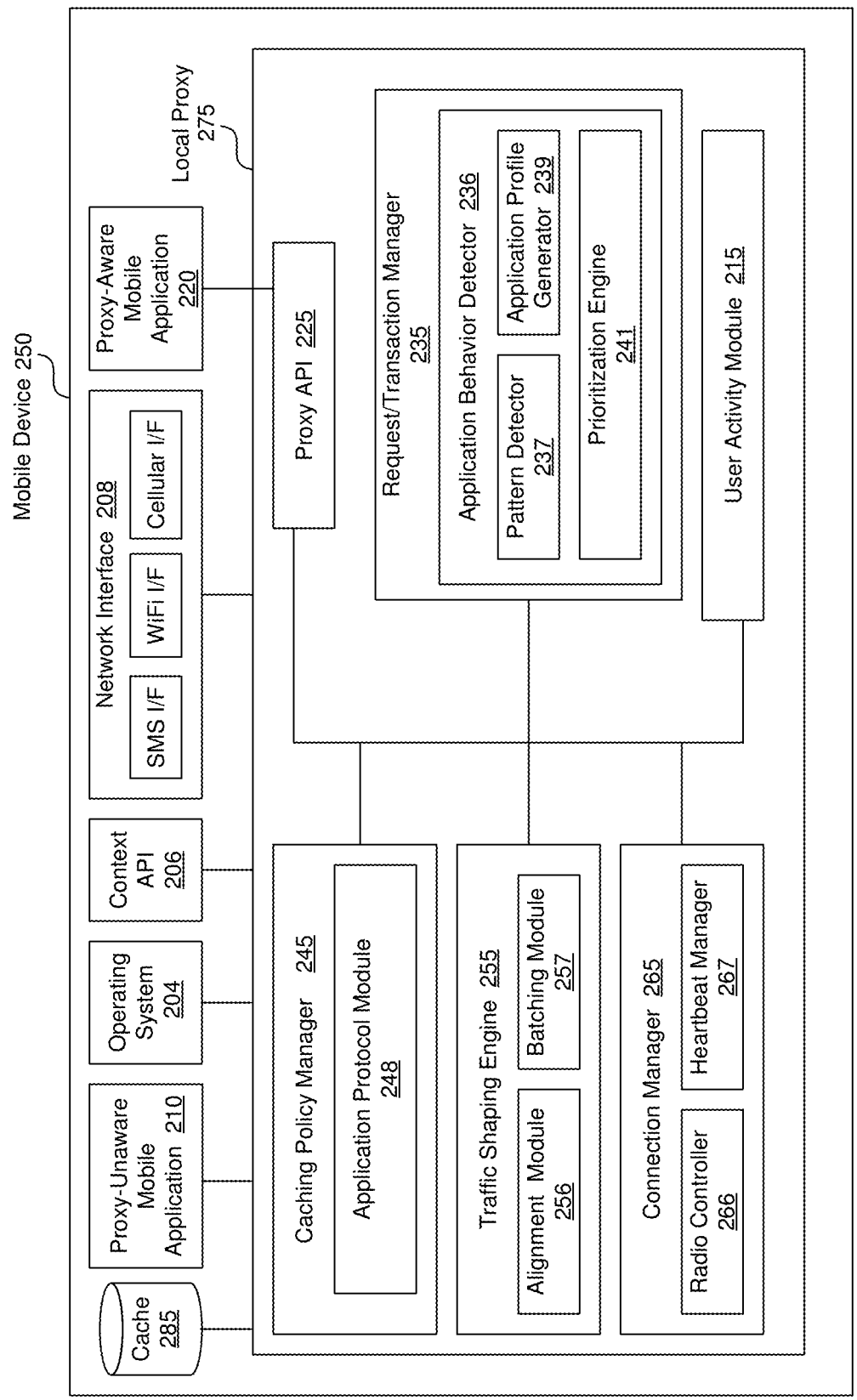
FIG. 2A depicts a block diagram illustrating an example of client-side components in a distributed proxy and cache system for providing APIs and API extensions to third party applications for optimizing and minimizing application traffic according to an embodiment of the subject matter described herein.

FIG. 2A depicts a block diagram illustrating an example of client-side components in a distributed proxy and cache system for providing APIs and API extensions to third party applications for optimizing and minimizing application traffic according to another embodiment of the subject matter described herein. FIG. 2A depicts a block diagram illustrating an example of client-side components in a distributed proxy and cache system residing on a device 250 that manages traffic in a wireless network for resource conservation, content caching, and/or traffic management. The client-side proxy (or local proxy 275) can further categorize mobile traffic and/or implement delivery policies based on application behavior, content priority, user activity, and/or user expectations. The client-side components can further facilitate using a user as an end point for profiling and optimizing the delivery of content and data in a wireless network.

The device 250, which can be a portable or mobile device (e.g., any wireless device), such as a portable phone, generally includes, for example, a network interface 208 an operating system 204, a context API 206, and mobile applications which may be proxy-unaware 210 or proxy-aware 220. Note that the device 250 is specifically illustrated in the example of FIG. 2 as a mobile device, such is not a limitation and that device 250 may be any wireless, broadband, portable/mobile or non-portable device able to receive, transmit signals to satisfy data requests over a network including wired or wireless networks (e.g., WiFi, cellular, Bluetooth, LAN, WAN, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 241, the application behavior detector 236 may further include a pattern detector 237 and/or and application profile generator 239. Additional or less components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

Figure 3A:
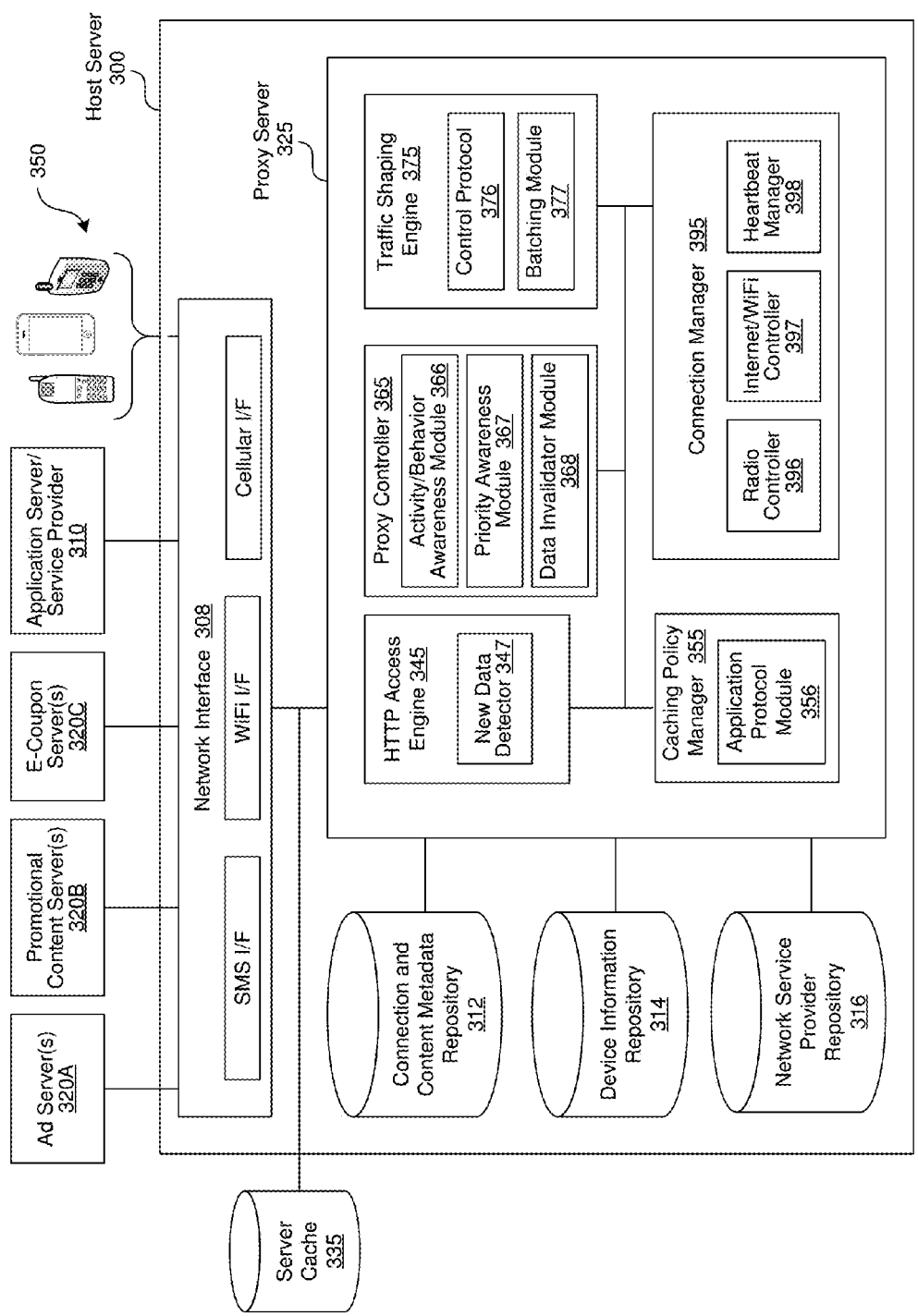
FIG. 3A depicts a block diagram illustrating an example of server-side components of a distributed proxy and cache system for providing APIs and API extensions to third party applications for optimizing and minimizing application traffic according to an embodiment of the subject matter described herein, which can further categorize mobile traffic and/or implement delivery policies based on application behavior, content priority, user activity, and/or user expectations, for example, for further use in aligning data transfer to optimize connections established for wireless transmission to a mobile device and which can also facilitate using a user as an end point for profiling and optimizing the delivery of content and data in a wireless network.

The proxy 275 is generally application independent and can be used by applications (e.g., both proxy-aware and proxy-unaware applications 210 and 220 or mobile applications) to open TCP connections to a remote server (e.g., the server 100 in the examples of FIG. 1A-1B and/or server proxy 145/325 shown in the examples of FIG. 1B and FIG. 3A). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 and 300 in the examples of FIG. 1A-B and FIG. 3A) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 and 300 in the examples of FIG. 1A-B and FIG. 3A) send the data that was buffered as a result of the previously decreased communication frequency.

In addition, or in alternative, the local proxy 275 can communicate the characteristics of user activity at the device 250 to the remote device (e.g., host server 100 and 300 in the examples of FIG. 1A-B and FIG. 3A) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with a application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Sever Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1A and FIG. 3A or a content provider/application server such as the server/provider 110 shown in the examples of FIG. 1A and FIG. 1B). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy 325 of FIG. 3A) to determine whether a remotely stored response is valid. If so, the remotely stored response (e.g., which may be stored on the server cache 135 or optional caching server 199 shown in the example of FIG. 1B) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 325 of FIG. 3A) which forwards the data request to a content source (e.g., application server/content provider 110 of FIG. 1A) and a response from the content source can be provided through the remote proxy, as will be further described in the description associated with the example host server 300 of FIG. 3A. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server 325 in the example of FIG. 3A).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead, by a proxy server (e.g., proxy server 145 of FIG. 1B or proxy server 325 of FIG. 3A) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250. The remote entity may be the host server 300 as shown in the example of FIG. 3A.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate the and send the heartbeat messages to maintain a connection with the backend (e.g., application server/provider 110 in the example of FIG. 1A).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 2B:
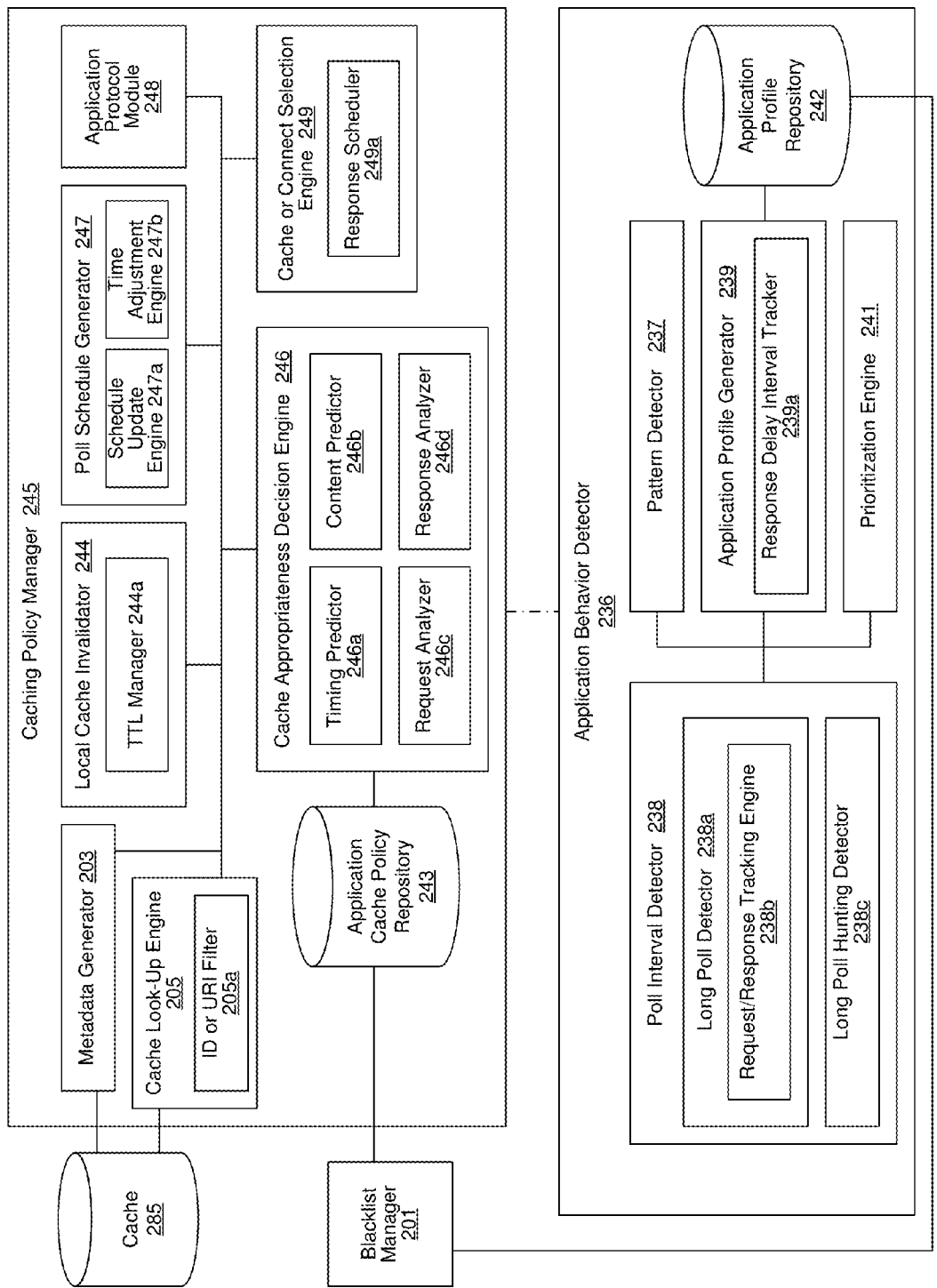
FIG. 2B depicts a block diagram illustrating a further example of components in a distributed proxy and cache system for providing APIs and API extensions to third party applications for optimizing and minimizing application traffic according to an embodiment of the subject matter described herein, which is capable of caching and adapting caching strategies for mobile application behavior and/or network conditions, including detecting long poll requests and managing caching of long polls.

FIG. 2B depicts a block diagram illustrating a further example of components in a distributed proxy and cache system for providing APIs and API extensions to third party applications for optimizing and minimizing application traffic according to another embodiment of the subject matter described herein. FIG. 2B depicts a block diagram illustrating a further example of components in the cache system shown in the example of FIG. 2A, which is capable of caching and adapting caching strategies for mobile application behavior and/or network conditions, including detecting long poll requests and managing caching of long polls.

In one embodiment, the caching policy manager 245 includes a metadata generator 203, a cache look-up engine 205, a cache appropriateness decision engine 246, a poll schedule generator 247, an application protocol module 248, a cache or connect selection engine 249 and/or a local cache invalidator 244. The cache appropriateness decision engine 246 can further include a timing predictor 246A, a content predictor 246B, a request analyzer 246C, and/or a response analyzer 246D, and the cache or connect selection engine 249 includes a response scheduler 249A. The metadata generator 203 and/or the cache look-up engine 205 are coupled to the cache 285 (or local cache) for modification or addition to cache entries or querying thereof.

The cache look-up engine 205 may further include an ID or URI filter 205A, the local cache invalidator 244 may further include a TTL manager 244A, and the poll schedule generator 247 may further include a schedule update engine 247A and/or a time adjustment engine 247B. One embodiment of caching policy manager 245 includes an application cache policy repository 243. In one embodiment, the application behavior detector 236 includes a pattern detector 237, a poll interval detector 238, an application profile generator 239, and/or a priority engine 241. The poll interval detector 238 may further include a long poll detector 238A having a response/request tracking engine 238B. The poll interval detector 238 may further include a long poll hunting detector 238C. The application profile generator 239 can further include a response delay interval tracker 239A.

The pattern detector 237, application profile generator 239, and the priority engine 241 were also described in association with the description of the pattern detector shown in the example of FIG. 2A. One embodiment further includes an application profile repository 242 which can be used by the local proxy 275 to store information or metadata regarding application profiles (e.g., behavior, patterns, type of HTTP requests, etc.)

The cache appropriateness decision engine 246 can detect, assess, or determine whether content from a content source (e.g., application server/content provider 110 in the example of FIG. 1B) with which a mobile device 250 interacts and has content that may be suitable for caching. For example, the decision engine 246 can use information about a request and/or a response received for the request initiated at the mobile device 250 to determine cacheability, potential cacheability, or non-cacheability. In some instances, the decision engine 246 can initially verify whether a request is directed to a blacklisted destination or whether the request itself originates from a blacklisted client or application. If so, additional processing and analysis may not be performed by the decision engine 246 and the request may be allowed to be sent over the air to the server to satisfy the request. The black listed destinations or applications/clients (e.g., mobile applications) can be maintained locally in the local proxy (e.g., in the application profile repository 242) or remotely (e.g., in the proxy server 325 or another entity).

In one embodiment, the decision engine 246, for example, via the request analyzer 246C, collects information about an application or client request generated at the mobile device 250. The request information can include request characteristics information including, for example, request method. For example, the request method can indicate the type of HTTP request generated by the mobile application or client. In one embodiment, response to a request can be identified as cacheable or potentially cacheable if the request method is a GET request or POST request. Other types of requests (e.g., OPTIONS, HEAD, PUT, DELETE, TRACE, or CONNECT) may or may not be cached. In general, HTTP requests with uncacheable request methods will not be cached.

Request characteristics information can further include information regarding request size, for example. Responses to requests (e.g., HTTP requests) with body size exceeding a certain size will not be cached. For example, cacheability can be determined if the information about the request indicates that a request body size of the request does not exceed a certain size. In some instances, the maximum cacheable request body size can be set to 8092 bytes. In other instances, different values may be used, dependent on network capacity or network operator specific settings, for example.

In some instances, content from a given application server/content provider (e.g., the server/content provider 110 of FIG. 1B) is determined to be suitable for caching based on a set of criteria, for example, criteria specifying time criticality of the content that is being requested from the content source. In one embodiment, the local proxy (e.g., the local proxy 175 or 275 of FIG. 1B and FIG. 2A) applies a selection criteria to store the content from the host server which is requested by an application as cached elements in a local cache on the mobile device to satisfy subsequent requests made by the application.

The cache appropriateness decision engine 246, further based on detected patterns of requests sent from the mobile device 250 (e.g., by a mobile application or other types of clients on the device 250) and/or patterns of received responses, can detect predictability in requests and/or responses. For example, the request characteristics information collected by the decision engine 246, (e.g., the request analyzer 246C) can further include periodicity information between a request and other requests generated by a same client on the mobile device or other requests directed to the same host (e.g., with similar or same identifier parameters).

Periodicity can be detected, by the decision engine 246 or the request analyzer 246C, when the request and the other requests generated by the same client occur at a fixed rate or nearly fixed rate, or at a dynamic rate with some identifiable or partially or wholly reproducible changing pattern. If the requests are made with some identifiable pattern (e.g., regular intervals, intervals having a detectable pattern, or trend (e.g., increasing, decreasing, constant, etc.) the timing predictor 246A can determine that the requests made by a given application on a device is predictable and identify it to be potentially appropriate for caching, at least from a timing standpoint.

An identifiable pattern or trend can generally include any application or client behavior which may be simulated either locally, for example, on the local proxy 275 on the mobile device 250 or simulated remotely, for example, by the proxy server 325 on the host 300, or a combination of local and remote simulation to emulate application behavior.

In one embodiment, the decision engine 246, for example, via the response analyzer 246D, can collect information about a response to an application or client request generated at the mobile device 250. The response is typically received from a server or the host of the application (e.g., mobile application) or client which sent the request at the mobile device 250. In some instances, the mobile client or application can be the mobile version of an application (e.g., social networking, search, travel management, voicemail, contact manager, email) or a web site accessed via a web browser or via a desktop client.

For example, response characteristics information can include an indication of whether transfer encoding or chunked transfer encoding is used in sending the response. In some instances, responses to HTTP requests with transfer encoding or chunked transfer encoding are not cached, and therefore are also removed from further analysis. The rationale here is that chunked responses are usually large and non-optimal for caching, since the processing of these transactions may likely slow down the overall performance. Therefore, in one embodiment, cacheability or potential for cacheability can be determined when transfer encoding is not used in sending the response.

In addition, the response characteristics information can include an associated status code of the response which can be identified by the response analyzer 246D. In some instances, HTTP responses with uncacheable status codes are typically not cached. The response analyzer 246D can extract the status code from the response and determine whether it matches a status code which is cacheable or uncacheable. Some cacheable status codes include by way of example: 200-OK, 301-Redirect, 302-Found, 303-See other, 304-Not Modified, 307Temporary Redirect, or 500-Internal server error. Some uncacheable status codes can include, for example, 403-Forbidden or 404-Not found.

In one embodiment, cacheability or potential for cacheability can be determined if the information about the response does not indicate an uncacheable status code or indicates a cacheable status code. If the response analyzer 246D detects an uncacheable status code associated with a given response, the specific transaction (request/response pair) may be eliminated from further processing and determined to be uncacheable on a temporary basis, a semi-permanent, or a permanent basis. If the status code indicates cacheability, the transaction (e.g., request and/or response pair) may be subject to further processing and analysis to confirm cacheability, as shown in the example flow charts of FIGS. 11-13.

Response characteristics information can also include response size information. In general, responses can be cached locally at the mobile device 250 if the responses do not exceed a certain size. In some instances, the default maximum cached response size is set to 148 KB. In other instances, the max cacheable response size may be different and/or dynamically adjusted based on operating conditions, network conditions, network capacity, user preferences, network operator requirements, or other application-specific, user specific, and/or device-specific reasons. In one embodiment, the response analyzer 246D can identify the size of the response, and cacheability or potential for cacheability can be determined if a given threshold or max value is not exceeded by the response size.

Furthermore, response characteristics information can include response body information for the response to the request and other response to other requests generated by a same client on the mobile device, or directed to a same content host or application server. The response body information for the response and the other responses can be compared, for example, by the response analyzer 246D, to prevent the caching of dynamic content (or responses with content that changes frequently and cannot be efficiently served with cache entries, such as financial data, stock quotes, news feeds, real-time sporting event activities, etc.), such as content that would no longer be relevant or up-to-date if served from cached entries.

The cache appropriateness decision engine 246 (e.g., the content predictor 246B) can definitively identify repeatability or identify indications of repeatability, potential repeatability, or predictability in responses received from a content source (e.g., the content host/application server 110 shown in the example of FIG. 1A-B). Repeatability can be detected by, for example, tracking at least two responses received from the content source and determines if the two responses are the same. For example, cacheability can be determined, by the response analyzer 246D, if the response body information for the response and the other responses sent by the same mobile client or directed to the same host/server are same or substantially the same. The two responses may or may not be responses sent in response to consecutive requests. In one embodiment, hash values of the responses received for requests from a given application are used to determine repeatability of content (with or without heuristics) for the application in general and/or for the specific request. Additional same responses may be required for some applications or under certain circumstances.

Repeatability in received content need not be 100% ascertained. For example, responses can be determined to be repeatable if a certain number or a certain percentage of responses are the same, or similar. The certain number or certain percentage of same/similar responses can be tracked over a select period of time, set by default or set based on the application generating the requests (e.g., whether the application is highly dynamic with constant updates or less dynamic with infrequent updates). Any indicated predictability or repeatability, or possible repeatability, can be utilized by the distributed system in caching content to be provided to a requesting application or client on the mobile device 250.

In one embodiment, for a long poll type request, the local proxy 175 can begin to cache responses on a third request when the response delay times for the first two responses are the same, substantially the same, or detected to be increasing in intervals. In general, the received responses for the first two responses should be the same, and upon verifying that the third response received for the third request is the same (e.g., if R0=R1=R2), the third response can be locally cached on the mobile device. Less or more same responses may be required to begin caching, depending on the type of application, type of data, type of content, user preferences, or carrier/network operator specifications.

Figure 8:
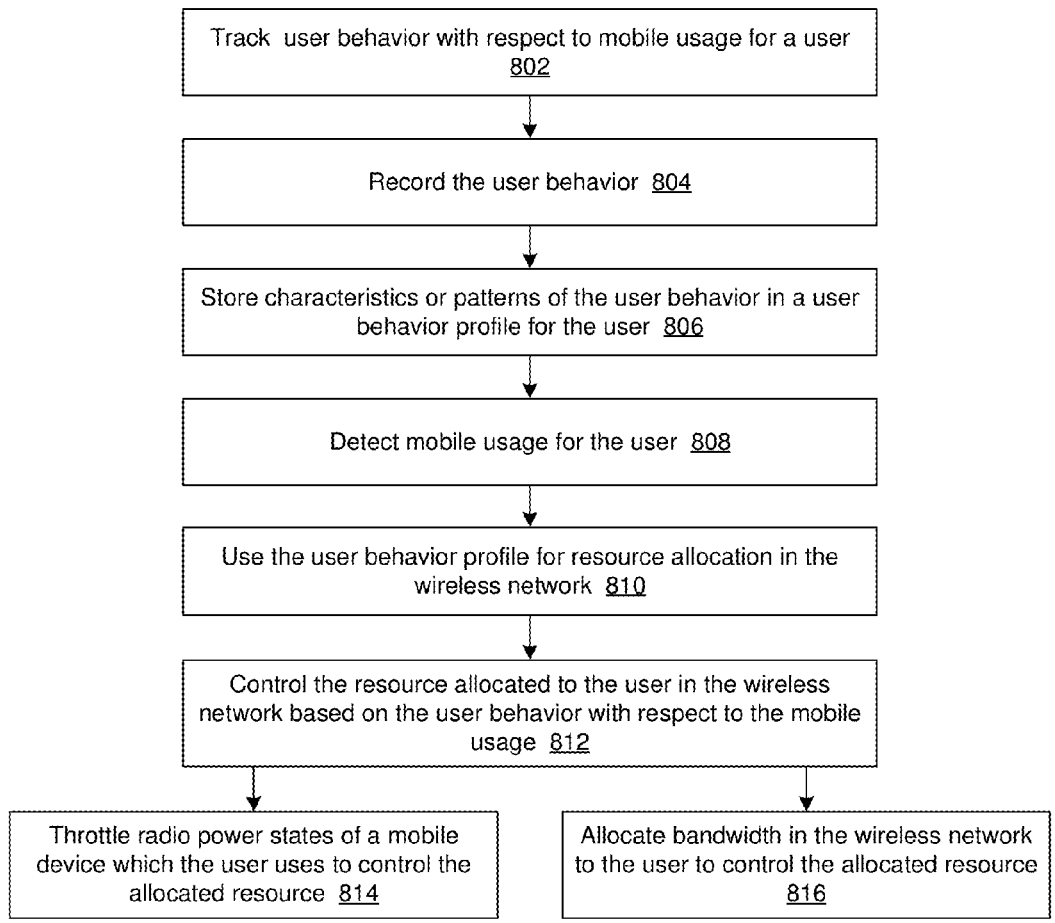
FIG. 8 illustrates a flow chart showing an example flow for user behavior based resource allocation in a wireless network component of a distributed proxy and cache system for providing APIs and API extensions to third party applications for optimizing and minimizing application traffic according to an embodiment of the subject matter described herein.

Increasing response delays with same responses for long polls can indicate a hunting period (e.g., a period in which the application/client on the mobile device is seeking the longest time between a request and response that a given network will allow, a timing diagram showing timing characteristics is illustrated in FIG. 8), as detected by the long poll hunting detector 238C of the application behavior detector 236.

An example can be described below using T0, T1, T2, where T indicates the delay time between when a request is sent and when a response (e.g., the response header) is detected/received for consecutive requests:

T0=Response0(t)−Request0(t)=180 s. (+/−tolerance)
T1=Response1(t)−Request1(t)=240 s. (+/−tolerance)
T2=Response2(t)−Request2(t)=500 s. (+/−tolerance)

In the example timing sequence shown above, T0<T1<T2, this may indicate a hunting pattern for a long poll when network timeout has not yet been reached or exceeded. Furthermore, if the responses R0, R1, and R2 received for the three requests are the same, R2 can be cached. In this example, R2 is cached during the long poll hunting period without waiting for the long poll to settle, thus expediting response caching (e.g., this is optional accelerated caching behavior which can be implemented for all or select applications).

As such, the local proxy 275 can specify information that can be extracted from the timing sequence shown above (e.g., polling schedule, polling interval, polling type) to the proxy server and begin caching and to request the proxy server to begin polling and monitoring the source (e.g., using any of T0, T1, T2 as polling intervals but typically T2, or the largest detected interval without timing out, and for which responses from the source is received will be sent to the proxy server 325 of FIG. 3A for use in polling the content source (e.g., application server/service provider 310)).

However, if the time intervals are detected to be getting shorter, the application (e.g., mobile application)/client may still be hunting for a time interval for which a response can be reliably received from the content source (e.g., application/server server/provider 110 or 310), and as such caching typically should not begin until the request/response intervals indicate the same time interval or an increasing time interval, for example, for a long poll type request.

An example of handling a detected decreasing delay can be described below using T0, T1, T2, T3, and T4 where T indicates the delay time between when a request is sent and when a response (e.g., the response header) is detected/received for consecutive requests:

T0=Response0(t)−Request0(t)=160 s. (+/−tolerance)
T1=Response1(t)−Request1(t)=240 s. (+/−tolerance)
T2=Response2(t)−Request2(t)=500 s. (+/−tolerance)
T3=Time out at 700 s. (+/−tolerance)
T4=Response4(t)−Request4(t)=600 (+/−tolerance)

If a pattern for response delays T1<T2<T3>T4 is detected, as shown in the above timing sequence (e.g., detected by the long poll hunting detector 238C of the application behavior detector 236), it can be determined that T3 likely exceeded the network time out during a long poll hunting period. In Request 3, a response likely was not received since the connection was terminated by the network, application, server, or other reason before a response was sent or available. On Request 4 (after T4), if a response (e.g., Response 4) is detected or received, the local proxy 275 can then use the response for caching (if the content repeatability condition is met). The local proxy can also use T4 as the poll interval in the polling schedule set for the proxy server to monitor/poll the content source.

Note that the above description shows that caching can begin while long polls are in hunting mode in the event of detecting increasing response delays, as long as responses are received and not timed out for a given request. This can be referred to as the optional accelerated caching during long poll hunting. Caching can also begin after the hunting mode (e.g., after the poll requests have settled to a constant or near constant delay value) has completed. Note that hunting may or may not occur for long polls and when hunting occurs; the proxy 275 can generally detect this and determine whether to begin to cache during the hunting period (increasing intervals with same responses) or wait until the hunt settles to a stable value.

In one embodiment, the timing predictor 246A of the cache appropriateness decision engine 246 can track timing of responses received from outgoing requests from an application (e.g., mobile application) or client to detect any identifiable patterns which can be partially wholly reproducible, such that locally cached responses can be provided to the requesting client on the mobile device 250 in a manner that simulates content source (e.g., application server/content provider 110 or 310) behavior. For example, the manner in which (e.g., from a timing standpoint) responses or content would be delivered to the requesting application/client on the device 250. This ensures preservation of user experience when responses to application or mobile client requests are served from a local and/or remote cache instead of being retrieved/received directly from the content source (e.g., application, content provider 110 or 310).

In one embodiment, the decision engine 246 or the timing predictor 246A determines the timing characteristics a given application (e.g., mobile application) or client from, for example, the request/response tracking engine 238B and/or the application profile generator 239 (e.g., the response delay interval tracker 239A). Using the timing characteristics, the timing predictor 246A determines whether the content received in response to the requests are suitable or are potentially suitable for caching. For example, poll request intervals between two consecutive requests from a given application can be used to determine whether request intervals are repeatable (e.g., constant, near constant, increasing with a pattern, decreasing with a pattern, etc.) and can be predicted and thus reproduced at least some of the times either exactly or approximated within a tolerance level.

In some instances, the timing characteristics of a given request type for a specific application, for multiple requests of an application, or for multiple applications can be stored in the application profile repository 242. The application profile repository 242 can generally store any type of information or metadata regarding application request/response characteristics including timing patterns, timing repeatability, content repeatability, etc.

The application profile repository 242 can also store metadata indicating the type of request used by a given application (e.g., long polls, long-held HTTP requests, HTTP streaming, push, COMET push, etc.) Application profiles indicating request type by applications can be used when subsequent same/similar requests are detected, or when requests are detected from an application which has already been categorized. In this manner, timing characteristics for the given request type or for requests of a specific application which has been tracked and/or analyzed, need not be reanalyzed.

Application profiles can be associated with a time-to-live (e.g., or a default expiration time). The use of an expiration time for application profiles, or for various aspects of an application or request's profile can be used on a case by case basis. The time-to-live or actual expiration time of application profile entries can be set to a default value or determined individually, or a combination thereof. Application profiles can also be specific to wireless networks, physical networks, network operators, or specific carriers.

One embodiment includes an application blacklist manager 201. The application blacklist manager 201 can be coupled to the application cache policy repository 243 and can be partially or wholly internal to local proxy or the caching policy manager 245. Similarly, the blacklist manager 201 can be partially or wholly internal to local proxy or the application behavior detector 236. The blacklist manager 201 can aggregate, track, update, manage, adjust, or dynamically monitor a list of destinations of servers/host that are 'blacklisted,' or identified as not cached, on a permanent or temporary basis. The blacklist of destinations, when identified in a request, can potentially be used to allow the request to be sent over the (cellular) network for servicing. Additional processing on the request may not be performed since it is detected to be directed to a blacklisted destination.

Blacklisted destinations can be identified in the application cache policy repository 243 by address identifiers including specific URIs or patterns of identifiers including URI patterns. In general, blacklisted destinations can be set by or modified for any reason by any party including the user (owner/user of mobile device 250), operating system/mobile platform of device 250, the destination itself, network operator (of cellular network), Internet service provider, other third parties, or according to a list of destinations for applications known to be uncacheable/not suited for caching. Some entries in the blacklisted destinations may include destinations aggregated based on the analysis or processing performed by the local proxy (e.g., cache appropriateness decision engine 246).

For example, applications or mobile clients on the mobile device for which responses have been identified as non-suitable for caching can be added to the blacklist Their corresponding hosts/servers may be added in addition to or in lieu of an identification of the requesting application/client on the mobile device 250. Some or all of such clients identified by the proxy system can be added to the blacklist. For example, for all application clients or applications that are temporarily identified as not being suitable for caching, only those with certain detected characteristics (based on timing, periodicity, frequency of response content change, content predictability, size, etc.) can be blacklisted.

The blacklisted entries may include a list of requesting applications or requesting clients on the mobile device (rather than destinations) such that, when a request is detected from a given application or given client, it may be sent through the network for a response, since responses for blacklisted clients/applications are in most circumstances not cached.

A given application profile may also be treated or processed differently (e.g., different behavior of the local proxy 275 and the remote proxy 325) depending on the mobile account associated with a mobile device from which the application is being accessed. For example, a higher paying account, or a premier account may allow more frequent access of the wireless network or higher bandwidth allowance thus affecting the caching policies implemented between the local proxy 275 and proxy server 325 with an emphasis on better performance compared to conservation of resources. A given application profile may also be treated or processed differently under different wireless network conditions (e.g., based on congestion or network outage, etc.).

Note that cache appropriateness can be determined, tracked, and managed for multiple clients or applications on the mobile device 250. Cache appropriateness can also be determined for different requests or request types initiated by a given client or application on the mobile device 250. The caching policy manager 245, along with the timing predictor 246A and/or the content predictor 246B which heuristically determines or estimates predictability or potential predictability, can track, manage and store cacheability information for various application or various requests for a given application. Cacheability information may also include conditions (e.g., an application can be cached at certain times of the day, or certain days of the week, or certain requests of a given application can be cached, or all requests with a given destination address can be cached) under which caching is appropriate which can be determined and/or tracked by the cache appropriateness decision engine 246 and stored and/or updated when appropriate in the application cache policy repository 243 coupled to the cache appropriateness decision engine 246.

The information in the application cache policy repository 243 regarding cacheability of requests, applications, and/or associated conditions can be used later on when same requests are detected. In this manner, the decision engine 246 and/or the timing and content predictors 246A/b need not track and reanalyze request/response timing and content characteristics to make an assessment regarding cacheability. In addition, the cacheability information can in some instances be shared with local proxies of other mobile devices by way of direct communication or via the host server (e.g., proxy server 325 of host server 300).

For example, cacheability information detected by the local proxy 275 on various mobile devices can be sent to a remote host server or a proxy server 325 on the host server (e.g., host server 300 or proxy server 325 shown in the example of FIG. 3A, host 100 and proxy server 145 in the example of FIG. 1A-B). The remote host or proxy server can then distribute the information regarding application-specific, request-specific cacheability information and/or any associated conditions to various mobile devices or their local proxies in a wireless network or across multiple wireless networks (same service provider or multiple wireless service providers) for their use.

In general, the selection criteria for caching can further include, by way of example but not limitation, the state of the mobile device indicating whether the mobile device is active or inactive, network conditions, and/or radio coverage statistics. The cache appropriateness decision engine 246 can in any one or any combination of the criteria, and in any order, identifying sources for which caching may be suitable.

Once application servers/content providers having identified or detected content that is potentially suitable for local caching on the mobile device 250, the cache policy manager 245 can proceed to cache the associated content received from the identified sources by storing content received from the content source as cache elements in a local cache (e.g., local cache 185 or 285 shown in the examples of FIG. 1B and FIG. 2A, respectively) on the mobile device 250.

The response can be stored in the cache 285 (e.g., also referred as the local cache) as a cache entry. In addition to the response to a request, the cached entry can include response metadata having additional information regarding caching of the response. The metadata may be generated by the metadata generator 203 and can include, for example, timing data such as the access time of the cache entry or creation time of the cache entry. Metadata can include additional information, such as any information suited for use in determining whether the response stored as the cached entry is used to satisfy the subsequent response. For example, metadata information can further include, request timing history (e.g., including request time, request start time, request end time), hash of the request and/or response, time intervals or changes in time intervals, etc.

The cache entry is typically stored in the cache 285 in association with a time-to-live (TTL), which for example may be assigned or determined by the TTL manager 244A of the cache invalidator 244. The time-to-live of a cache entry is the amount of time the entry is persisted in the cache 285 regardless of whether the response is still valid or relevant for a given request or client/application on the mobile device 250. For example, if the time-to-live of a given cache entry is set to 14 hours, the cache entry is purged, removed, or otherwise indicated as having exceeded the time-to-live, even if the response body contained in the cache entry is still current and applicable for the associated request.

A default time-to-live can be automatically used for all entries unless otherwise specified (e.g., by the TTL manager 244A), or each cache entry can be created with its individual TTL (e.g., determined by the TTL manager 244A based on various dynamic or static criteria). Note that each entry can have a single time-to-live associated with both the response data and any associated metadata. In some instances, the associated metadata may have a different time-to-live (e.g., a longer time-to-live) than the response data.

The content source having content for caching can, in addition or in alternate, be identified to a proxy server (e.g., proxy server 145 or 325 shown in the examples of FIG. 1B and FIG. 3A, respectively) remote from and in wireless communication with the mobile device 250 such that the proxy server can monitor the content source (e.g., application server/content provider 110) for new or changed data. Similarly, the local proxy (e.g., the local proxy 175 or 275 of FIG. 1B and FIG. 2A, respectively) can identify to the proxy server that content received from a specific application server/content provider is being stored as cached elements in the local cache 285.

Once content has been locally cached, the cache policy manager 245, upon receiving future polling requests to contact the application server/content host (e.g., 110 or 310), can retrieve the cached elements from the local cache to respond to the polling request made at the mobile device 250 such that a radio of the mobile device is not activated to service the polling request. For example, the cache look-up engine 205 can query the cache 285 to identify the response to be served to a response. The response can be served from the cache in response to identifying a matching cache entry and also using any metadata stored with the response in the cache entry. The cache entries can be queried by the cache look-up engine using a URI of the request or another type of identifier (e.g., via the ID or URI filter 205A). The cache-lookup engine 205 can further use the metadata (e.g., extract any timing information or other relevant information) stored with the matching cache entry to determine whether response is still suited for use in being served to a current request.

Note that the cache-look-up can be performed by the engine 205 using one or more of various multiple strategies. In one embodiment, multiple cook-up strategies can be executed sequentially on each entry store din the cache 285, until at least one strategy identifies a matching cache entry. The strategy employed to performing cache look-up can include a strict matching criteria or a matching criteria which allows for non-matching parameters.

For example, the look-up engine 205 can perform a strict matching strategy which searches for an exact match between an identifier (e.g., a URI for a host or resource) referenced in a present request for which the proxy is attempting to identify a cache entry and an identifier stored with the cache entries. In the case where identifiers include URIs or URLs, the matching algorithm for strict matching will search for a cache entry where all the parameters in the URLs match. For example:

EXAMPLE 1

1. Cache contains entry for http://test.com/products/
2. Request is being made to URI http://test.com/products/
Strict strategy will find a match, since both URIs are same.

EXAMPLE 2

1. Cache contains entry for http://test.com/products/?query=all
2. Request is being made to URI http://test.com/products/?query=sub Under the strict strategy outlined above, a match will not be found since the URIs differ in the query parameter.

In another example strategy, the look-up engine 205 looks for a cache entry with an identifier that partially matches the identifier references in a present request for which the proxy is attempting to identify a matching cache entry. For example, the look-up engine 205 may look for a cache entry with an identifier which differs from the request identifier by a query parameter value. In utilizing this strategy, the look-up engine 205 can collect information collected for multiple previous requests (e.g., a list of arbitrary parameters in an identifier) to be later checked with the detected arbitrary parameter in the current request. For example, in the case where cache entries are stored with URI or URL identifiers, the look-up engine searches for a cache entry with a URI differing by a query parameter. If found, the engine 205 can examine the cache entry for information collected during previous requests (e.g. a list of arbitrary parameters) and checked whether the arbitrary parameter detected in or extracted from the current URI/URL belongs to the arbitrary parameters list.

EXAMPLE 1

1. Cache contains entry for http://test.com/products/?query=all, where query is marked as arbitrary.
2. Request is being made to URI http://text.com/products/?query=sub Match will be found, since query parameter is marked as arbitrary.

EXAMPLE 2

1. Cache contains entry for http://test.com/products/?query=all, where query is marked as arbitrary.
2. Request is being made to URI http://test.com/products/?query=sub&sort=asc Match will not be found, since current request contains sort parameter which is not marked as arbitrary in the cache entry.

Additional strategies for detecting cache hit may be employed. These strategies can be implemented singly or in any combination thereof. A cache-hit can be determined when any one of these strategies determines a match. A cache miss may be indicated when the look-up engine 205 determines that the requested data cannot be served from the cache 285, for any reason. For example, a cache miss may be determined when no cache entries are identified for any or all utilized look-up strategies.

Cache miss may also be determined when a matching cache entry exists but determined to be invalid or irrelevant for the current request. For example, the look-up engine 205 may further analyze metadata (e.g., which may include timing data of the cache entry) associated with the matching cache entry to determine whether it is still suitable for use in responding to the present request.

When the look-up engine 205 has identified a cache hit (e.g., an event indicating that the requested data can be served from the cache), the stored response in the matching cache entry can be served from the cache to satisfy the request of an application/client.

By servicing requests using cache entries stored in cache 285, network bandwidth and other resources need not be used to request/receive poll responses which may have not changed from a response that has already been received at the mobile device 250. Such servicing and fulfilling application (e.g., mobile application) requests locally via cache entries in the local cache 285 allows for more efficient resource and mobile network traffic utilization and management since the request need not be sent over the wireless network further consuming bandwidth. In general, the cache 285 can be persisted between power on/off of the mobile device 250, and persisted across application/client refreshes and restarts.

For example, the local proxy 275, upon receipt of an outgoing request from its mobile device 250 or from an application or other type of client on the mobile device 250, can intercept the request and determine whether a cached response is available in the local cache 285 of the mobile device 250. If so, the outgoing request is responded to by the local proxy 275 using the cached response on the cache of the mobile device. As such, the outgoing request can be filled or satisfied without a need to send the outgoing request over the wireless network, thus conserving network resources and battery consumption.

In one embodiment, the responding to the requesting application/client on the device 250 is timed to correspond to a manner in which the content server would have responded to the outgoing request over a persistent connection (e.g., over the persistent connection, or long-held HTTP connection, long poll type connection, that would have been established absent interception by the local proxy). The timing of the response can be emulated or simulated by the local proxy 275 to preserve application behavior such that end user experience is not affected, or minimally affected by serving stored content from the local cache 285 rather than fresh content received from the intended content source (e.g., content host/application server 110 of FIG. 1A-B). The timing can be replicated exactly or estimated within a tolerance parameter, which may go unnoticed by the user or treated similarly by the application so as to not cause operation issues.

For example, the outgoing request can be a request for a persistent connection intended for the content server (e.g., application server/content provider of examples of FIG. 1A-1B). In a persistent connection (e.g., long poll, COMET-style push or any other push simulation in asynchronous HTTP requests, long-held HTTP request, HTTP streaming, or others) with a content source (server), the connection is held for some time after a request is sent. The connection can typically be persisted between the mobile device and the server until content is available at the server to be sent to the mobile device. Thus, there typically can be some delay in time between when a long poll request is sent and when a response is received from the content source. If a response is not provided by the content source for a certain amount of time, the connection may also terminate due to network reasons (e.g., socket closure) if a response is not sent.

Thus, to emulate a response from a content server sent over a persistent connection (e.g., a long poll style connection), the manner of response of the content server can be simulated by allowing a time interval to elapse before responding to the outgoing request with the cached response. The length of the time interval can be determined on a request by request basis or on an application by application (client by client basis), for example.

In one embodiment, the time interval is determined based on request characteristics (e.g., timing characteristics) of an application on the mobile device from which the outgoing request originates. For example, poll request intervals (e.g., which can be tracked, detected, and determined by the long poll detector 238A of the poll interval detector 238) can be used to determine the time interval to wait before responding to a request with a local cache entry and managed by the response scheduler 249A.

One embodiment of the cache policy manager 245 includes a poll schedule generator 247 which can generate a polling schedule for one or more applications on the mobile device 250. The polling schedule can specify a polling interval that can be employed by an entity which is physically distinct and/or separate from the mobile device 250 in monitoring the content source for one or more applications (such that cached responses can be verified periodically by polling a host server (host server 110 or 310) to which the request is directed) on behalf of the mobile device. One example of such an external entity which can monitor the content at the source for the mobile device 250 is a proxy server (e.g., proxy server 145 or 325 shown in the examples of FIG. 1B and FIG. 3A-C).

The polling schedule (e.g., including a rate/frequency of polling) can be determined, for example, based on the interval between the polling requests directed to the content source from the mobile device. The polling schedule or rate of polling may be determined at the mobile device 250 (by the local proxy). In one embodiment, the poll interval detector 238 of the application behavior detector 236 can monitor polling requests directed to a content source from the mobile device 250 in order to determine an interval between the polling requests made from any or all application (e.g., mobile application).

For example, the poll interval detector 238 can track requests and responses for applications or clients on the device 250. In one embodiment, consecutive requests are tracked prior to detection of an outgoing request initiated from the application (e.g., mobile application) on the mobile device 250 by the same mobile client or application (e.g., mobile application). The polling rate can be determined using request information collected for the request for which the response is cached. In one embodiment, the rate is determined from averages of time intervals between previous requests generated by the same client which generated the request. For example, a first interval may be computed between the current request and a previous request, and a second interval can be computed between the two previous requests. The polling rate can be set from the average of the first interval and the second interval and sent to the proxy server in setting up the caching strategy.

Alternate intervals may be computed in generating an average; for example, multiple previous requests in addition to two previous requests may be used, and more than two intervals may be used in computing an average. In general, in computing intervals, a given request need not have resulted in a response to be received from the host server/content source in order to use it for interval computation. In other words, the timing characteristics of a given request may be used in interval computation, as long as the request has been detected, even if the request failed in sending, or if the response retrieval failed.

One embodiment of the poll schedule generator 247 includes a schedule update engine 247A and/or a time adjustment engine 247B. The schedule update engine 247A can determine a need to update a rate or polling interval with which a given application server/content host from a previously set value, based on a detected interval change in the actual requests generated from a client or application (e.g., mobile application) on the mobile device 250.

For example, a request for which a monitoring rate was determined may now be sent from the application (e.g., mobile application) or client at a different request interval. The scheduled update engine 247A can determine the updated polling interval of the actual requests and generate a new rate, different from the previously set rate to poll the host at on behalf of the mobile device 250. The updated polling rate can be communicated to the remote proxy (proxy server 325) over the cellular network for the remote proxy to monitor the given host. In some instances, the updated polling rate may be determined at the remote proxy or remote entity which monitors the host.

In one embodiment, the time adjustment engine 247B can further optimize the poll schedule generated to monitor the application server/content source (110 or 310). For example, the time adjustment engine 247B can optionally specify a time to start polling to the proxy server. For example, in addition to setting the polling interval at which the proxy server is to monitor the application, server/content host can also specify the time at which an actual request was generated at the mobile client/application.

However, in some cases, due to inherent transmission delay or added network delays or other types of latencies, the remote proxy server receives the poll setup from the local proxy with some delay (e.g., a few minutes, or a few seconds). This has the effect of detecting response change at the source after a request is generated by the mobile client/application causing the invalidate of the cached response to occur after it has once again been served to the application after the response is no longer current or valid.

To resolve this non-optimal result of serving the out-dated content once again before invalidating it, the time adjustment engine 247B can specify the time (t0) at which polling should begin in addition to the rate, where the specified initial time t0 can be specified to the proxy server 325 as a time that is less than the actual time when the request was generated by the mobile app/client. This way, the server polls the resource slightly before the generation of an actual request by the mobile client such that any content change can be detected prior to an actual application request. This prevents invalid or irrelevant out-dated content/response from being served once again before fresh content is served.

In one embodiment, an outgoing request from a mobile device 250 is detected to be for a persistent connection (e.g., a long poll, COMET style push, and long-held (HTTP) request) based on timing characteristics of prior requests from the same application or client on the mobile device 250. For example, requests and/or corresponding responses can be tracked by the request/response tracking engine 238B of the long poll detector 238A of the poll interval detector 238.

The timing characteristics of the consecutive requests can be determined to set up a polling schedule for the application or client. The polling schedule can be used to monitor the content source (content source/application server) for content changes such that cached content stored on the local cache in the mobile device 250 can be appropriately managed (e.g., updated or discarded). In one embodiment, the timing characteristics can include, for example, a response delay time ('D') and/or an idle time ('IT').

In one embodiment, the response/request tracking engine 238B can track requests and responses to determine, compute, and/or estimate, the timing diagrams for applicant or client requests.

For example, the response/request tracking engine 238B detects a first request (Request 0) initiated by a client on the mobile device and a second request (Request 1) initiated by the client on the mobile device after a response is received at the mobile device responsive to the first request. The second request is one that is subsequent to the first request.

In one embodiment, the response/request tracking engine 238B can track requests and responses to determine, compute, and/or estimate the timing diagrams for applicant or client requests. The response/request tracking engine 238B can detect a first request initiated by a client on the mobile device and a second request initiated by the client on the mobile device after a response is received at the mobile device responsive to the first request. The second request is one that is subsequent to the first request.

The response/request tracking engine 238B further determines relative timings between the first, second requests, and the response received in response to the first request. In general, the relative timings can be used by the long poll detector 238A to determine whether requests generated by the application are long poll requests.

Note that in general, the first and second requests that are used by the response/request tracking engine 238B in computing the relative timings are selected for use after a long poll hunting period has settled or in the event when long poll hunting does not occur. Timing characteristics that are typical of a long poll hunting period is can be, for example, detected by the long poll hunting detector 238C. In other words, the requests tracked by the response/request tracking engine 238B and used for determining whether a given request is a long poll occurs after the long poll has settled.

In one embodiment, the long poll hunting detector 238C can identify or detect hunting mode, by identifying increasing request intervals (e.g., increasing delays). The long poll hunting detector 238A can also detect hunting mode by detecting increasing request intervals, followed by a request with no response (e.g., connection timed out), or by detecting increasing request intervals followed by a decrease in the interval. In addition, the long poll hunting detector 238C can apply a filter value or a threshold value to request-response time delay value (e.g., an absolute value) above which the detected delay can be considered to be a long poll request-response delay. The filter value can be any suitable value characteristic of long polls and/or network conditions (e.g., 2s, 5s, 10s, 15s, 20s., etc.) and can be used as a filter or threshold value.

The response delay time ('D') refers to the start time to receive a response after a request has been sent and the idle refers to time to send a subsequent request after the response has been received. In one embodiment, the outgoing request is detected to be for a persistent connection based on a comparison (e.g., performed by the tracking engine 238B) of the response delay time relative ('D') or average of ('D') (e.g., any average over any period of time) to the idle time ('IT'), for example, by the long poll detector 238A. The number of averages used can be fixed, dynamically adjusted, or changed over a longer period of time. For example, the requests initiated by the client are determined to be long poll requests if the response delay time interval is greater than the idle time interval (D>IT or D>>IT). In one embodiment, the tracking engine 238B of the long poll detector computes, determines, or estimates the response delay time interval as the amount of time elapsed between time of the first request and initial detection or full receipt of the response.

In one embodiment, a request is detected to be for a persistent connection when the idle time ('IT') is short since persistent connections, established in response to long poll requests or long poll HTTP requests for example, can also be characterized in detecting immediate or near-immediate issuance of a subsequent request after receipt of a response to a previous request (e.g., IT ~0). As such, the idle time ('IT') can also be used to detect such immediate or near-immediate re-request to identify long poll requests. The absolute or relative timings determined by the tracking engine 238B are used to determine whether the second request is immediately or near-immediately re-requested after the response to the first request is received. For example, a request may be categorized as a long poll request if D+RT+IT~D+RT since IT is small for this to hold true. IT may be determined to be small if it is less than a threshold value. Note that the threshold value could be fixed or calculated over a limited time period (a session, a day, a month, etc.), or calculated over a longer time period (e.g., several months or the life of the analysis). For example, for every request, the average IT can be determined, and the threshold can be determined using this average IT (e.g., the average IT less a certain percentage may be used as the threshold). This can allow the threshold to automatically adapt over time to network conditions and changes in server capability, resource availability or server response. A fixed threshold can take upon any value including by way of example but not limitation (e.g., 1 s. 2 s. 3 s. . . . etc.).

In one embodiment, the long poll detector 238A can compare the relative timings (e.g., determined by the tracker engine 238B) to request-response timing characteristics for other applications to determine whether the requests of the application are long poll requests. For example, the requests initiated by a client or application can be determined to be long poll requests if the response delay interval time ('D') or the average response delay interval time (e.g., averaged over x number of requests or any number of delay interval times averaged over x amount of time) is greater than a threshold value.

The threshold value can be determined using response delay interval times for requests generated by other clients, for example by the request/response tracking engine 238B and/or by the application profile generator 239 (e.g., the response delay interval tracker 239A). The other clients may reside on the same mobile device and the threshold value is determined locally by components on the mobile device. The threshold value can be determined for all requests over all resources server over all networks, for example. The threshold value can be set to a specific constant value (e.g., 30 seconds, for example) to be used for all requests, or any request which does not have an applicable threshold value (e.g., long poll is detected if D>30 seconds).

In some instances, the other clients reside on different mobile devices and the threshold can be determined by a proxy server (e.g., proxy server 325 of the host 300 shown in the example of FIG. 3A-B) which is external to the mobile device and able to communicate over a wireless network with the multiple different mobile devices, as will be further described with reference to FIG. 3B.

In one embodiment, the cache policy manager 245 sends the polling schedule to the proxy server (e.g., proxy server 145 or 325 shown in the examples of FIG. 1B and FIG. 3A) and can be used by the proxy server in monitoring the content source, for example, for changed or new content (updated response different from the cached response associated with a request or application). A polling schedule sent to the proxy can include multiple timing parameters including but not limited to interval (time from request 1 to request 2) or a time out interval (time to wait for response, used in long polls, for example). The timing intervals may all or in part be sent to the proxy server.

For example, in the case when the local proxy 275 detects a long poll, the various timing intervals in a request/response timing sequence (e.g., 'D', 'RT', and/or 'IT') can be sent to the proxy server 325 for use in polling the content source (e.g., application server/content host 110). The local proxy 275 can also identify to the proxy server 325 that a given application or request to be monitored is a long poll request (e.g., instructing the proxy server to set a 'long poll flag', for example). In addition, the proxy server uses the various timing intervals to determine when to send keep-alive indications on behalf of mobile devices.

The local cache invalidator 244 of the caching policy manager 245 can invalidate cache elements in the local cache (e.g., cache 185 or 285) when new or changed data (e.g., updated response) is detected from the application server/content source for a given request. The cached response can be determined to be invalid for the outgoing request based on a notification received from the proxy server (e.g., proxy 325 or the host server 300). The source which provides responses to requests of the mobile client can be monitored to determine relevancy of the cached response stored in the cache of the mobile device 250 for the request. For example, the cache invalidator 244 can further remove/delete the cached response from the cache of the mobile device when the cached response is no longer valid for a given request or a given application.

In one embodiment, the cached response is removed from the cache after it is provided once again to an application which generated the outgoing request after determining that the cached response is no longer valid. The cached response can be provided again without waiting for the time interval or provided again after waiting for a time interval (e.g., the time interval determined to be specific to emulate the response delay in a long poll). In one embodiment, the time interval is the response delay 'D' or an average value of the response delay 'D' over two or more values.

The new or changed data can be, for example, detected by the proxy server (e.g., proxy server 145 or 325 shown in the examples of FIG. 1B and FIG. 3A). When a cache entry for a given request/poll has been invalidated, the use of the radio on the mobile device 250 can be enabled (e.g., by the local proxy 275 or the cache policy manager 245) to satisfy the subsequent polling requests, as further described with reference to the interaction diagram of FIG. 4B.

One embodiment of the cache policy manager 245 includes a cache or connect selection engine 249 which can decide whether to use a locally cached entry to satisfy a poll/content request generated at the mobile device 250 by an application or widget. For example, the local proxy 275 or the cache policy manger 245 can intercept a polling request, made by an application (e.g., mobile application) on the mobile device, to contact the application server/content provider. The selection engine 249 can determine whether the content received for the intercepted request has been locally stored as cache elements for deciding whether the radio of the mobile device needs to be activated to satisfy the request made by the application (e.g., mobile application) and also determine whether the cached response is still valid for the outgoing request prior to responding to the outgoing request using the cached response.

In one embodiment, the local proxy 275, in response to determining that relevant cached content exists and is still valid, can retrieve the cached elements from the local cache to provide a response to the application (e.g., mobile application) which made the polling request such that a radio of the mobile device is not activated to provide the response to the application (e.g., mobile application). In general, the local proxy 275 continues to provide the cached response each time the outgoing request is received until the updated response different from the cached response is detected.

When it is determined that the cached response is no longer valid, a new request for a given request is transmitted over the wireless network for an updated response. The request can be transmitted to the application server/content provider (e.g., server/host 110) or the proxy server on the host server (e.g., proxy 325 on the host 300) for a new and updated response. In one embodiment the cached response can be provided again as a response to the outgoing request if a new response is not received within the time interval, prior to removal of the cached response from the cache on the mobile device.

Figure 2C:
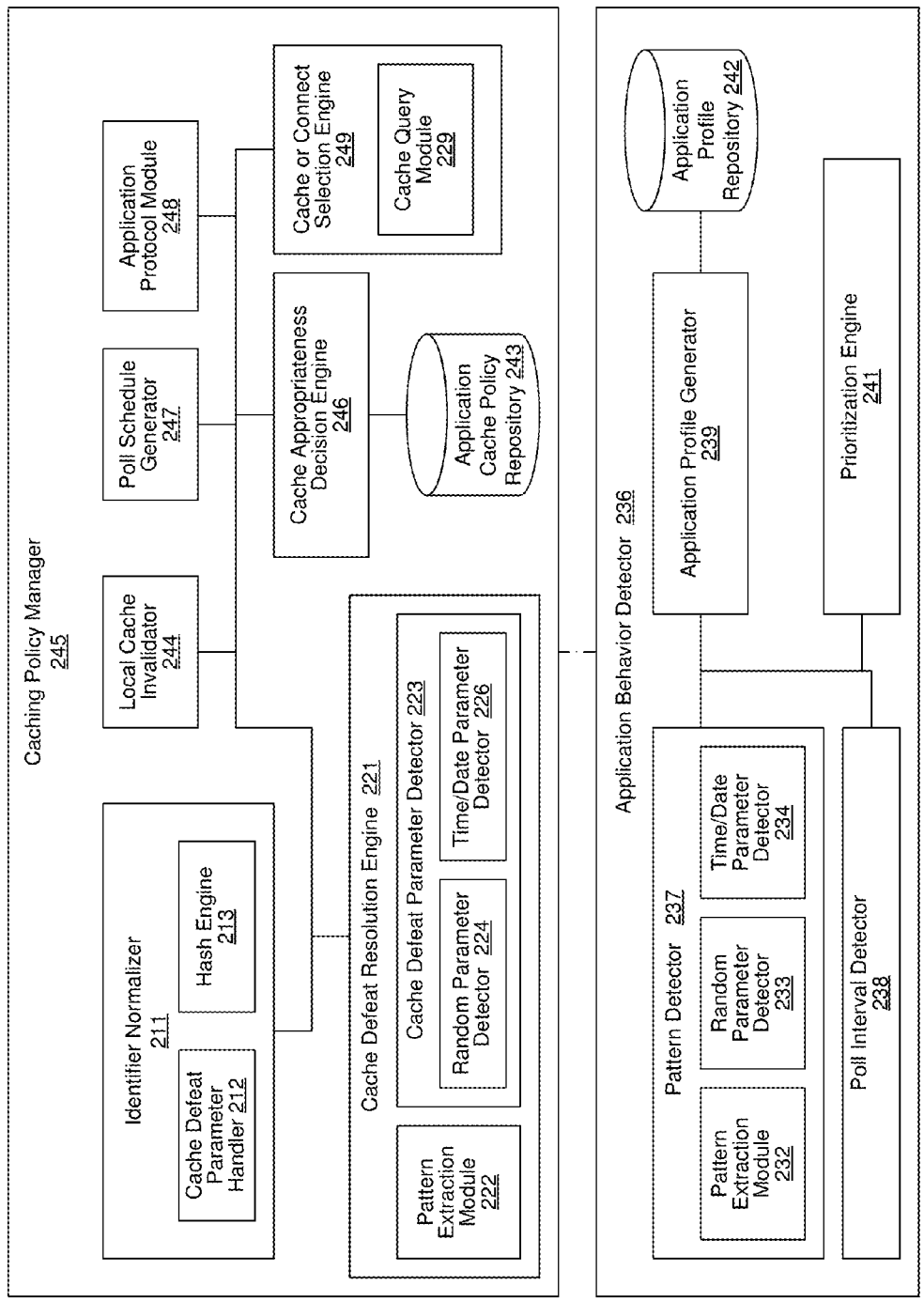
FIG. 2C depicts a block diagram illustrating a further example of components in a distributed proxy and cache system for providing APIs and API extensions to third party applications for optimizing and minimizing application traffic according to an embodiment of the subject matter described herein, which is further capable of detecting cache defeat and perform caching of content addressed by identifiers intended to defeat cache and which is further capable of performing mobile traffic categorization and policy implementation based on application behavior and/or user activity.

FIG. 2C depicts a block diagram illustrating a further example of components in a distributed proxy and cache system for providing APIs and API extensions to third party applications for optimizing and minimizing application traffic according to another embodiment of the subject matter described herein, which is further capable of detecting cache defeat and perform caching of content addressed by identifiers intended to defeat cache and which is further capable of performing mobile traffic categorization and policy implementation based on application behavior and/or user activity. FIG. 2C depicts a block diagram illustrating another example of components in the application behavior detector 236 and the caching policy manager 245 in the local proxy 275 on the client-side of the distributed proxy system shown in the example of FIG. 2A. The illustrated application behavior detector 236 and the caching policy manager 245 can, for example, enable the local proxy 275 to detect cache defeat and perform caching of content addressed by identifiers intended to defeat cache.

In one embodiment, the caching policy manager 245 includes a cache defeat resolution engine 221, an identifier formalizer 211, a cache appropriateness decision engine 246, a poll schedule generator 247, an application protocol module 248, a cache or connect selection engine 249 having a cache query module 229, and/or a local cache invalidator 244. The cache defeat resolution engine 221 can further include a pattern extraction module 222 and/or a cache defeat parameter detector 223. The cache defeat parameter detector 223 can further include a random parameter detector 224 and/or a time/date parameter detector 226. One embodiment further includes an application cache policy repository 243 coupled to the decision engine 246.

In one embodiment, the application behavior detector 236 includes a pattern detector 237, a poll interval detector 238, an application profile generator 239, and/or a priority engine 241. The pattern detector 237 can further include a cache defeat parameter detector 223 having also, for example, a random parameter detector 233 and/or a time/date parameter detector 234. One embodiment further includes an application profile repository 242 coupled to the application profile generator 239. The application profile generator 239, and the priority engine 241 have been described in association with the description of the application behavior detector 236 in the example of FIG. 2A.

The cache defeat resolution engine 221 can detect, identify, track, manage, and/or monitor content or content sources (e.g., servers or hosts) which employ identifiers and/or are addressed by identifiers (e.g., resource identifiers such as URLs and/or URIs) with one or more mechanisms that defeat cache or are intended to defeat cache. The cache defeat resolution engine 221 can, for example, detect from a given data request generated by an application or client that the identifier defeats or potentially defeats cache, where the data request otherwise addresses content or responses from a host or server (e.g., application server/content host 110 or 310) that is cacheable.

In one embodiment, the cache defeat resolution engine 221 detects or identifies cache defeat mechanisms used by content sources (e.g., application server/content host 110 or 310) using the identifier of a data request detected at the mobile device 250. The cache defeat resolution engine 221 can detect or identify a parameter in the identifier which can indicate that cache defeat mechanism is used. For example, a format, syntax, or pattern of the parameter can be used to identify cache defeat (e.g., a pattern, format, or syntax as determined or extracted by the pattern extraction module 222).

The pattern extraction module 222 can parse an identifier into multiple parameters or components and perform a matching algorithm on each parameter to identify any of which match one or more predetermined formats (e.g., a date and/or time format, as illustrated in parameters 702 shown in FIG. 7). For example, the results of the matching or the parsed out parameters from an identifier can be used (e.g., by the cache defeat parameter detector 223) to identify cache defeating parameters which can include one or more changing parameters.

The cache defeat parameter detector 223, in one embodiment can detect random parameters (e.g., by the random parameter detector 224) and/or time and/or date parameters which are typically used for cache defeat. The cache defeat parameter detector 223 can detect random parameters (e.g., as illustrated in parameters 752 shown in FIG. 7) and/or time/dates using commonly employed formats for these parameters and performing pattern matching algorithms and tests.

In addition to detecting patterns, formats, and/or syntaxes, the cache defeat parameter detector 223 further determines or confirms whether a given parameter is defeating cache and whether the addressed content can be cached by the distributed caching system. The cache defeat parameter detector 223 can detect this by analyzing responses received for the identifiers utilized by a given data request. In general, a changing parameter in the identifier is identified to indicate cache defeat when responses corresponding to multiple data requests are the same even when the multiple data requests uses identifiers with the changing parameter being different for each of the multiple data requests.

For example, at least two same responses may be required to identify the changing parameter as indicating cache defeat. In some instances, at least three same responses may be required. The requirement for the number of same responses needed to determine that a given parameter with a varying value between requests is cache defeating may be application specific, context dependent, and/or user dependent/user specified, or a combination of the above. Such a requirement may also be static or dynamically adjusted by the distributed cache system to meet certain performance thresholds and/or either explicit/implicit feedback regarding user experience (e.g., whether the user or application is receiving relevant/fresh content responsive to requests). More of the same responses may be required to confirm cache defeat, or for the system to treat a given parameter as intended for cache defeat if an application begins to malfunction due to response caching and/or if the user expresses dissatisfaction (explicit user feedback) or the system detects user frustration (implicit user cues).

The cache appropriateness decision engine 246 can detect, assess, or determine whether content from a content source (e.g., application server/content provider 110 in the example of FIG. 1B) with which a mobile device 250 interacts, has content that may be suitable for caching. In some instances, content from a given application server/content provider (e.g., the server/provider 110 of FIG. 1B) is determined to be suitable for caching based on a set of criteria (for example, criteria specifying time criticality of the content that is being requested from the content source). In one embodiment, the local proxy (e.g., the local proxy 175 or 275 of FIG. 1B and FIG. 2A) applies a selection criteria to store the content from the host server which is requested by an application as cached elements in a local cache on the mobile device to satisfy subsequent requests made by the application.

The selection criteria can also include, by way of example, but not limitation, state of the mobile device indicating whether the mobile device is active or inactive, network conditions, and/or radio coverage statistics. The cache appropriateness decision engine 246 can any one or any combination of the criteria, and in any order, in identifying sources for which caching may be suitable.

Once application servers/content providers having identified or detected content that is potentially suitable for local caching on the mobile device 250, the cache policy manager 245 can proceed to cache the associated content received from the identified sources by storing content received from the content source as cache elements in a local cache (e.g., local cache 185 or 285 shown in the examples of FIG. 1B and FIG. 2A, respectively) on the mobile device 250. The content source can also be identified to a proxy server (e.g., proxy server 145 or 325 shown in the examples of FIG. 1B and FIG. 3A, respectively) remote from and in wireless communication with the mobile device 250 such that the proxy server can monitor the content source (e.g., application server/content provider 110) for new or changed data. Similarly, the local proxy (e.g., the local proxy 175 or 275 of FIG. 1B and FIG. 2A, respectively) can identify to the proxy server that content received from a specific application server/content provider is being stored as cached elements in the local cache.

In one embodiment, cache elements are stored in the local cache 285 as being associated with a normalized version of an identifier for an identifier employing one or more parameters intended to defeat cache. The identifier can be normalized by the identifier normalizer module 211 and the normalization process can include, by way of example, one or more of: converting the URI scheme and host to lower-case, capitalizing letters in percent-encoded escape sequences, removing a default port, and removing duplicate slashes.

In another embodiment, the identifier is normalized by removing the parameter for cache defeat and/or replacing the parameter with a static value which can be used to address or be associated with the cached response received responsive to a request utilizing the identifier by the normalizer 211 or the cache defeat parameter handler 214. For example, the cached elements stored in the local cache 285 (shown in FIG. 2A) can be identified using the normalized version of the identifier or a hash value of the normalized version of the identifier. The hash value of an identifier or of the normalized identifier may be generated by the hash engine 213.

Once content has been locally cached, the cache policy manager 245 can, upon receiving future polling requests to contact the content server, retrieve the cached elements from the local cache to respond to the polling request made at the mobile device 250 such that a radio of the mobile device is not activated to service the polling request. Such servicing and fulfilling application (e.g., mobile application) requests locally via local cache entries allow for more efficient resource and mobile network traffic utilization and management since network bandwidth and other resources need not be used to request/receive poll responses which may have not changed from a response that has already been received at the mobile device 250.

One embodiment of the cache policy manager 245 includes a poll schedule generator 247 which can generate a polling schedule for one or more applications on the mobile device 250. The polling schedule can specify a polling interval that can be employed by the proxy server (e.g., proxy server 145 or 325 shown in the examples of FIG. 1B and FIG. 3A) in monitoring the content source for one or more applications. The polling schedule can be determined, for example, based on the interval between the polling requests directed to the content source from the mobile device. In one embodiment, the poll interval detector 238 of the application behavior detector can monitor polling requests directed to a content source from the mobile device 250 in order to determine an interval between the polling requests made from any or all application (e.g., mobile application).

In one embodiment, the cache policy manager 245 sends the polling schedule is sent to the proxy server (e.g., proxy server 145 or 325 shown in the examples of FIG. 1B and FIG. 3A) and can be used by the proxy server in monitoring the content source, for example, for changed or new content. The local cache invalidator 244 of the caching policy manager 245 can invalidate cache elements in the local cache (e.g., cache 185 or 285) when new or changed data is detected from the application server/content source for a given request. The new or changed data can be, for example, detected by the proxy server. When a cache entry for a given request/poll has been invalidated and/or removed (e.g., deleted from cache) after invalidation, the use of the radio on the mobile device 250 can be enabled (e.g., by the local proxy or the cache policy manager 245) to satisfy the subsequent polling requests, as further described with reference to the interaction diagram of FIG. 4B.

In another embodiment, the proxy server (e.g., proxy server 145 or 325 shown in the examples of FIG. 1B and FIG. 3A) uses a modified version of a resource identifier used in a data request to monitor a given content source (the application server/content host 110 of FIG. 1A and FIG. 1B to which the data request is addressed) for new or changed data. For example, in the instance where the content source or identifier is detected to employ cache defeat mechanisms, a modified (e.g., normalized) identifier can be used instead to poll the content source. The modified or normalized version of the identifier can be communicated to the proxy server by the caching policy manager 245, or more specifically the cache defeat parameter handler 214 of the identifier normalizer 211.

The modified identifier used by the proxy server to poll the content source on behalf of the mobile device/application (e.g., mobile application) may or may not be the same as the normalized identifier. For example, the normalized identifier may be the original identifier with the changing cache defeating parameter removed whereas the modified identifier uses a substitute parameter in place of the parameter that is used to defeat cache (e.g., the changing parameter replaced with a static value or other predetermined value known to the local proxy and/or proxy server). The modified parameter can be determined by the local proxy 275 and communicated to the proxy server. The modified parameter may also be generated by the proxy server (e.g., by the identifier modifier module 353 shown in the example of FIG. 3C).

One embodiment of the cache policy manager 245 includes a cache or connect selection engine 249 which can decide whether to use a locally cached entry to satisfy a poll/content request generated at the mobile device 250 by an application or widget. For example, the local proxy 275 or the cache policy manger 245 can intercept a polling request made by an application (e.g., mobile application) on the mobile device, to contact the application server/content provider. The selection engine 249 can determine whether the content received for the intercepted request has been locally stored as cache elements for deciding whether the a radio of the mobile device needs to be activated to satisfy the request made by the application (e.g., mobile application). In one embodiment, the local proxy 275, in response to determining that relevant cached content exists and is still valid, can retrieve the cached elements from the local cache to provide a response to the application (e.g., mobile application) which made the polling request such that a radio of the mobile device is not activated to provide the response to the application (e.g., mobile application).

In one embodiment, the cached elements stored in the local cache 285 (shown in FIG. 2A) can be identified using a normalized version of the identifier or a hash value of the normalized version of the identifier, for example, using the cache query module 229. Cached elements can be stored with normalized identifiers which have cache defeating parameters removed or otherwise replaced such that the relevant cached elements can be identified and retrieved in the future to satisfy other requests employing the same type of cache defeat. For example, when an identifier utilized in a subsequent request is determined to be utilizing the same cache defeating parameter, the normalized version of this identifier can be generated and used to identify a cached response stored in the mobile device cache to satisfy the data request. The hash value of an identifier or of the normalized identifier may be generated by the hash engine 213 of the identifier normalizer 211.

Figure 2D:
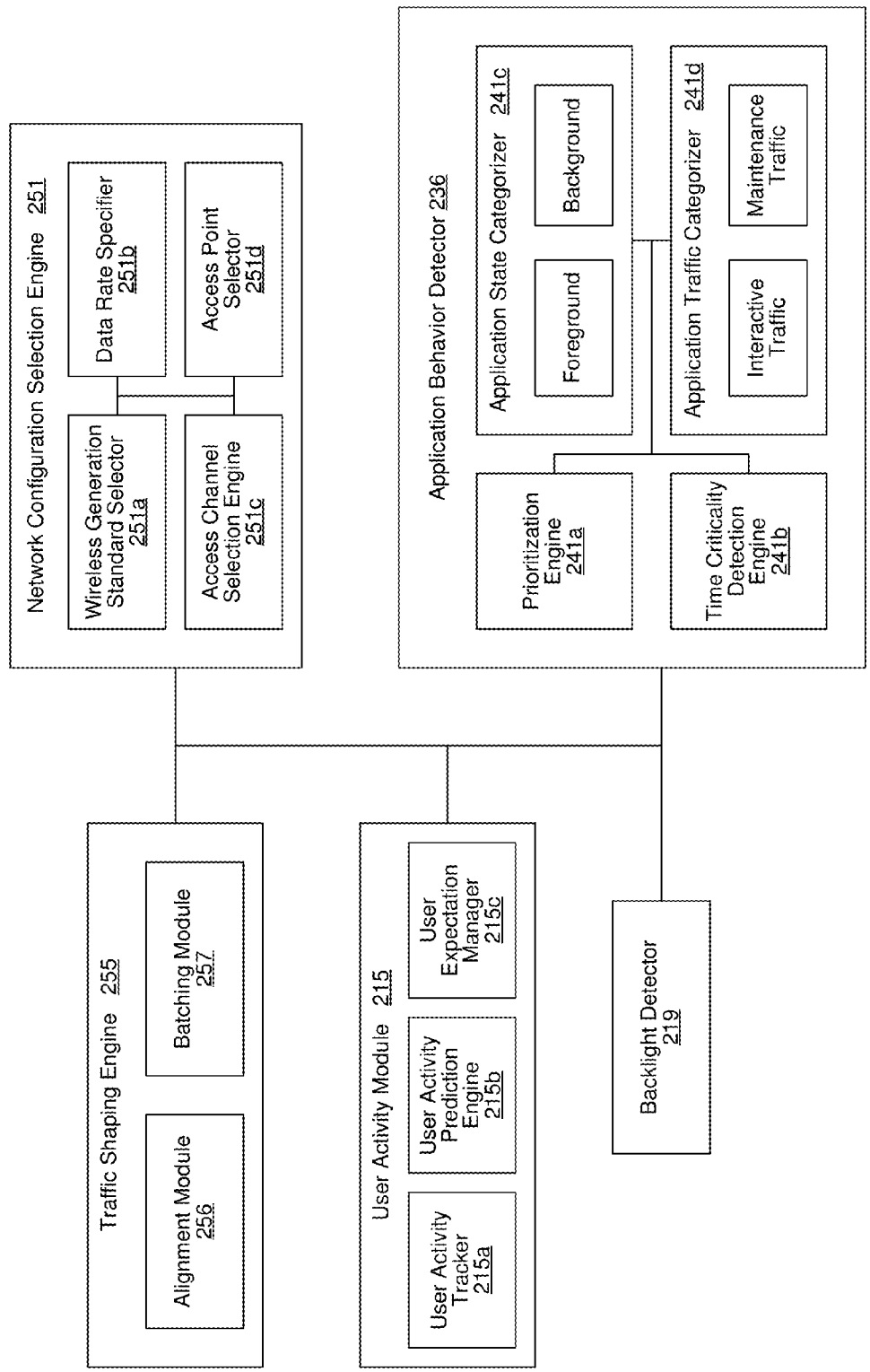
FIG. 2D depicts a block diagram illustrating examples of additional components in the local cache of a distributed proxy and cache system for providing APIs and API extensions to third party applications for optimizing and minimizing application traffic according to an embodiment of the subject matter described herein, which is further capable of performing mobile traffic categorization and policy implementation based on application behavior and/or user activity.

FIG. 2D depicts a block diagram illustrating examples of additional components in the local cache of a distributed proxy and cache system for providing APIs and API extensions to third party applications for optimizing and minimizing application traffic according to another embodiment of the subject matter described herein. FIG. 2D depicts a block diagram illustrating examples of additional components in the local proxy 275 shown in the example of FIG. 2A which is further capable of performing mobile traffic categorization and policy implementation based on application behavior and/or user activity.

In this embodiment of the local proxy 275, the user activity module 215 further includes one or more of, a user activity tracker 215A, a user activity prediction engine 215B, and/or a user expectation manager 215C. The application behavior detect 236 can further include a prioritization engine 241A, a time criticality detection engine 241B, an application state categorizer 241C, and/or an application traffic categorizer 241D. The local proxy 275 can further include a backlight detector 219 and/or a network configuration selection engine 251. The network configuration selection engine 251 can further include, one or more of, a wireless generation standard selector 251A, a data rate specifier 251B, an access channel selection engine 251C, and/or an access point selector.

In one embodiment, the application behavior detector 236 is able to detect, determined, identify, or infer, the activity state of an application on the mobile device 250 to which traffic has originated from or is directed to, for example, via the application state categorizer 241C and/or the traffic categorizer 241D. The activity state can be determined by whether the application is in a foreground or background state on the mobile device (via the application state categorizer 241C) since the traffic for a foreground application vs. a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/ interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241A) and/or is not time-critical (e.g., by the time criticality detection engine 214B).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241A) and/or as being time critical/time sensitive (e.g., by the time criticality detection engine 241B).

The time criticality detection engine 241B can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as a add-friend or delete-friend request, certain types of messages, or other information which does not frequently changing by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g, using the alignment module 256 and/or the batching module 257). The alignment module 256 can also align polling requests occurring close in time directed to the same host server, since these request are likely to be responded to with the same data.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215A. The traffic resulting therefrom can then be categorized appropriately for subsequent processing to determine the policy for handling. Furthermore, user activity can be predicted or anticipated by the user activity prediction engine 215B. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215C and/or in conjunction with the activity tracker 215 and/or the prediction engine 215B) to ensure that traffic is categorized appropriately such that user expectations are generally met. For example, a user-initiated action should be analyzed (e.g., by the expectation manager 215) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for to transmit data contained in traffic directed to the mobile device which responds to foreground activities.

In categorizing traffic and defining a transmission policy for mobile traffic, a network configuration can be selected for use (e.g., by the network configuration selection engine 251) on the mobile device 250 in sending traffic between the mobile device and a proxy server (325) and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

The network configuration selection engine 2510 can select or specify one or more of, a generation standard (e.g., via wireless generation standard selector 251A), a data rate (e.g., via data rate specifier 251B), an access channel (e.g., access channel selection engine 251C), and/or an access point (e.g., via the access point selector 251D), in any combination.

For example, a more advanced generation (e.g, 3G, LTE, or 4G or later) can be selected or specified for traffic when the activity state is in interaction with a user or in a foreground on the mobile device. Contrastingly, an older generation standard (e.g., 2G, 2.5G, or 3G or older) can be specified for traffic when one or more of the following is detected, the application is not interacting with the user, the application is running in the background on the mobile device, or the data contained in the traffic is not time critical, or is otherwise determined to have lower priority.

Similarly, a network configuration with a slower data rate can be specified for traffic when one or more of the following is detected, the application is not interacting with the user, the application is running in the background on the mobile device, or the data contained in the traffic is not time critical. The access channel (e.g., Forward access channel or dedicated channel) can be specified.

Figure 2E:
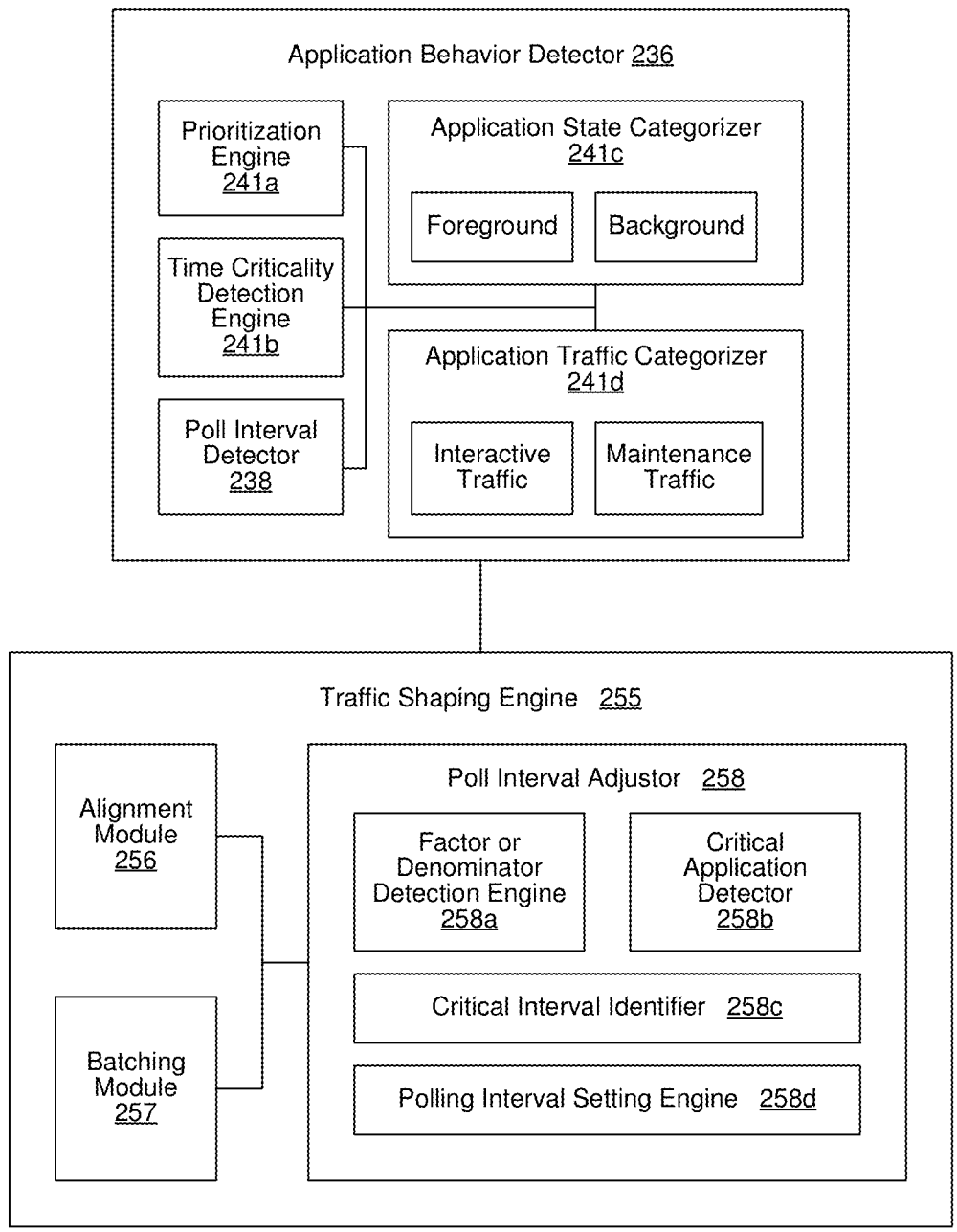
FIG. 2E depicts a block diagram illustrating examples of additional components in the traffic shaping engine and the application behavior detector of a distributed proxy and cache system for providing APIs and API extensions to third party applications for optimizing and minimizing application traffic according to an embodiment of the subject matter described herein, which are further capable of facilitating alignment of incoming data transfer to a mobile or broadband device, or its user, to optimize the number of connections that need to be established for receiving data over the wireless network or broadband network.

FIG. 2E depicts a block diagram illustrating examples of additional components in the traffic shaping engine and the application behavior detector of a distributed proxy and cache system for providing APIs and API extensions to third party applications for optimizing and minimizing application traffic according to another embodiment of the subject matter described herein, which are further capable of facilitating alignment of incoming data transfer to a mobile or broadband device, or its user, to optimize the number of connections that need to be established for receiving data over the wireless network or broadband network. FIG. 2E depicts a block diagram illustrating examples of additional components in the traffic shaping engine 255 and the application behavior detector 236 shown in the example of FIG. 2A which are further capable of facilitating alignment of incoming data transfer to a mobile or broadband device, or its user, to optimize the number of connections that need to be established for receiving data over the wireless network or broadband network.

In one embodiment of the local proxy 275, the traffic shaping engine 255, in addition to the alignment module 256, batching module 257, further includes a poll interval adjuster 258. The poll interval adjuster 258 can include a factor or denominator detection engine 258A, a critical application detector 258B, a critical interval identifier 258C, and/or a polling interval setting engine 258D. Further in one embodiment, the application behavior detector 236 of the local proxy 275 further includes a poll interval detector 238.

In facilitating alignment of data bursts across various services or hosts to the mobile device 250, the local proxy 275 can initially determine, detect, identify, compute, infer, extract the an original or default polling interval for applications or mobile clients on the mobile device 250 (e.g., by the poll interval detector 238). The original or default polling interval is typically that characteristic of the mobile application itself and/or its host (e.g., its corresponding application server/content host 110 shown in FIG. 1A-1B). The poll interval detector 238 can detect the original or default poll interval for any number or all of the mobile applications which regularly poll their application servers or hosts for use by the proxy 275 in generating or adjusting the polling intervals suitable for use for the device 250 based on the applications installed thereon and their respective poll timing characteristics.

For example, the poll intervals (original or default) of the mobile clients or applications on device 250 can be used by the poll interval adjuster 258. In general, an adjusted polling interval for a first service is generated based on a polling interval of a second service, which may be serviced by a distinct host from the first service (e.g., Twitter=service 1; ESPN.com=service 2). The adjusted polling interval computed for the first service and/or the second service, can be used in aligning at least some traffic received from the distinct hosts due to access on a mobile device of first and second services.

For example, in one embodiment, the adjusted polling interval of the first service can be a factor or denominator that the original polling interval of the first service has in common with the original polling interval of the second service (e.g., as determined by the factor or denominator detection engine 258A), and can further be determined based on an original polling interval of the first service. Note that the adjusted polling interval of the first service need not be different from the original polling interval of the first service when the original polling interval of the first service and the polling interval of the second service are factors or denominators of each other.

In one embodiment, the detection engine 258A is able to further determine multiples of a factor or denominator of the polling interval of the second service and the adjusted polling interval of the first service is a multiple of a factor or a multiple of a denominator of the polling interval of the second service. In addition, the engine 258A can determine multiples of a common factor or a common denominator of a majority number of the default polling intervals for multiple applications on the device 250.

In addition, the adjusted polling interval of the first service can be further determined, adjusted, or reconfigured (e.g., by the polling interval setting engine 258D), based on time criticality of traffic from the first service relative to time criticality of traffic from the second service, or additional services on the mobile device 250. For example, the critical application detector 258B can identify, detect, or receive input identifying or specifying one or more applications on the device 250 as being more critical than others (e.g., higher priority, time sensitive content/traffic, user preferred application, OS sponsored application, operator-sponsored content, etc.) and further adjust the polling intervals of the first and/or second services if need.

For example, the critical application detector 258B can identify a critical application as being the most time critical of all applications on the mobile device, or a set of applications for which data burst alignment is being applied or attempted on. For the critical application (s), the polling interval of the critical application is identified as a minimum critical interval (e.g., by the critical interval identifier 258C), which is not to be exceeded in assigning an updated polling interval for the critical application such that the priority in data needs (e.g., whether it is a user-need, device-need, or application-need) for prompt and timely delivery of data from the application server or content host.

High priority information/data or application can include, for example, financial data, sporting data or other data constantly changing in nature, any data whose previous values have little to no relevancy, any data (e.g., subscriptions or feeds) that a user wishes to be immediately notified of in real time or near real time, any specific feature indicated as a real time or near real time feature by the application server/content host (e.g., real-time status updates, or real-time notifications, high priority email or other messages, IM messages, etc.) or applications servicing any type of high priority/time sensitive content.

Once the polling intervals of one or more applications on the mobile device 250 have been set, the local proxy 275 communicates a polling schedule including the adjusted polling interval (s) to a proxy server (eg., remote proxy 325 of FIG. 3A-3E) for use in aligning, in time, at least some traffic received from the distinct hosts due to access on the mobile device of first and second services, and any additional services.

In one embodiment, the poll interval setting engine 258D also selecting a common starting point in time for an initial poll of the content hosts servicing the multiple applications. The poll interval setting engine 258D can set the start time to be anchored to the same absolute point in time across the multiple applications on the device 250. In general, the application servers/content hosts are typically in UTC and use NTP to stay at the same time. For example, the interval setting engine 258D can pick any minute mark, second mark, hour mark, or other time indicators, and communicate this to the remote proxy server (e.g., proxy 325) as part of the adjusted polling parameter. The mark can be selected randomly used by all applications as the common 'initial time t0.'

Note that while the above description uses an example of two applications, the same process can be performed for any number of applications or all applications/clients on the mobile device 250. In some instances, some or all of the functions performed by one or more of the components poll interval adjustor 258 can be performed remotely, for example, at a remote proxy server (e.g., proxy 325) using the poll intervals detected locally at the mobile device 250 (e.g., by the poll interval detector 238). Note that the remote proxy (e.g., proxy 325) can receive poll intervals for applications across multiple devices and track adjusted intervals for applications on multiple devices, as will be further described with the example of FIG. 3E.

FIG. 3A depicts a block diagram illustrating an example of server-side components of a distributed proxy and cache system for providing APIs and API extensions to third party applications for optimizing and minimizing application traffic according to another embodiment of the subject matter described herein. FIG. 3A depicts a block diagram illustrating an example of server-side components in a distributed proxy and cache system residing on a host server 300 that manages traffic in a wireless network for resource conservation. The server-side proxy (or proxy server 325) can further categorize mobile traffic and/or implement delivery policies based on application behavior, content priority, user activity, and/or user expectations and can also facilitate using a user as an end point for profiling and optimizing the delivery of content and data in a wireless network.

The host server 300 generally includes, for example, a network interface 308 and/or one or more repositories 314, 314, and 316. Note that server 300 may be any portable/mobile or non-portable device, server, cluster of computers and/or other types of processing units (e.g., any number of a machine shown in the example of FIG. 11) able to receive or transmit signals to satisfy data requests over a network including any wired or wireless networks (e.g., WiFi, cellular, Bluetooth, etc.).

The network interface 308 can include networking module(s) or devices(s) that enable the server 300 to mediate data in a network with an entity that is external to the host server 300, through any known and/or convenient communications protocol supported by the host and the external entity. Specifically, the network interface 308 allows the server 300 to communicate with multiple devices including mobile phone devices 350 and/or one or more application servers/content providers 310.

The host server 300 can store information about connections (e.g., network characteristics, conditions, types of connections, etc.) with devices in the connection metadata repository 314. Additionally, any information about third party application or content providers can also be stored in the repository 314. The host server 300 can store information about devices (e.g., hardware capability, properties, device settings, device language, network capability, manufacturer, device model, OS, OS version, etc.) in the device information repository 314. Additionally, the host server 300 can store information about network providers and the various network service areas in the network service provider repository 316.

The communication enabled by network interface 308 allows for simultaneous connections (e.g., including cellular connections) with devices 350 and/or connections (e.g., including wired/wireless, HTTP, Internet connections, LAN, WiFi, etc.) with content servers/providers 310 to manage the traffic between devices 350 and content providers 310, for optimizing network resource utilization and/or to conserver power (battery) consumption on the serviced devices 350. The host server 300 can communicate with mobile devices 350 serviced by different network service providers and/or in the same/different network service areas. The host server 300 can operate and is compatible with devices 350 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 308 can include one or more of a network adaptor card, a wireless network interface card (e.g., SMS interface, WiFi interface, interfaces for various generations of mobile communication standards including but not limited to 1G, 2G, 3G, 3.5G, 4G type networks such as LTE, WiMAX, etc.), Bluetooth, WiFi, or any other network whether or not connected via a router, an access point, a wireless router, a switch, a multilayer switch, a protocol converter, a gateway, a bridge, a bridge router, a hub, a digital media receiver, and/or a repeater.

The host server 300 can further include server-side components of the distributed proxy and cache system which can include a proxy server 325 and a server cache 335. In one embodiment, the proxy server 325 can include an HTTP access engine 345, a caching policy manager 355, a proxy controller 365, a traffic shaping engine 375, a new data detector 347 and/or a connection manager 395.

The HTTP access engine 345 may further include a heartbeat manager 398; the proxy controller 365 may further include a data invalidator module 368; the traffic shaping engine 375 may further include a control protocol 376 and a batching module 377. Additional or less components/modules/engines can be included in the proxy server 325 and each illustrated component.

As used herein, a "module," a "manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of a device (e.g., mobile device 350) making an application or content request to an application server or content provider 310, the request may be intercepted and routed to the proxy server 325 which is coupled to the device 350 and the application server/content provider 310. Specifically, the proxy server is able to communicate with the local proxy (e.g., proxy 175 and 275 of the examples of FIG. 1 and FIG. 2 respectively) of the mobile device 350, the local proxy forwards the data request to the proxy server 325 in some instances for further processing and, if needed, for transmission to the application server/content server 310 for a response to the data request.

In such a configuration, the host 300, or the proxy server 325 in the host server 300 can utilize intelligent information provided by the local proxy in adjusting its communication with the device in such a manner that optimizes use of network and device resources. For example, the proxy server 325 can identify characteristics of user activity on the device 350 to modify its communication frequency. The characteristics of user activity can be determined by, for example, the activity/behavior awareness module 366 in the proxy controller 365 via information collected by the local proxy on the device 350.

In one embodiment, communication frequency can be controlled by the connection manager 395 of the proxy server 325, for example, to adjust push frequency of content or updates to the device 350. For instance, push frequency can be decreased by the connection manager 395 when characteristics of the user activity indicate that the user is inactive. In one embodiment, when the characteristics of the user activity indicate that the user is subsequently active after a period of inactivity, the connection manager 395 can adjust the communication frequency with the device 350 to send data that was buffered as a result of decreased communication frequency to the device 350.

In addition, the proxy server 325 includes priority awareness of various requests, transactions, sessions, applications, and/or specific events. Such awareness can be determined by the local proxy on the device 350 and provided to the proxy server 325. The priority awareness module 367 of the proxy server 325 can generally assess the priority (e.g., including time-criticality, time-sensitivity, etc.) of various events or applications; additionally, the priority awareness module 367 can track priorities determined by local proxies of devices 350.

In one embodiment, through priority awareness, the connection manager 395 can further modify communication frequency (e.g., use or radio as controlled by the radio controller 396) of the server 300 with the devices 350. For example, the server 300 can notify the device 350, thus requesting use of the radio if it is not already in use when data or updates of an importance/priority level which meets a criteria becomes available to be sent.

In one embodiment, the proxy server 325 can detect multiple occurrences of events (e.g., transactions, content, data received from server/provider 310) and allow the events to accumulate for batch transfer to device 350. Batch transfer can be cumulated and transfer of events can be delayed based on priority awareness and/or user activity/application behavior awareness as tracked by modules 367 and/or 366. For example, batch transfer of multiple events (of a lower priority) to the device 350 can be initiated by the batching module 377 when an event of a higher priority (meeting a threshold or criteria) is detected at the server 300. In addition, batch transfer from the server 300 can be triggered when the server receives data from the device 350, indicating that the device radio is already in use and is thus on. In one embodiment, the proxy server 325 can order the each messages/packets in a batch for transmission based on event/transaction priority such that higher priority content can be sent first in case connection is lost or the battery dies, etc.

In one embodiment, the server 300 caches data (e.g., as managed by the caching policy manager 355) such that communication frequency over a network (e.g., cellular network) with the device 350 can be modified (e.g., decreased). The data can be cached, for example, in the server cache 335 for subsequent retrieval or batch sending to the device 350 to potentially decrease the need to turn on the device 350 radio. The server cache 335 can be partially or wholly internal to the host server 300, although in the example of FIG. 3A it is shown as being external to the host 300. In some instances, the server cache 335 may be the same as and/or integrated in part or in whole with another cache managed by another entity (e.g., the optional caching proxy server 199 shown in the example of FIG. 1B), such as being managed by an application server/content provider 310, a network service provider, or another third party.

In one embodiment, content caching is performed locally on the device 350 with the assistance of host server 300. For example, proxy server 325 in the host server 300 can query the application server/provider 310 with requests and monitor changes in responses. When changed or new responses are detected (e.g., by the new data detector 347), the proxy server 325 can notify the mobile device 350 such that the local proxy on the device 350 can make the decision to invalidate (e.g., indicated as out-dated) the relevant cache entries stored as any responses in its local cache. Alternatively, the data invalidator module 368 can automatically instruct the local proxy of the device 350 to invalidate certain cached data, based on received responses from the application server/provider 310. The cached data is marked as invalid, and can get replaced or deleted when new content is received from the content server 310.

Note that data change can be detected by the detector 347 in one or more ways. For example, the server/provider 310 can notify the host server 300 upon a change. The change can also be detected at the host server 300 in response to a direct poll of the source server/provider 310. In some instances, the proxy server 325 can in addition, pre-load the local cache on the device 350 with the new/updated data. This can be performed when the host server 300 detects that the radio on the mobile device is already in use, or when the server 300 has additional content/data to be sent to the device 350.

One or more the above mechanisms can be implemented simultaneously or adjusted/configured based on application (e.g., different policies for different servers/providers 310). In some instances, the source provider/server 310 may notify the host 300 for certain types of events (e.g., events meeting a priority threshold level). In addition, the provider/server 310 may be configured to notify the host 300 at specific time intervals, regardless of event priority.

In one embodiment, the proxy server 325 of the host 300 can monitor/track responses received for the data request from the content source for changed results prior to returning the result to the mobile device, such monitoring may be suitable when data request to the content source has yielded same results to be returned to the mobile device, thus preventing network/power consumption from being used when no new changes are made to a particular requested. The local proxy of the device 350 can instruct the proxy server 325 to perform such monitoring or the proxy server 325 can automatically initiate such a process upon receiving a certain number of the same responses (e.g., or a number of the same responses in a period of time) for a particular request.

In one embodiment, the server 300, through the activity/behavior awareness module 366, is able to identify or detect user activity at a device that is separate from the mobile device 350. For example, the module 366 may detect that a user's message inbox (e.g., email or types of inbox) is being accessed. This can indicate that the user is interacting with his/her application using a device other than the mobile device 350 and may not need frequent updates, if at all.

The server 300, in this instance, can thus decrease the frequency with which new or updated content is sent to the mobile device 350, or eliminate all communication for as long as the user is detected to be using another device for access. Such frequency decrease may be application specific (e.g., for the application with which the user is interacting with on another device), or it may be a general frequency decrease (E.g., since the user is detected to be interacting with one server or one application via another device, he/she could also use it to access other services.) to the mobile device 350.

In one embodiment, the host server 300 is able to poll content sources 310 on behalf of devices 350 to conserve power or battery consumption on devices 350. For example, certain applications on the mobile device 350 can poll its respective server 310 in a predictable recurring fashion. Such recurrence or other types of application behaviors can be tracked by the activity/behavior module 366 in the proxy controller 365. The host server 300 can thus poll content sources 310 for applications on the mobile device 350 that would otherwise be performed by the device 350 through a wireless (e.g., including cellular connectivity). The host server can poll the sources 310 for new or changed data by way of the HTTP access engine 345 to establish HTTP connection or by way of radio controller 396 to connect to the source 310 over the cellular network. When new or changed data is detected, the new data detector 347 can notify the device 350 that such data is available and/or provide the new/changed data to the device 350.

In one embodiment, the connection manager 395 determines that the mobile device 350 is unavailable (e.g., the radio is turned off) and utilizes SMS to transmit content to the device 350, for instance, via the SMSC shown in the example of FIG. 1B. SMS is used to transmit invalidation messages, batches of invalidation messages, or even content in the case where the content is small enough to fit into just a few (usually one or two) SMS messages. This avoids the need to access the radio channel to send overhead information. The host server 300 can use SMS for certain transactions or responses having a priority level above a threshold or otherwise meeting a criteria. The server 300 can also utilize SMS as an out-of-band trigger to maintain or wake-up an IP connection as an alternative to maintaining an always-on IP connection.

In one embodiment, the connection manager 395 in the proxy server 325 (e.g., the heartbeat manager 398) can generate and/or transmit heartbeat messages on behalf of connected devices 350 to maintain a backend connection with a provider 310 for applications running on devices 350.

For example, in the distributed proxy system, local cache on the device 350 can prevent any or all heartbeat messages needed to maintain TCP/IP connections required for applications from being sent over the cellular, or other, network and instead rely on the proxy server 325 on the host server 300 to generate and/or send the heartbeat messages to maintain a connection with the backend (e.g., application server/provider 110 in the example of FIG. 1A). The proxy server can generate the keep-alive (heartbeat) messages independent of the operations of the local proxy on the mobile device.

The repositories 314, 314, and/or 316 can additionally store software, descriptive data, images, system information, drivers, and/or any other data item utilized by other components of the host server 300 and/or any other servers for operation. The repositories may be managed by a database management system (DBMS), for example, which may be but is not limited to Oracle, DB2, Microsoft Access, Microsoft SQL Server, PostgreSQL, MySQL, FileMaker, etc.

The repositories can be implemented via object-oriented technology and/or via text files and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 3B:
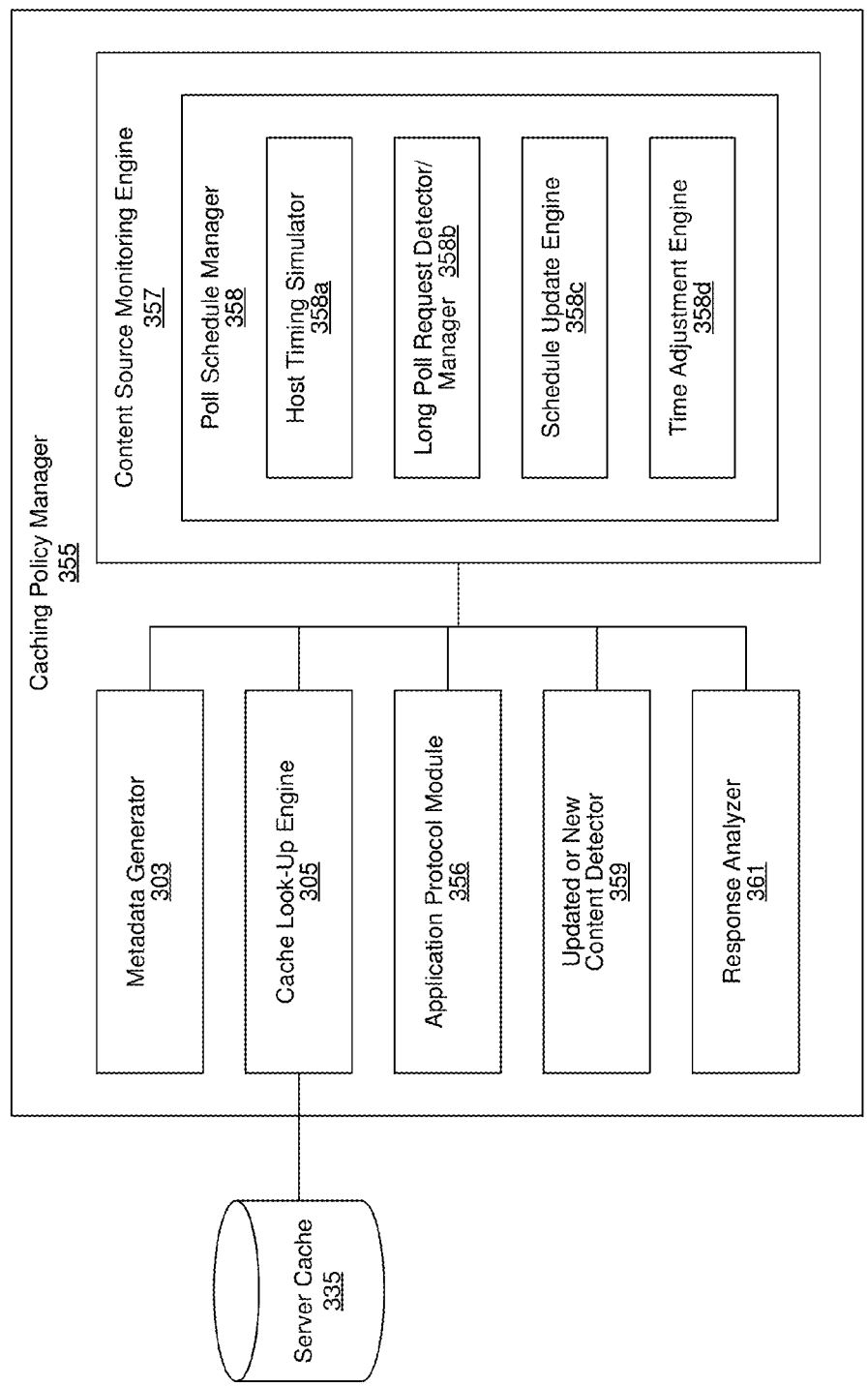
FIG. 3B depicts a block diagram illustrating a further example of components in the caching policy manager of a distributed proxy and cache system for providing APIs and API extensions to third party applications for optimizing and minimizing application traffic according to an embodiment of the subject matter described herein, which is capable of caching and adapting caching strategies for mobile application behavior and/or network conditions and which is also capable of detecting long poll requests and managing caching of long polls.

FIG. 3B depicts a block diagram illustrating a further example of components in the caching policy manager of a distributed proxy and cache system for providing APIs and API extensions to third party applications for optimizing and minimizing application traffic according to another embodiment of the subject matter described herein, which is capable of caching and adapting caching strategies for mobile application behavior and/or network conditions and which is also capable of detecting long poll requests and managing caching of long polls. FIG. 3B depicts a block diagram illustrating a further example of components in the caching policy manager 355 in the cache system shown in the example of FIG. 3A which is capable of caching and adapting caching strategies for application (e.g., mobile application) behavior and/or network conditions.

The caching policy manager 355, in one embodiment, can further include a metadata generator 303, a cache look-up engine 305, an application protocol module 356, a content source monitoring engine 357 having a poll schedule manager 358, a response analyzer 361, and/or an updated or new content detector 359. In one embodiment, the poll schedule manager 358 further includes a host timing simulator 358A, a long poll request detector/manager 358B, a schedule update engine 358C, and/or a time adjustment engine 358D. The metadata generator 303 and/or the cache look-up engine 305 can be coupled to the cache 335 (or, server cache) for modification or addition to cache entries or querying thereof.

In one embodiment, the proxy server (e.g., the proxy server 145 or 325 of the examples of FIG. 1B and FIG. 3A) can monitor a content source for new or changed data via the monitoring engine 357. The proxy server, as shown, is an entity external to the mobile device 250 of FIG. 2A-B. The content source (e.g., application server/content provider 110 of FIG. 1B) can be one that has been identified to the proxy server (e.g., by the local proxy) as having content that is being locally cached on a mobile device (e.g., mobile device 150 or 250). The content source can be monitored, for example, by the monitoring engine 357 at a frequency that is based on polling frequency of the content source at the mobile device. The poll schedule can be generated, for example, by the local proxy and sent to the proxy server. The poll frequency can be tracked and/or managed by the poll schedule manager 358.

For example, the proxy server can poll the host (e.g., content provider/application server) on behalf of the mobile device and simulate the polling behavior of the client to the host via the host timing simulator 358A. The polling behavior can be simulated to include characteristics of a long poll request-response sequences experienced in a persistent connection with the host (e.g., by the long poll request detector/manager 358B). Note that once a polling interval/behavior is set, the local proxy 275 on the device-side and/or the proxy server 325 on the server-side can verify whether application and application server/content host behavior match or can be represented by this predicted pattern. In general, the local proxy and/or the proxy server can detect deviations and, when appropriate, re-evaluate and compute, determine, or estimate another polling interval.

In one embodiment, the caching policy manager 355 on the server-side of the distribute proxy can, in conjunction with or independent of the proxy server 275 on the mobile device, identify or detect long poll requests. For example, the caching policy manager 355 can determine a threshold value to be used in comparison with a response delay interval time (interval time 'D' shown in the example timing diagram of FIG. 17A-B) in a request-response sequence for an application request to identify or detect long poll requests, possible long poll requests (e.g., requests for a persistent connection with a host with which the client communicates including, but not limited to, a long-held HTTP request, a persistent connection enabling COMET style push, request for HTTP streaming, etc.), or other requests which can otherwise be treated as a long poll request.

For example, the threshold value can be determined by the proxy 325 using response delay interval times for requests generated by clients/applications across mobile devices which may be serviced by multiple different cellular or wireless networks. Since the proxy 325 resides on host 300 is able to communicate with multiple mobile devices via multiple networks, the caching policy manager 355 has access to application/client information at a global level which can be used in setting threshold values to categorize and detect long polls.

By tracking response delay interval times across applications across devices over different or same networks, the caching policy manager 355 can set one or more threshold values to be used in comparison with response delay interval times for long poll detection. Threshold values set by the proxy server 325 can be static or dynamic, and can be associated with conditions and/or a time-to-live (an expiration time/date in relative or absolute terms).

In addition, the caching policy manager 355 of the proxy 325 can further determine the threshold value, in whole or in part, based on network delays of a given wireless network, networks serviced by a given carrier (service provider), or multiple wireless networks. The proxy 325 can also determine the threshold value for identification of long poll requests based on delays of one or more application server/content provider (e.g., 110) to which application (e.g., mobile application) or mobile client requests are directed.

The proxy server can detect new or changed data at a monitored content source and transmits a message to the mobile device notifying it of such a change such that the mobile device (or the local proxy on the mobile device) can take appropriate action (e.g., to invalidate the cache elements in the local cache). In some instances, the proxy server (e.g., the caching policy manager 355) upon detecting new or changed data can also store the new or changed data in its cache (e.g., the server cache 135 or 335 of the examples of FIG. 1B and FIG. 3A, respectively). The new/updated data stored in the server cache 335 can be used in some instances to satisfy content requests at the mobile device; for example, it can be used after the proxy server has notified the mobile device of the new/changed content and that the locally cached content has been invalidated.

The metadata generator 303, similar to the metadata generator 203 shown in the example of FIG. 2B, can generate metadata for responses cached for requests at the mobile device 250. The metadata generator 303 can generate metadata for cache entries stored in the server cache 335. Similarly, the cache look-up engine 305 can include the same or similar functions are those described for the cache look-up engine 205 shown in the example of FIG. 2B.

The response analyzer 361 can perform any or all of the functionalities related to analyzing responses received for requests generated at the mobile device 250 in the same or similar fashion to the response analyzer 246D of the local proxy shown in the example of FIG. 2B. Since the proxy server 325 is able to receive responses from the application server/content source 310 directed to the mobile device 250, the proxy server 325 (e.g., the response analyzer 361) can perform similar response analysis steps to determine cacheability, as described for the response analyzer of the local proxy. Examples of response analysis procedures are also described in conjunction with the flow charts shown in the examples of FIG. 11-13. The responses can be analyzed in addition to or in lieu of the analysis that can be performed at the local proxy 275 on the mobile device 250.

Furthermore, the schedule update engine 358C can update the polling interval of a given application server/content host based on application request interval changes of the application at the mobile device 250 as described for the schedule update engine in the local proxy 275. The time adjustment engine 358D can set an initial time at which polls of the application server/content host is to begin to prevent the serving of out of date content once again before serving fresh content as described for the schedule update engine in the local proxy 275. Both the schedule updating and the time adjustment algorithms can be performed in conjunction with or in lieu of the similar processes performed at the local proxy 275 on the mobile device 250.

Figure 3C:
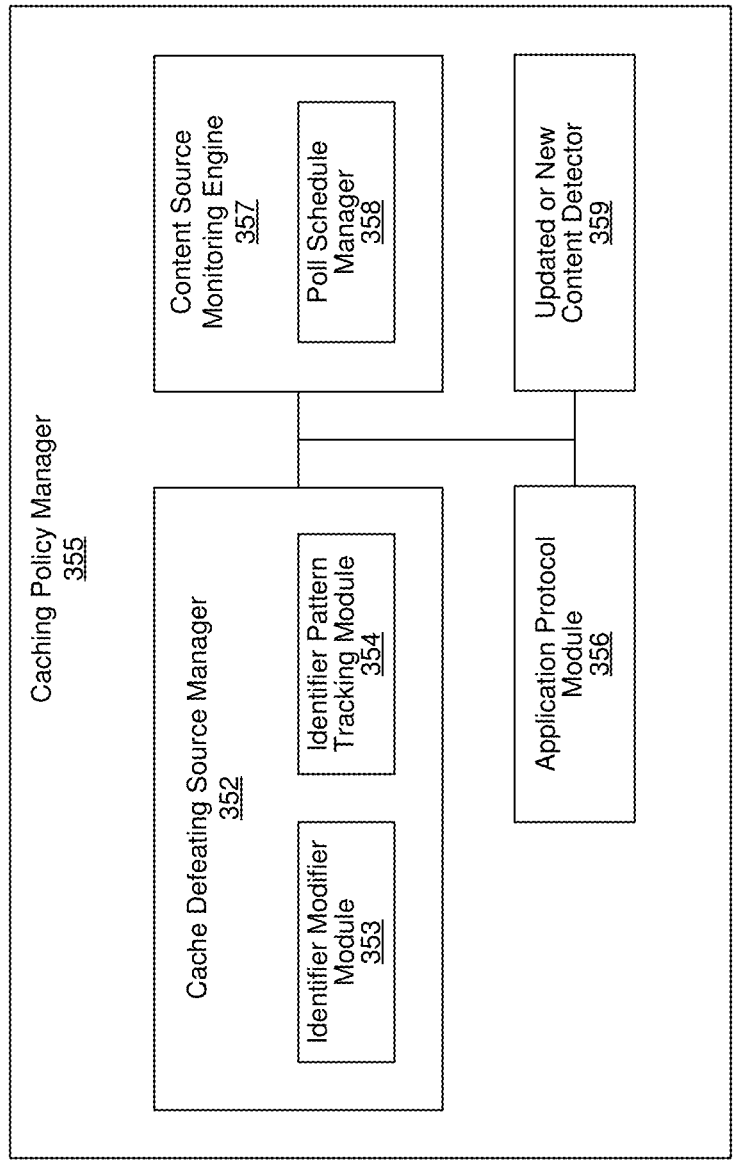
FIG. 3C depicts a block diagram illustrating another example of components of a distributed proxy and cache system for providing APIs and API extensions to third party applications for optimizing and minimizing application traffic according to an embodiment of the subject matter described herein, which is further capable of managing and detecting cache defeating mechanisms and monitoring content sources.

FIG. 3C depicts a block diagram illustrating another example of components of a distributed proxy and cache system for providing APIs and API extensions to third party applications for optimizing and minimizing application traffic according to another embodiment of the subject matter described herein, which is further capable of managing and detecting cache defeating mechanisms and monitoring content sources. FIG. 3C depicts a block diagram illustrating another example of components in the caching policy manager 355 in the proxy server 375 on the server-side of the distributed proxy system shown in the example of FIG. 3A which is capable of managing and detecting cache defeating mechanisms and monitoring content sources.

The caching policy manager 355, in one embodiment, can further include a cache defeating source manager 352, a content source monitoring engine 357 having a poll schedule manager 358, and/or an updated or new content detector 359. The cache defeating source manager 352 can further include an identifier modifier module 353 and/or an identifier pattern tracking module 354.

In one embodiment, the proxy server (e.g., the proxy server 145 or 325 of the examples of FIG. 1B and FIG. 3A) can monitor a content source for new or changed data via the monitoring engine 357. The content source (e.g., application server/content provider 110 of FIG. 1B or 310 of FIG. 3A) can be one that has been identified to the proxy server (e.g., by the local proxy) as having content that is being locally cached on a mobile device (e.g., mobile device 150 or 250). The content source 310 can be monitored, for example, by the monitoring engine 357 at a frequency that is based on polling frequency of the content source at the mobile device. The poll schedule can be generated, for example, by the local proxy and sent to the proxy server 325. The poll frequency can be tracked and/or managed by the poll schedule manager 358.

In one embodiment, the proxy server 325 uses a normalized identifier or modified identifier in polling the content source 310 to detect new or changed data (responses). The normalized identifier or modified identifier can also be used by the proxy server 325 in storing responses on the server cache 335. In general, the normalized or modified identifiers can be used when cache defeat mechanisms are employed for cacheable content. Cache defeat mechanisms can be in the form of a changing parameter in an identifier such as a URI or URL and can include a changing time/data parameter, a randomly varying parameter, or other types parameters.

The normalized identifier or modified identifier removes or otherwise replaces the changing parameter for association with subsequent requests and identification of associated responses and can also be used to poll the content source. In one embodiment, the modified identifier is generated by the cache defeating source manager 352 (e.g., the identifier modifier module 353) of the caching policy manager 355 on the proxy server 325 (server-side component of the distributed proxy system). The modified identifier can utilize a substitute parameter (which is generally static over a period of time) in place of the changing parameter that is used to defeat cache.

The cache defeating source manager 352 optionally includes the identifier pattern tracking module 354 to track, store, and monitor the various modifications of an identifier or identifiers that address content for one or more content sources (e.g., application server/content host 110 or 310) to continuously verify that the modified identifiers and/or normalized identifiers used by the proxy server 325 to poll the content sources work as predicted or intended (e.g., receive the same responses or responses that are otherwise still relevant compared to the original, unmodified identifier).

In the event that the pattern tracking module 354 detects a modification or normalization of an identifier that causes erratic or unpredictable behavior (e.g., unexpected responses to be sent) on the content source, the tracking module 354 can log the modification and instruct the cache defeating source manager 352 to generate another modification/normalization, or notify the local proxy (e.g., local proxy 275) to generate another modification/normalization for use in polling the content source. In the alternative or in parallel, the requests from the given mobile application/client on the mobile device (e.g., mobile device 250) can temporarily be sent across the network to the content source for direct responses to be provided to the mobile device and/or until a modification of an identifier which works can be generated.

In one embodiment, responses are stored as server cache elements in the server cache when new or changed data is detected for a response that is already stored on a local cache (e.g., cache 285) of the mobile device (e.g., mobile device 250). Therefore, the mobile device or local proxy 275 can connect to the proxy server 325 to retrieve the new or changed data for a response to a request which was previously cached locally in the local cache 285 (now invalid, out-dated, or otherwise determined to be irrelevant).

The proxy server 325 can detect new or changed data at a monitored application server/content host 310 and transmits a message to the mobile device notifying it of such a change such that the mobile device (or the local proxy on the mobile device) can take appropriate action (e.g., to invalidate the cache elements in the local cache). In some instances, the proxy server (e.g., the caching policy manager 355), upon detecting new or changed data, can also store the new or changed data in its cache (e.g., the server cache 135 or 335 of the examples of FIG. 1B and FIG. 3A, respectively). The updated/new data stored in the server cache can be used, in some instances, to satisfy content requests at the mobile device; for example, it can be used after the proxy server has notified the mobile device of the new/changed content and that the locally cached content has been invalidated.

Figure 3D:
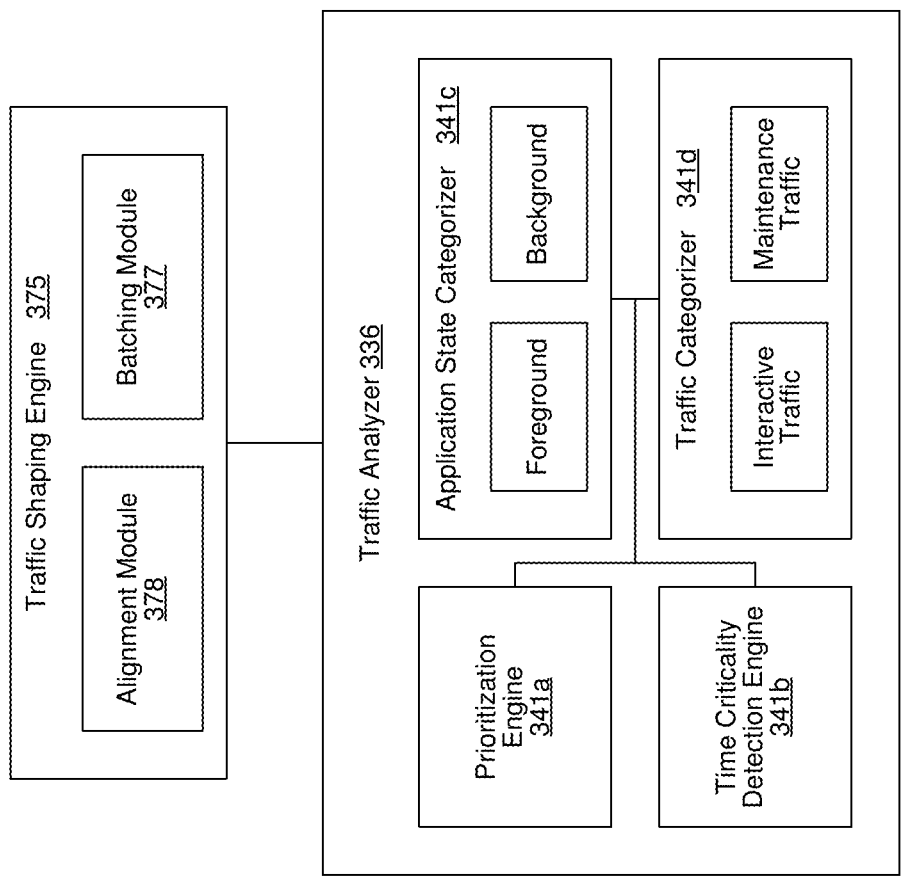
FIG. 3D depicts a block diagram illustrating examples of additional components of a distributed proxy and cache system for providing APIs and API extensions to third party applications for optimizing and minimizing application traffic according to an embodiment of the subject matter described herein, which is further capable of performing mobile traffic categorization and policy implementation based on application behavior and/or traffic priority.

FIG. 3D depicts a block diagram illustrating examples of additional components of a distributed proxy and cache system for providing APIs and API extensions to third party applications for optimizing and minimizing application traffic according to another embodiment of the subject matter described herein, which is further capable of performing mobile traffic categorization and policy implementation based on application behavior and/or traffic priority. FIG. 3D depicts a block diagram illustrating examples of additional components in proxy server 325 shown in the example of FIG. 3A which is further capable of performing mobile traffic categorization and policy implementation based on application behavior and/or traffic priority.

In one embodiment of the proxy server 325, the traffic shaping engine 375 is further coupled to a traffic analyzer 336 for categorizing mobile traffic for policy definition and implementation for mobile traffic and transactions directed to one or more mobile devices (e.g., mobile device 250 of FIG. 2A-2D) or to an application server/content host (e.g., 110 of FIG. 1A-1B). In general, the proxy server 325 is remote from the mobile devices and remote from the host server, as shown in the examples of FIG. 1A-1B. The proxy server 325 or the host server 300 can monitor the traffic for multiple mobile devices and is capable of categorizing traffic and devising traffic policies for different mobile devices.

In addition, the proxy server 325 or host server 300 can operate with multiple carriers or network operators and can implement carrier-specific policies relating to categorization of traffic and implementation of traffic policies for the various categories. For example, the traffic analyzer 336 of the proxy server 325 or host server 300 can include one or more of, a prioritization engine 341A, a time criticality detection engine 341B, an application state categorizer 341C, and/or an application traffic categorizer 341D.

Each of these engines or modules can track different criterion for what is considered priority, time critical, background/foreground, or interactive/maintenance based on different wireless carriers. Different criterion may also exist for different mobile device types (e.g., device model, manufacturer, operating system, etc.). In some instances, the user of the mobile devices can adjust the settings or criterion regarding traffic category and the proxy server 325 is able to track and implement these user adjusted/configured settings.

In one embodiment, the traffic analyzer 336 is able to detect, determined, identify, or infer, the activity state of an application on one or more mobile devices (e.g., mobile device 150 or 250) which traffic has originated from or is directed to, for example, via the application state categorizer 341C and/or the traffic categorizer 341D. The activity state can be determined based on whether the application is in a foreground or background state on one or more of the mobile devices (via the application state categorizer 341C) since the traffic for a foreground application vs. a background application may be handled differently to optimize network use.

In the alternate or in combination, the activity state of an application can be determined by the wirelessly connected mobile devices (e.g, via the application behavior detectors in the local proxies) and communicated to the proxy server 325. For example, the activity state can be determined, detected, identified, or inferred with a level of certainty of heuristics, based on the backlight status at mobile devices (e.g., by a backlight detector) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

The activity state can be determined from assessing, determining, evaluating, inferring, identifying user activity at the mobile device 250 (e.g., via the user activity module 215) and communicated to the proxy server 325. In one embodiment, the activity state is determined based on whether the traffic is interactive traffic or maintenance traffic. Interactive traffic can include transactions from responses and requests generated directly from user activity/ interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

The time criticality detection engine 341B can generally determine, identify, infer the time sensitivity of data contained in traffic sent from the mobile device 250 or to the mobile device from the host server 300 or proxy server 325, or the application server (e.g., app server/content source 110). For example, time sensitive data can include, status updates, stock information updates, IM presence information, email messages or other messages, actions generated from mobile gaming applications, webpage requests, location updates, etc.

Data that is not time sensitive or time critical, by nature of the content or request, can include requests to delete messages, mark-as-read or edited actions, application-specific actions such as a add-friend or delete-friend request, certain types of messages, or other information which does not frequently changing by nature, etc. In some instances when the data is not time critical, the timing with which to allow the traffic to be sent to a mobile device is based on when there is additional data that needs to the sent to the same mobile device. For example, traffic shaping engine 375 can align the traffic with one or more subsequent transactions to be sent together in a single power-on event of the mobile device radio (e.g, using the alignment module 378 and/or the batching module 377). The alignment module 378 can also align polling requests occurring close in time directed to the same host server, since these request are likely to be responded to with the same data.

In general, whether new or changed data is sent from a host server to a mobile device can be determined based on whether an application on the mobile device to which the new or changed data is relevant, is running in a foreground (e.g., by the application state categorizer 341C), or the priority or time criticality of the new or changed data. The proxy server 325 can send the new or changed data to the mobile device if the application is in the foreground on the mobile device, or if the application is in the foreground and in an active state interacting with a user on the mobile device, and/or whether a user is waiting for a response that would be provided in the new or changed data. The proxy server 325 (or traffic shaping engine 375) can send the new or changed data that is of a high priority or is time critical.

Similarly, the proxy server 325 (or the traffic shaping engine 375) can suppressing the sending of the new or changed data if the application is in the background on the mobile device. The proxy server 325 can also suppress the sending of the new or changed data if the user is not waiting for the response provided in the new or changed data; wherein the suppressing is performed by a proxy server coupled to the host server and able to wirelessly connect to the mobile device.

In general, if data, including new or change data is of a low priority or is not time critical, the proxy server can waiting to transfer the data until after a time period, or until there is additional data to be sent (e.g. via the alignment module 378 and/or the batching module 377).

Figure 3E:
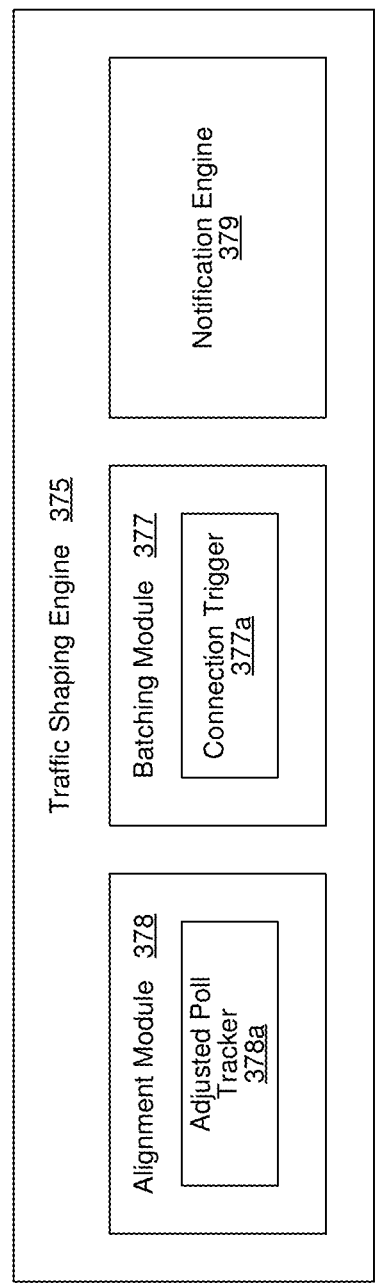
FIG. 3E depicts a block diagram illustrating examples of additional components in the traffic shaping engine of a distributed proxy and cache system for providing APIs and API extensions to third party applications for optimizing and minimizing application traffic according to an embodiment of the subject matter described herein, which is further capable of aligning data transfer to a mobile or broadband device, or other recipient, to optimize connections established for transmission in a wireless network or broadband network.

FIG. 3E depicts a block diagram illustrating examples of additional components in the traffic shaping engine of a distributed proxy and cache system for providing APIs and API extensions to third party applications for optimizing and minimizing application traffic according to another embodiment of the subject matter described herein, which is further capable of aligning data transfer to a mobile or broadband device, or other recipient, to optimize connections established for transmission in a wireless network or broadband network. FIG. 3E depicts a block diagram illustrating examples of additional components in the traffic shaping engine 375 of the example of FIG. 3A which is further capable of aligning data transfer to a mobile or broadband device, or other recipient, to optimize connections established for transmission in a wireless network or broadband network.

In one embodiment of the proxy server 325, the traffic shaping engine 375 further includes a notification engine 379 and the alignment module 378 includes an adjusted poll tracker 378A and the batching module 377 further includes a connection trigger 377A.

In one embodiment, the proxy server 325 is able to poll distinct hosts servicing various applications (e.g., first and second services) on a given mobile device at a schedule. The polling schedule can be set by the local proxy (e.g., proxy 275 of FIG. 2A-2E) and can include assigned polling intervals for applications on a mobile device (e.g., device 250) which may have been adjusted. The polling schedules can be tracked by the adjusted poll tracker 378A in the alignment module 378 of the traffic shaping engine 375 in the proxy server 325, for example. The adjusted polling intervals of one service/one application can be determined based on the polling interval of another service on the mobile device, such that data received at the remote proxy 325 can be provided to the mobile device in batch, for example, by the batching module 377.

The polling schedule can also include an initial start time (t0) to start polling on behalf of multiple applications on a given mobile device. The initial start time (e.g., a mutual starting point in time) of a first poll of the distinct hosts servicing the first and second services can be selected, for example, by the local proxy 275 (e.g., proxy 275 of FIG. 2A-2E), and in some instances, by the proxy server 325. When determined by the local proxy, the local proxy communicates the mutual starting point in time for polls to the proxy server 325. In one embodiment, the mutual starting point in time is set to be in the future to compensate for communication delay.

In one embodiment, if a given mobile client/mobile application is not on or active, or if a given mobile device 250 is not connected to the wireless network, the connection trigger 377A can send a trigger (e.g., out of band) trigger to the mobile device or the local proxy on the mobile device to request that the radio be powered and/or to activate one or more relevant applications. For example, the batching module 377 may have batched various content or data to be sent for multiple applications on a given mobile device and if the mobile clients/applications are not on or active, the connection trigger 377A can send a trigger requesting the application to activate. Alternatively, the notification engine 379 can send the mobile device 250 an indication that there is data ready to be sent, requesting the mobile device 250 to power on the radio if currently in off-mode.

Note that the proxy server 325 monitors multiple mobile devices and tracks application characteristics and user behavior/characteristics across multiple devices, users, and networks. Thus, the above described features pertaining to adjusted poll interval trackers, although drawn to an example directed to multiple applications on a given device, note that the same is tracked for multiple devices, having installed thereon its own other set of applications, for which adjusted poll intervals or polling schedules are computed based on applications on each mobile device by, for example the local proxy residing there on (e.g., the components illustrated in FIG. 2E of a local proxy 275 which may be installed on one or more of the multiple mobile devices serviced by the proxy server 325).

Note that since the proxy server 325 manages the traffic to/from multiple mobile devices, in one network, across networks, in one geographical locale, across multiple geographical locales, for one network operator, or across multiple network operators, the proxy server 325 can align traffic and batch transfer of data based on overview or aggregate data of traffic conditions or network conditions. The proxy server 325 can prioritize data transfer to mobile devices, for example, when network congestion is detected. For example, the proxy server 325 can transfer data to mobile devices where the type or level of subscription of the device user, tiered or staggered based on highest priority of content to be transferred to be the mobile devices (e.g., a batch of data may be transferred first to mobile device A, compared to mobile device B, when the highest priority data for device A is of higher priority than device B).

Note that there may be one proxy server 325 for a geographical locale, or for a specific network operator, for a type of web service, or any combination of the above, for example. Based on the different servicing entities, the proxy server 325 can aggregate different types of information pertaining to network traffic, operator settings, application preferences/requirements, user preferences, subscription-related parameters, various combination of the above can be used by the proxy 325 in optimizing connections need to be established by receiving mobile devices. Multiple proxy servers 325 servicing different networks in a geographical locale, different operators can share traffic, subscription, user, or application level information there between, to further facilitate network resource utilization, traffic management, and in some instances to facilitate alignment of data transfer to mobile devices.

Figure 4A:
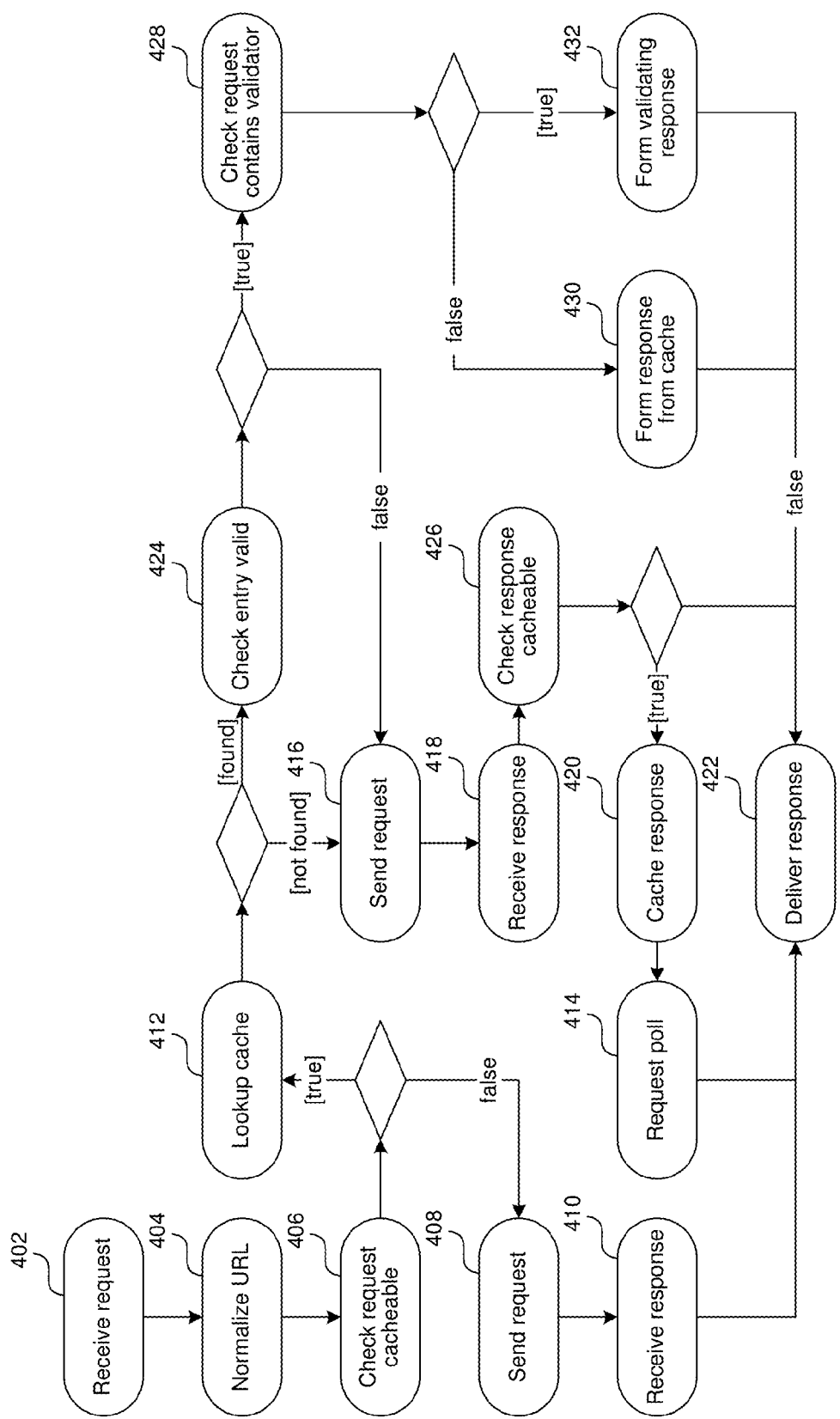
FIG. 4A depicts a flow diagram illustrating an example process for distributed content caching between a mobile device (e.g., any wireless device) and remote proxy and the distributed management of content caching within a distributed proxy and cache system for providing APIs and API extensions to third party applications for optimizing and minimizing application traffic according to an embodiment of the subject matter described herein.

FIG. 4A depicts a flow diagram illustrating an example process for distributed content caching between a mobile device (e.g., any wireless device) and remote proxy and the distributed management of content caching according to an embodiment of the subject matter described herein. In the embodiment illustrated in FIG. 4A, the process starts when a request is received (step 402). The URL is normalized (step 404), and the request is checked to determine whether it is cacheable (step 406.) If, at step 406, the request is not cacheable, the request is sent (step 408), a response to the request is received (step 410), and the response is delivered (step 422.) If, at step 406, the request is determined to be cacheable, a cache lookup is performed to see if the request has been cached (step 414).

If, at step 414, the request is not found in the cache, the request is sent (step 416.) When a response to the request is received (step 418), the response is checked to determine whether it is cacheable (step 426.) If, at step 426, the response is not cacheable, the response is delivered (step 422.) If the response is cacheable, the response is cached (step 420), the request is polled (step 414), and the response is delivered (step 422.)

If, at step 414, the request is found in the cache, the cache entry is checked for validity (step 424.) If, at step 424, the request is determined to be invalid, the process goes to step 416 and continues from there. If, at step 424, the request is determined to be valid, the process checks that the request contains a validator (step 428.) If, at step 428, the request contains a validator, then a validating response is formed (step 432) and delivered (step 422). If, at step 428, the request does not contain a validator, a response is formed from the cache (step 430) and delivered (step 422.)

Figure 4B:
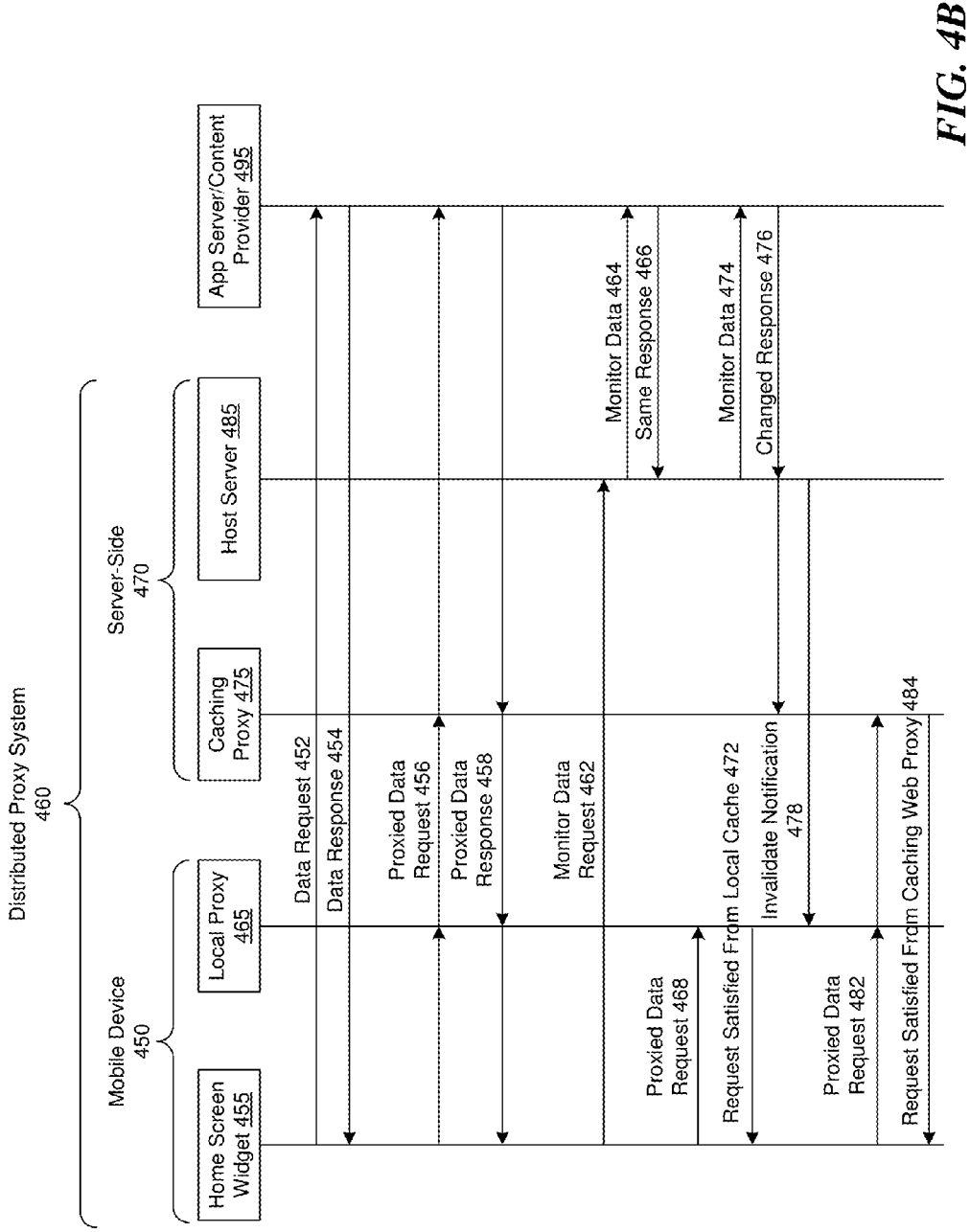
FIG. 4B depicts a timing diagram showing how data requests from a mobile device (e.g., any wireless device) to an application server/content provider in a wireless network (or broadband network) can be coordinated by a distributed proxy system in a manner such that network and battery resources are conserved through using content caching and monitoring performed by a distributed proxy and cache system for providing APIs and API extensions to third party applications for optimizing and minimizing application traffic according to an embodiment of the subject matter described herein.

FIG. 4B depicts a timing diagram showing how data requests from a mobile device (e.g., any wireless device) to an application server/content provider in a wireless network (or broadband network) can be coordinated by a distributed proxy system in a manner such that network and battery resources are conserved through using content caching and monitoring performed by the distributed proxy system. In the embodiment illustrated in FIG. 4B, a distributed proxy system 460 includes a mobile device 450, a server-side component 470, and an application server/content provider (AS/CP) 495. In the embodiment illustrated in FIG. 4B, mobile device 450 includes a home screen widget 455 and a local proxy 465, and server-side components 470 include a caching proxy 475 and a host server 485.

In the embodiment illustrated in FIG. 4B, home screen widget 455 issues a data request 452 to AS/CP 495, and AS/CP 495 sends a data response 454 to home screen widget 455. In one embodiment, both the data request and the data response travel through at least one of the local proxy 465, caching proxy 475, and host server 485. Local proxy 465 may then issue a proxied data request 456 to caching proxy 475, which may respond with a proxied data response 458.

In the embodiment illustrated in FIG. 4B, home screen widget 455 may then issue a monitor data request 462, which is received by host server 485 and forwarded or reissued as monitor data request 464 to AS/CP 495. AS/CP 495 may then issue the same response 466. If home screen widget 455 issues a proxied data request 468, local proxy 465 may satisfy that request by issuing a response from local cache 472 and thus avoid traffic between mobile device 450 and server-side components 470. Meanwhile, host server 485 may continue to issue periodic monitor data requests 474. If AS/CP 495 issues a changed response 476 (i.e., a response that is different from the previous response 466), host server 485 forwards the changed response 476 Thus, when home screen widget issues the next proxied data request 482, local proxy 465 will not respond from its local cache 472 but will instead forward the data request 482 to caching proxy 475, and caching proxy 475 will satisfy that request from its cache.

FIG. 5 depicts a table showing examples of different traffic or application category types which can be used in implementing network access and content delivery policies according to an embodiment of the subject matter described herein. In the embodiment illustrated in FIG. 5, traffic category/application category table 500 includes a number of categories, including, but not limited to, interactive traffic versus background traffic, applications where the user is waiting for a response versus not waiting for a response, applications that are in the foreground versus in the background, and device states where the backlight is on or off. As will be described in more detail below, in one embodiment, if a device backlight is off, that may be taken as a sign that the user is not actively using that device and therefore maximum signaling optimization, including blocking, may be appropriate. Likewise, if the device backlight is on, that may be an indication that the user is actively using the device and therefore signaling optimization and/or blocking may be curtailed or stopped completely.

FIG. 6 depicts a table showing examples of different content category types which can be used in implementing network access and content delivery policies according to an embodiment of the subject matter described herein. In the embodiment illustrated in FIG. 6, content category table 600 includes a number of categories, including, but not limited to, high priority content, low priority content, time critical content, and non-time critical content. In one embodiment, some or all of these factors may be taken into account when determining whether optimization and/or blocking should or should not be enabled.

FIG. 7 depicts an interaction diagram showing how polls having data requests from a mobile device (e.g., any wireless device) to an application server/content provider over a wireless network (or broadband network) can be can be cached on the local proxy and managed by the distributed caching system according to an embodiment of the subject matter described herein. In the embodiment illustrated in FIG. 7, at step 732, Mobile application/widget 755 polls application server/content provider 795. At step 734, local proxy 765 intercepts the poll. At step 736, local proxy 765 detects that cache content is available for the polled content and is valid and thus retrieves a response to satisfy the poll. At step 738, mobile application/widget 755 receives a response to the poll from a cache entry, provided by local proxy 765.

At step 740, mobile application/widget 755 again polls application server/content provider 795. At step 742, local proxy 765 intercepts the poll. At step 744, local proxy 765 detects that cache content is unavailable and decides to set up the polled source for caching. At step 746, local proxy 765 forwards the poll request to the source. At step 748, application server/content provider 795 receives the poll request from the mobile application/widget 755 and provides a response to satisfy the current request. At step 750, mobile application/widget 755 receives the response to satisfy the request from the application server/content provider 795.

At step 752, local proxy 765 tracks polling frequency of the application and sets up a polling schedule for the server-side entity. Server side entities include, but are not limited to, a host server 785, a server cache 735, and a caching proxy 775. At step 754, local proxy 765 sends the cache setup to the server-side entity. At step 756, the server-side entity receives the cache setup including an identification of the application server/content provider 795 to be polled and a polling schedule. At step 758, the server-side entity polls the application server/content provider 795 to monitor the response to the request. At step 760, application server/content provider 795 receives the poll from the server-side entity and sends the response. At step 762, the server-side entity receives the same response and then polls the application server/content provider 795 again based on the polling schedule. At step 764, application server/content provider 795 receives poll from the server-side entity and sends the response. At step 766, the server-side entity detects changed or new response and notifies the local proxy 765 that the response has changed since the last time. At step 768, the server-side entity stores the new or changed response in the server-side entity. At step 770, local proxy 765 receives notification that new or changed data is available, and in response, invalidates the relevant cache entries.

At step 772, mobile application/widget 755 polls application server/content provider 795. At step 774, local proxy 765 determines that no valid cache entry is available and requests a response from the server-side entity. At step 776, the server-side entity receives the request for the new response and sends the response to the local proxy 765. At step 778, the request is satisfied from the server-side entity, e.g., the server side entity sends the response to mobile application/widget 755.

At step 780, mobile application/widget 755 polls application server/content provider 795. At step 782, local proxy 765 determines that no valid cache entry is available and forwards the poll to the application server/content provider 795. At step 784, application server/content provider 795 receives the poll from local proxy 765 and sends the response. At step 786, the request from mobile application/widget 755 is satisfied by the application server/content provider 795.

FIG. 8 illustrates a flow chart showing an example process for user behavior-based resource allocation in a wireless network. In the embodiment illustrated in FIG. 8, the process includes tracking user behavior with respect that user's mobile usage (step 802) and recording the user's behavior (step 804.) The characteristics and patterns of the user's behavior are stored in a user behavior profile for that user (step 806.)

At step 808, mobile usage by the user is detected. At step 810, resources in the wireless network are allocated to the user based on the user's user behavior profile, and at step 812, the allocated resources are controlled based on the user's behavior with respect to mobile usage. For example, the radio circuits of the user's mobile device may be throttled or otherwise controlled to limit the number of times the radio circuits have to be powered up (step 814) and/or control the amount of time the powered-up radio circuits are active before powering them down again. Controlling allocated resources may include controlling the bandwidth in the wireless network allocated to the user.

Figure 9:
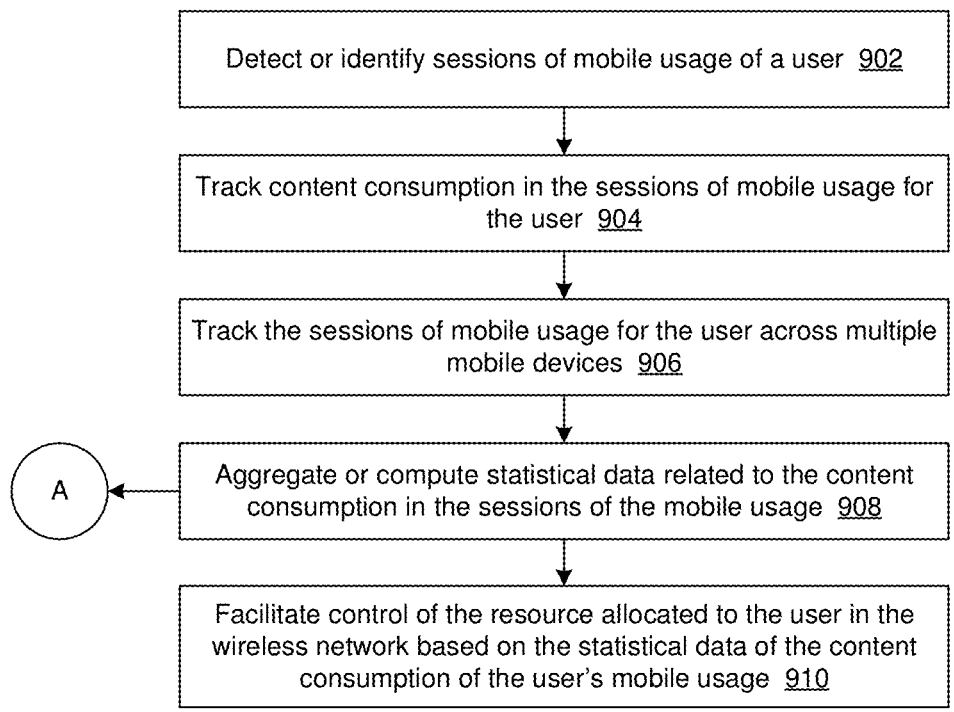
FIG. 9 illustrates a flow chart showing an example flow for content consumption based resource allocation to a user in a wireless network component of a distributed proxy and cache system for providing APIs and API extensions to third party applications for optimizing and minimizing application traffic according to an embodiment of the subject matter described herein.

FIG. 9 illustrates a flow chart showing an example process for content consumption-based resource allocation to a user in a wireless network. In the embodiment illustrated in FIG. 9, the process includes detecting or identifying sessions of mobile usage of a user (step 902) and tracking content consumption in the sessions of mobile usage for the user (step 904), tracking the sessions of mobile usage for the user across multiple mobile devices (step 906), and aggregating or computing statistical data related to the content consumption in the sessions of the mobile usage (step 908.) This process is illustrated in more detail in FIG. 10, described below. In the embodiment illustrated in FIG. 9, the process includes facilitating control of the resource allocated to the user in the wireless network based on the statistical data of the content consumption of the user's mobile usage (step 910.)

Figure 10:
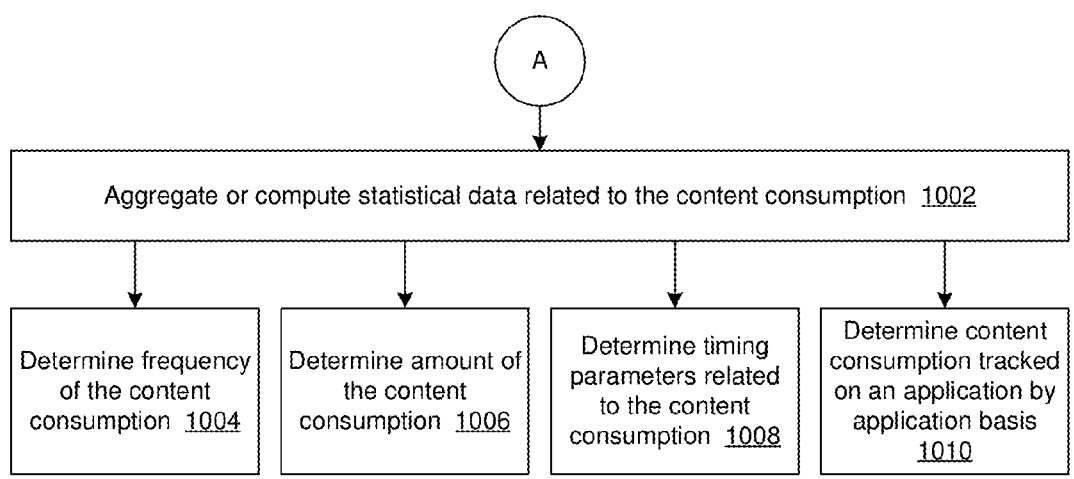
FIG. 10 illustrates a flow chart showing examples of statistics aggregated or computed for content consumption in a wireless network component of a distributed proxy and cache system for providing APIs and API extensions to third party applications for optimizing and minimizing application traffic according to an embodiment of the subject matter described herein.

FIG. 10 illustrates a flow chart showing examples of statistics aggregated or computed for content consumption in a wireless network. In the embodiment illustrated in FIG. 10, aggregation or computation of statistical data related to the content consumption (step 1002) can include one or more of the following: determining the frequency of the content consumption (step 1004), determining the amount of the content consumption (step 1006), determining timing parameters related to the content consumption (step 1008), and determining content consumption tracked on an application-by-application basis (step 1010).

Figure 11:
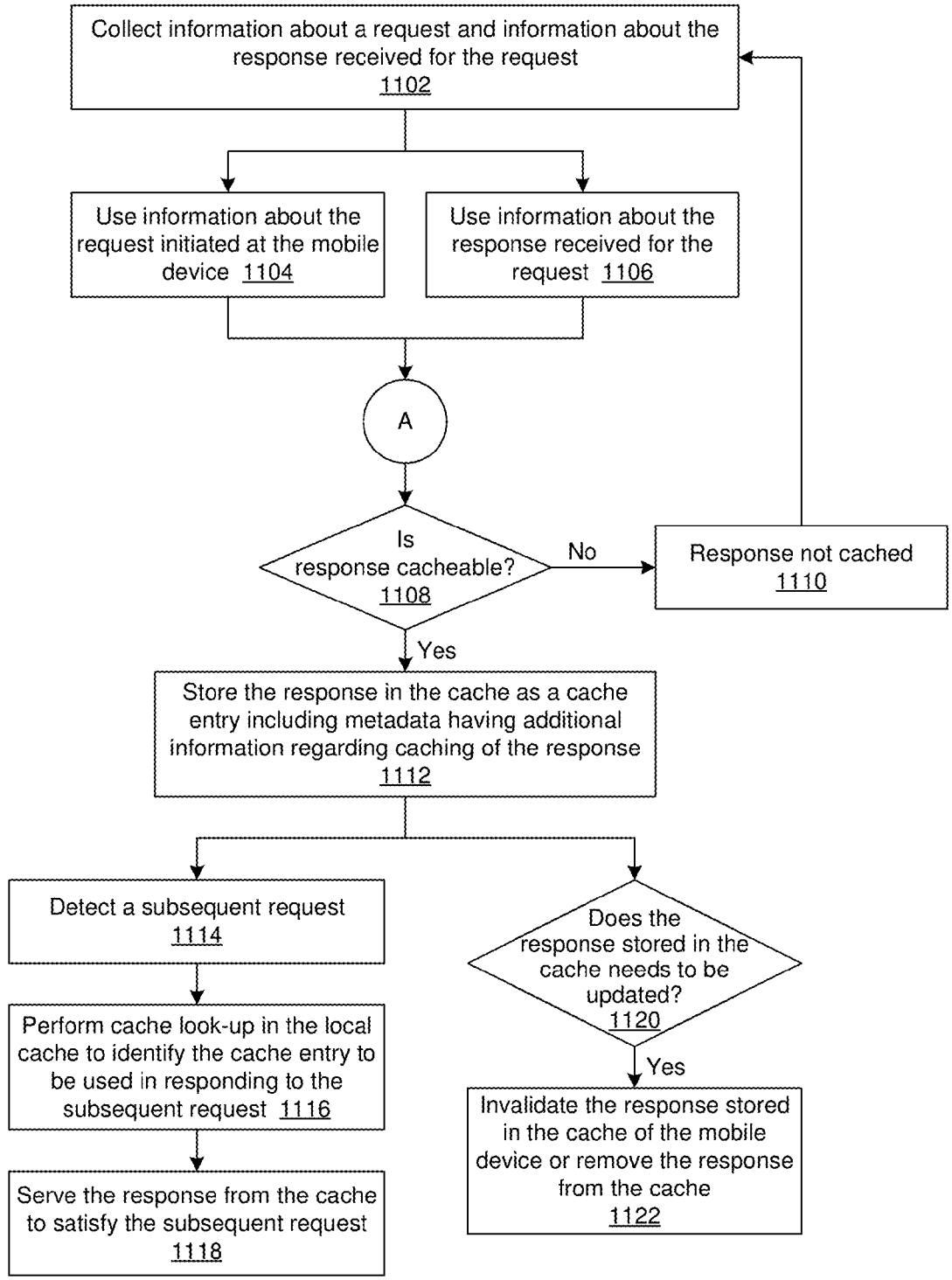
FIG. 11 depicts a flow chart illustrating an example process for collecting information about a request and the associated response to identify cacheability and caching the response within a distributed proxy and cache system for providing APIs and API extensions to third party applications for optimizing and minimizing application traffic according to an embodiment of the subject matter described herein.

FIG. 11 depicts a flow chart illustrating an example process for collecting information about a request and the associated response to identify cacheability and caching the response according to an embodiment of the subject matter described herein. In the embodiment illustrated in FIG. 11, a process for determining whether a response is cacheable includes collecting information about a request and information about the response received for the request (step 1102) and then using the information about either the request initiated (step 1104) or the response received (step 1106) to determine whether or not the request is cacheable (sub-process "A", described in more detail in FIG. 14, below.) At step 1108, it is determined whether the request is cacheable. If not, the response is not cached (step 1110), and the process returns to step 1102. If the request is cacheable, the response is stored in the cache as a cache entry, including metadata having additional information regarding caching of the response (step 1114.)

Once the response has been cached, at least two events can occur. The first event is the detection of a subsequent request (step 1114.) When this happens, a cache look-up is performed in the local cache to identify the cache entry to be used when responding to the subsequent request (step 1116), and the response is served from the cache to satisfy the subsequent request (step 1118.) The second event is an invalidation event, in which case it is determined whether the response currently stored in the cache needs to be updated (step 1120.) If so, the response stored in the cache of the mobile device is invalidated and/or removed from the cache (step 1122.)

Figure 12:
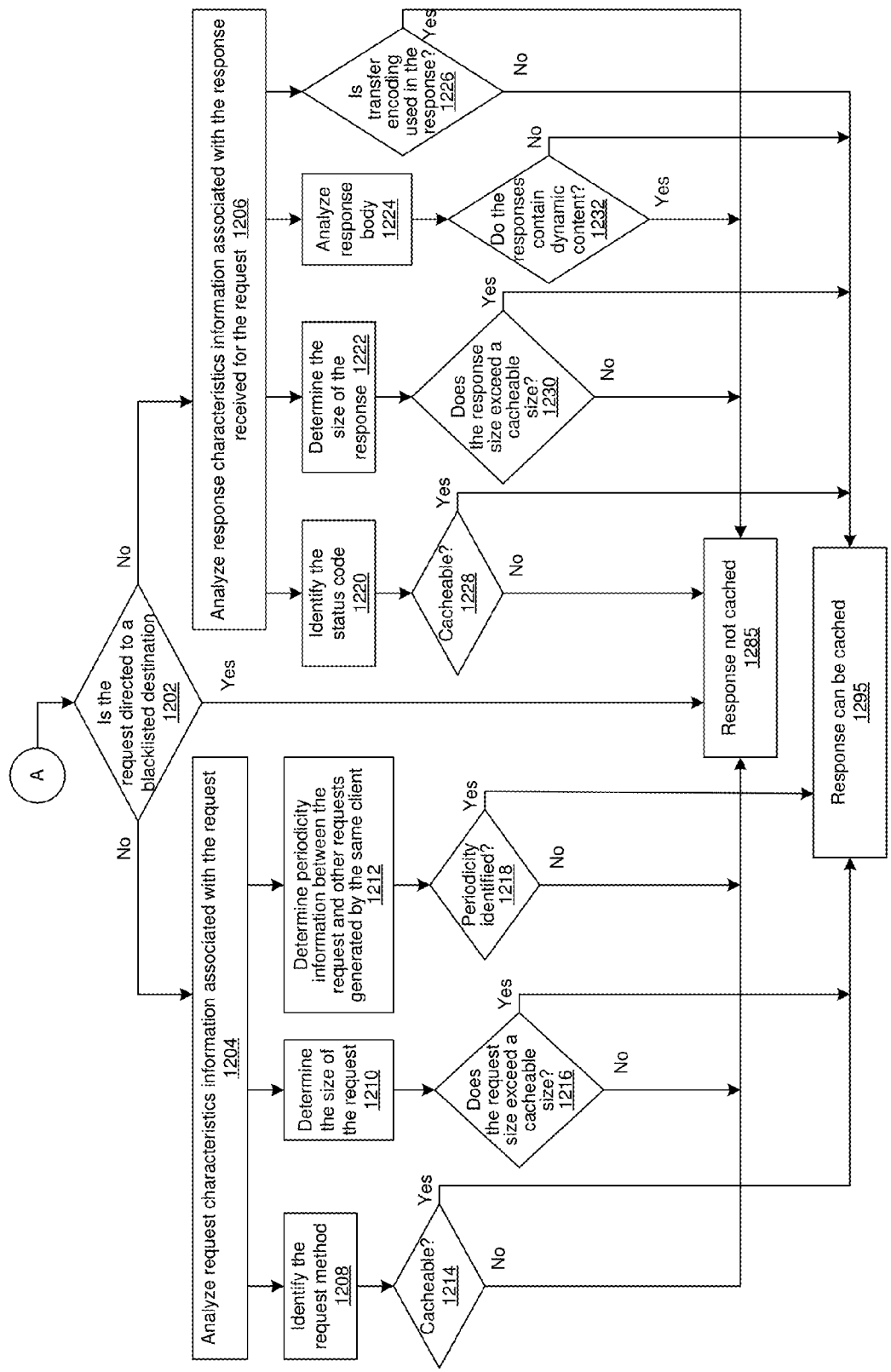
FIG. 12 depicts a flow chart illustrating an example process showing decision flows to determine whether a response to a request can be cached within a distributed proxy and cache system for providing APIs and API extensions to third party applications for optimizing and minimizing application traffic according to an embodiment of the subject matter described herein.

FIG. 12 depicts a flow chart illustrating an example process showing decision flows to determine whether a response to a request can be cached according to an embodiment of the subject matter described herein. The flow chart in FIG. 12 illustrates in more detail the sub-process "A" referred to in FIG. 11. In the embodiment illustrated in FIG. 12, sub-process "A" starts with a determination whether the request is directed to a black-listed destination (step 1202.) If yes, the response is not cached (step 1285.) If the request is not directed to a black-listed destination, then the process can include analyzing the request characteristics information associated with the request (step 1204), analyzing the response characteristics information associated with the response received for the request (step 1206), or both.

In the embodiment illustrated in FIG. 12, request analysis 1204 can include a number of tests. For example, the request method may be identified (step 1208) and the request may be deemed cacheable or not cacheable based on the method (step 1214.) The size of the request may be checked (step 1210) and a request may be cached if the request doesn't exceed a threshold size (step 1216.) In one embodiment, the periodicity of information between the request and other requests generated by the same client may be determined (step 1214), and requests that are identified as periodic are cached while non-periodic requests are not cached (step 1218.) In one embodiment, requests that satisfy a caching requirement may be cached (step 1295) while those that do not satisfy any caching requirements are not cached (step 1285.) In an alternative embodiment, requests that fail any caching requirement are not cached, i.e., they must meet all caching requirements before they are cached.

In the embodiment illustrated in FIG. 12, response analysis 1206 can also include a number of tests to determine cacheability. For example, a response may be identified as cacheable or not cacheable based on its status code (steps 1220 and 1228), based on the size of the response (steps 1222 and 1230), based on whether the response body includes dynamic content (steps 1224 and 1232), and/or whether or not transfer encoding is used in the response (step 1226.)

Figure 13:
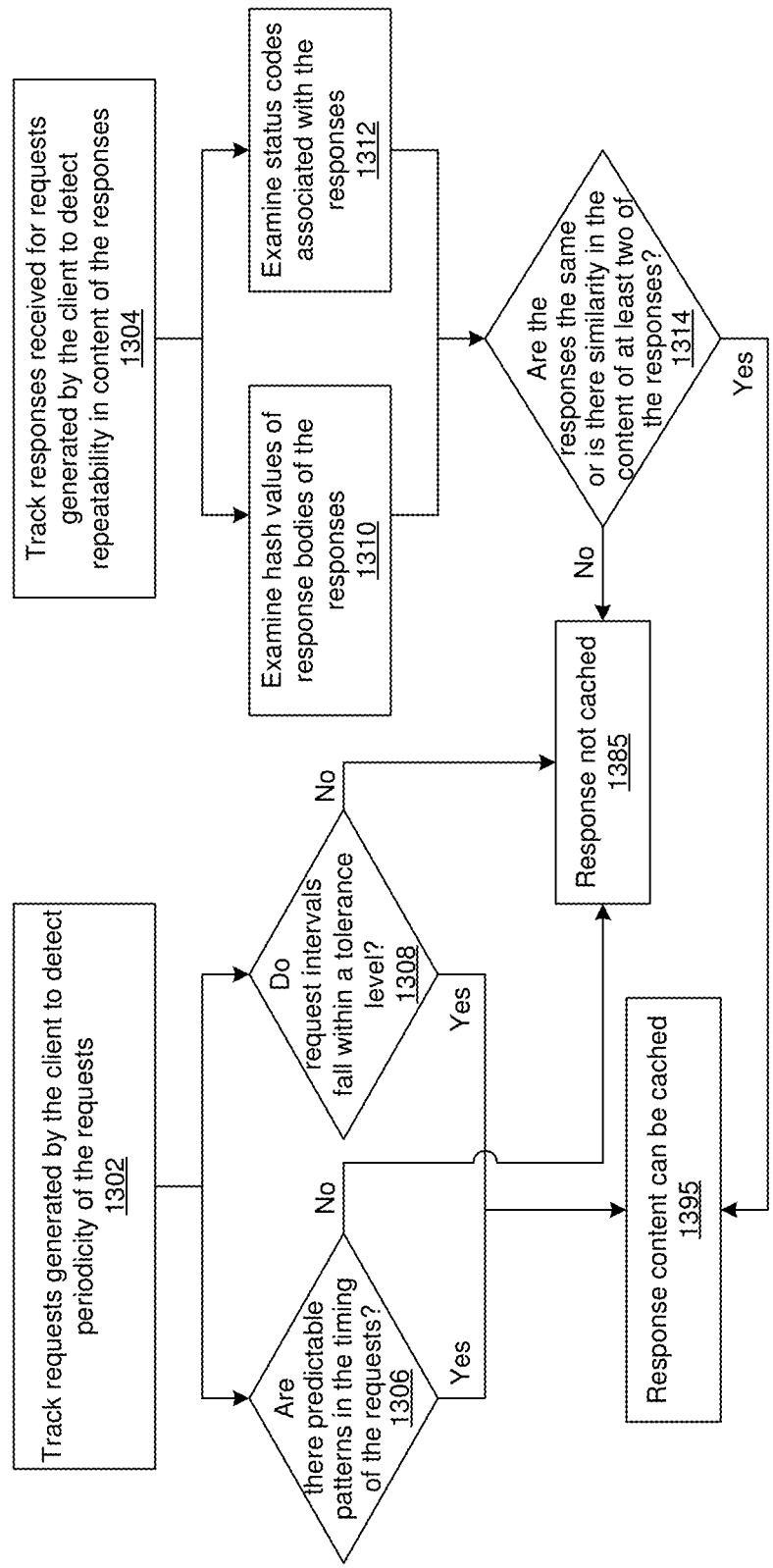
FIG. 13 depicts a flow chart illustrating an example process for determining potential for cacheability based on request periodicity and/or response repeatability by a distributed proxy and cache system for providing APIs and API extensions to third party applications for optimizing and minimizing application traffic according to an embodiment of the subject matter described herein.

FIG. 13 depicts a flow chart illustrating an example process for determining potential for cacheability based on request periodicity and/or response repeatability according to an embodiment of the subject matter described herein. In the embodiment illustrated in FIG. 13, the process for determining potential cacheability includes both tracking requests generated by the client to detect periodicity of the requests (step 1302) and tracking responses received for requests generated by the client to detect repeatability in content of the responses (step 1304.)

In the embodiment illustrated in FIG. 13, request tracking 1302 may include determining if there are predictable patterns in the timing of the request (step 1306) and/or determining whether request intervals fall within a tolerance level (step 1308.) If either test returns "true", the response content can be cached (step 1395); otherwise, the response is not cached (step 1385.)

In the embodiment illustrated in FIG. 13, response tracking 1304 may include examining hash values generated from the response bodies of the responses (step 1310) and/or examining status codes associated with the responses (step 1314.) If either test indicates that the responses are the same or that there is a similarity in the content of at least two of the responses (step 1314), the response content can be cached (step 1395); otherwise, the response is not cached (step 1385.)

Figure 14:
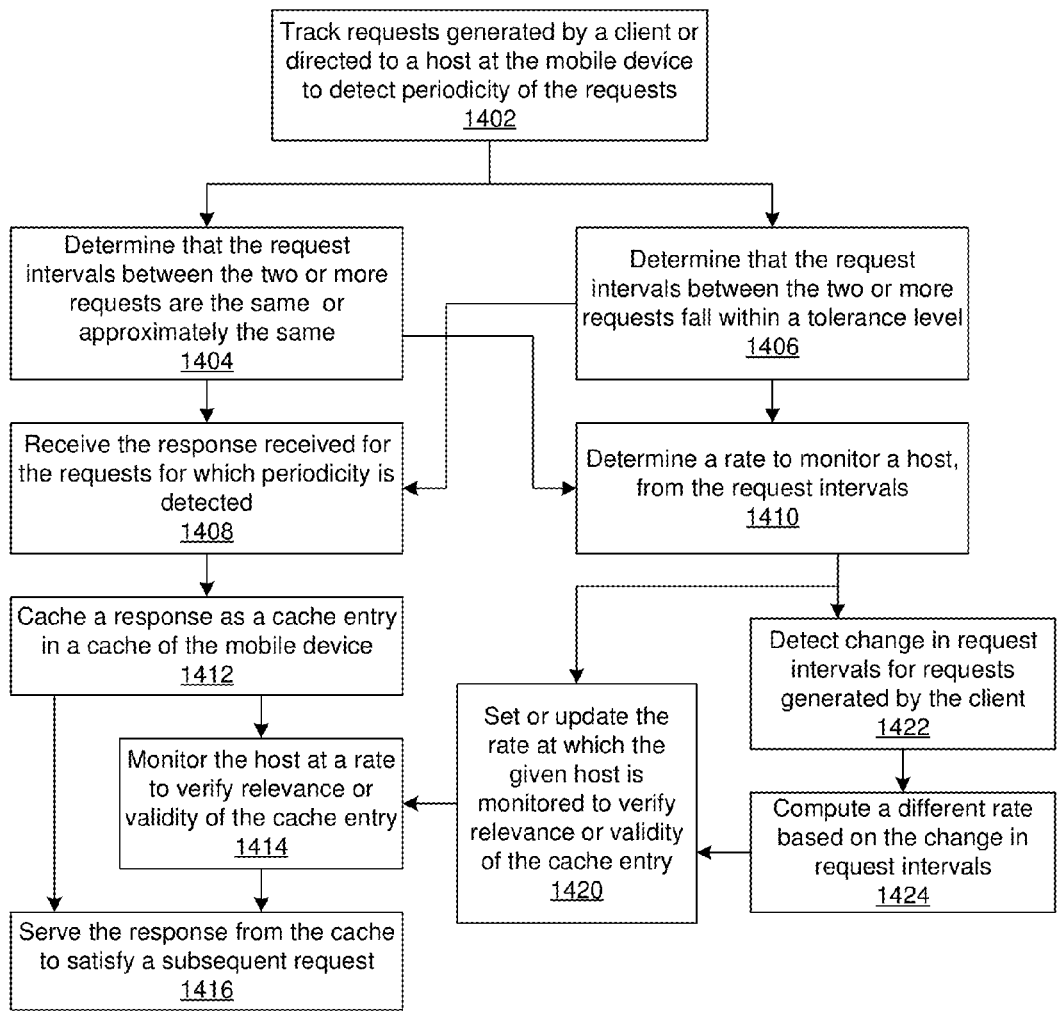
FIG. 14 depicts a flow chart illustrating an example process for dynamically adjusting caching parameters for a given request or client by a distributed proxy and cache system for providing APIs and API extensions to third party applications for optimizing and minimizing application traffic according to an embodiment of the subject matter described herein.

FIG. 14 depicts a flow chart illustrating an example process for dynamically adjusting caching parameters for a given request or client according to an embodiment of the subject matter described herein. In the embodiment illustrated in FIG. 14, the process for dynamically adjusting caching parameters includes tracking requests generated by a client or directed to a host at the mobile device to detect periodicity of the requests (step 1402.) If it is determined that the request intervals between two or more requests are the same or approximately the same (step 1404) or that the request intervals between two more requests fall within a tolerance level (step 1406), those requests may be identified as being periodic, and the process may take one or more of a number of actions.

For example, in the embodiment illustrated in FIG. 14, if a response is received for a request that has been identified as being periodic (step 1408), that response may be cached as a cache entry in a cache of the mobile device (step 1414.) The host may be monitored at a rate to verify relevance or validity of the cache entry (step 1414), after which the response may be served from the cache to satisfy a subsequent request (step 1416.) In one embodiment, step 1414 may be skipped.

Alternatively or in addition, a rate to monitor a host may be determined from the request intervals (step 1410.) After this, the rate at which the given host is monitored to verify relevance or validity of the cache entry may be set or updated (step 1420). This value may be used by step 1414. Alternatively, after step 1410, a change in request intervals for requests generated by the client may be detected (step 1422), which triggers computation of a different rate based on the change in request intervals (step 1424.)

Figure 15:
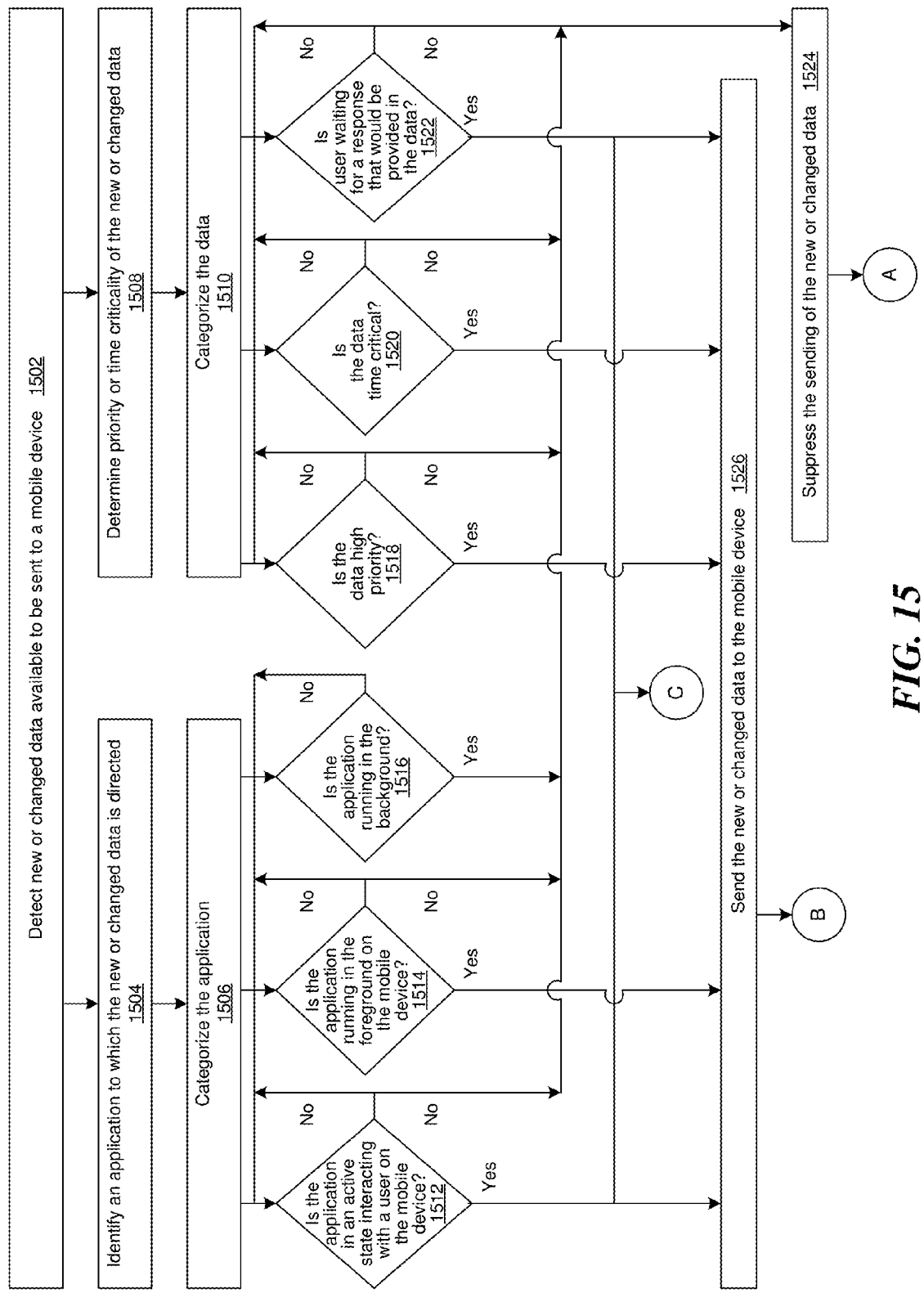
FIG. 15 depicts a flow chart illustrating example processes for application and/or traffic (data) categorization while factoring in user activity and expectations for implementation of network access and content delivery policies by a distributed proxy and cache system for providing APIs and API extensions to third party applications for optimizing and minimizing application traffic according to an embodiment of the subject matter described herein.

FIG. 15 depicts a flow chart illustrating example processes for application and/or traffic (data) categorization while factoring in user activity and expectations for implementation of network access and content delivery policies according to an embodiment of the subject matter described herein. In the embodiment illustrated in FIG. 15, a process for application and/or traffic categorization includes detecting new or changed data available to be sent to a mobile device (step 1502), and, in response, either identifying an application to which the new or changed data is directed (step 1504), determining the priority or time criticality of the new or changed data (step 1506), or both.

In the embodiment illustrated in FIG. 15, identification of the application 1504 is followed by categorizing the application (step 1506) and then applying one or more tests to determine whether the new or changed data should be sent to the mobile device (step 1526 followed by sub-flow "B", which is shown in more detail in FIG. 14B) or suppressed, i.e., not sent to the mobile device (step 1524 followed by sub-flow "A", which is shown in more detail in FIG. 14A.) For example, the new or changed data may be sent to the mobile device if the application is in an active state and interacting with a user on the mobile device (step 1514) or if the application is running in the foreground on the mobile device (step 1514), while an application running in the background would be have its new or changed data suppressed (step 1516.)

In the embodiment illustrated in FIG. 15, the determination of priority or time criticality 1508 is followed by categorizing the data (step 1510) and then applying one or more tests to determine whether the new or changed data should be sent to the mobile device (step 1526) or suppressed (step 1524.) For example, data may be sent if the data is high priority (step 1518), if the data is time critical (step 1520), or if the user is waiting for a response that would be provided in the data (step 1522)—otherwise, the data would be suppressed.

In the embodiment illustrated in FIG. 15, if an application is in an active state interacting with a user on the mobile device (step 1514) or the user is waiting for a response that would be provided in data (step 1522), an additional sub-flow "C" may be performed. Sub-flow "C" is shown in more detail in FIG. 14C.

Figure 16A:
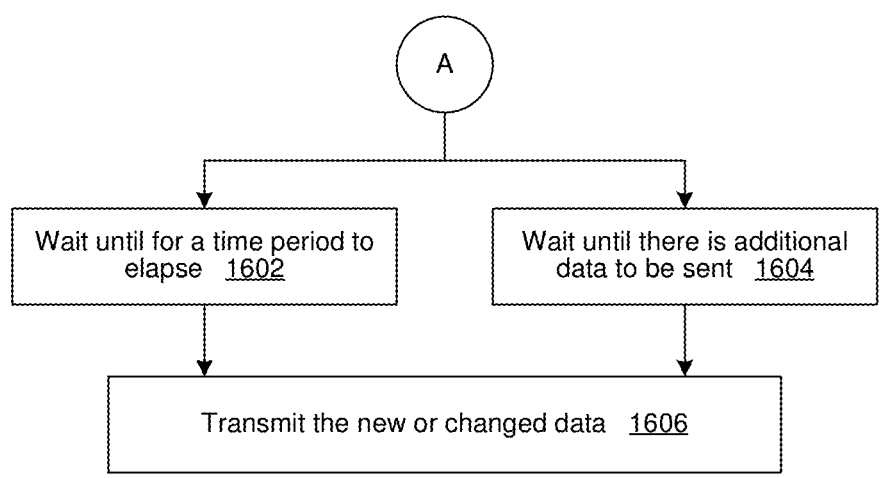
FIG. 16A depicts a flow chart illustrating example processes for handling traffic which is to be suppressed at least temporarily determined from application/traffic categorization by a distributed proxy and cache system for providing APIs and API extensions to third party applications for optimizing and minimizing application traffic according to an embodiment of the subject matter described herein.

FIG. 16A depicts a flow chart illustrating sub-flow "A" in more detail. In the embodiment illustrated in FIG. 16A, data to be suppressed may be held for a period of time (step 1602) or until there is additional data to be sent (step 1604) before transmitting the new or changed data (step 1606.)

Figure 16B:
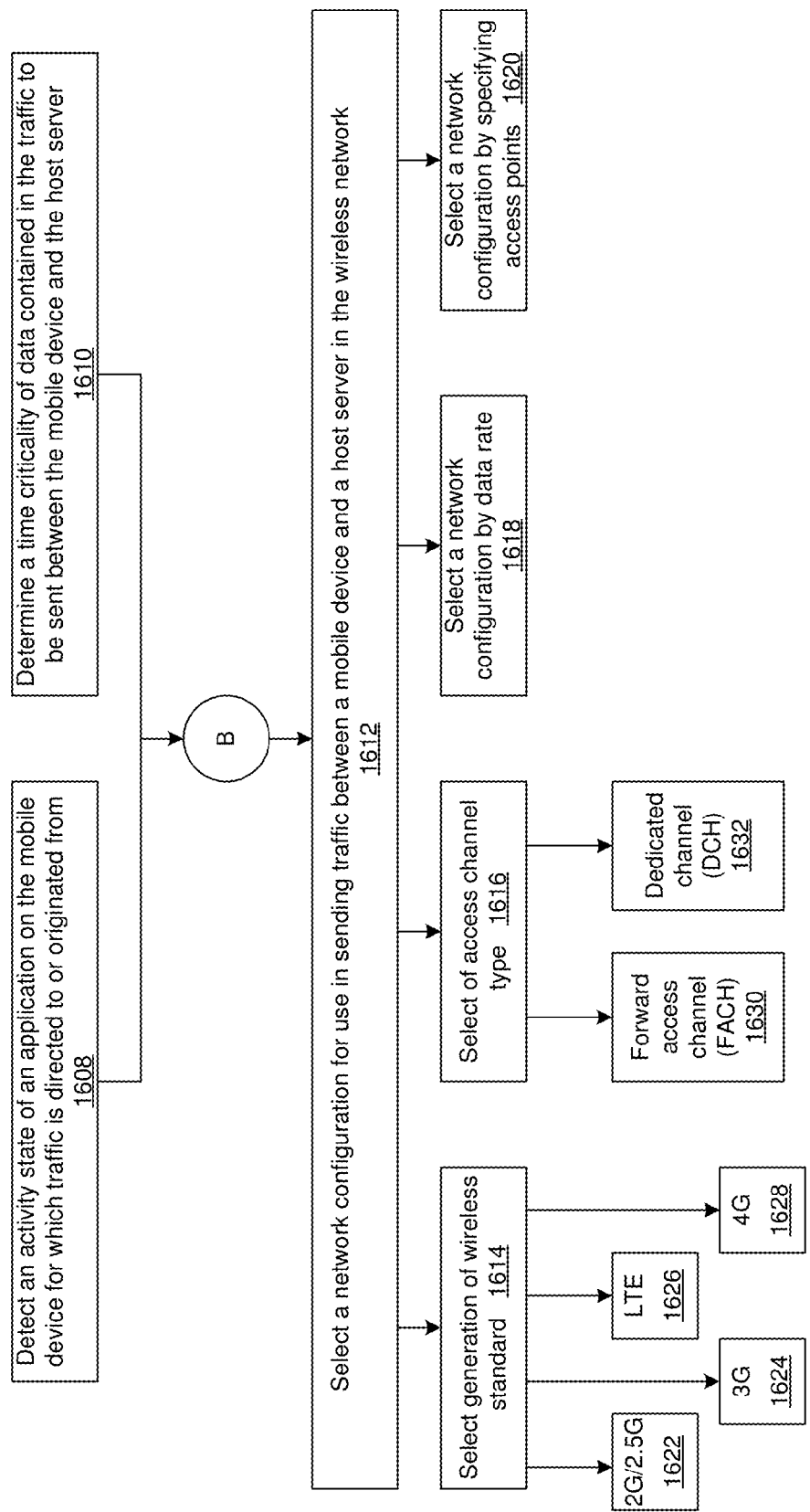
FIG. 16B depicts a flow chart illustrating an example process for selection of a network configuration for use in sending traffic based on application and/or traffic (data) categorization by a distributed proxy and cache system for providing APIs and API extensions to third party applications for optimizing and minimizing application traffic according to an embodiment of the subject matter described herein.

FIG. 16B depicts a flow chart illustrating sub-flow "B" in more detail. In the embodiment illustrated in FIG. 16B, other events may trigger the selection process. For example, detection of an activity state of an application on the mobile device for which traffic is directed to or from (step 1608) may trigger a selection process, as may determining a time criticality of data contained in the traffic to be sent between the mobile device and the host server (step 1610.) In the embodiment illustrated in FIG. 16B, sub-flow "B" includes selecting a network configuration for use in sending traffic b between a mobile device and a host server in the wireless network (step 1614.) Selection may include selection of a wireless standard (step 1614), such as 2G/2.5G 1622, 3G 1624, LTE 1626, or 4G 1628. Selection may also include selection of an access channel type (step 1616), such as a forward access channel (FACH) 1630 or a dedicated channel (DCH) 1632. Selection may include selection of a network configuration by data rate (step 1618) or by specifying data access points (step 1620.)

Figure 16C:
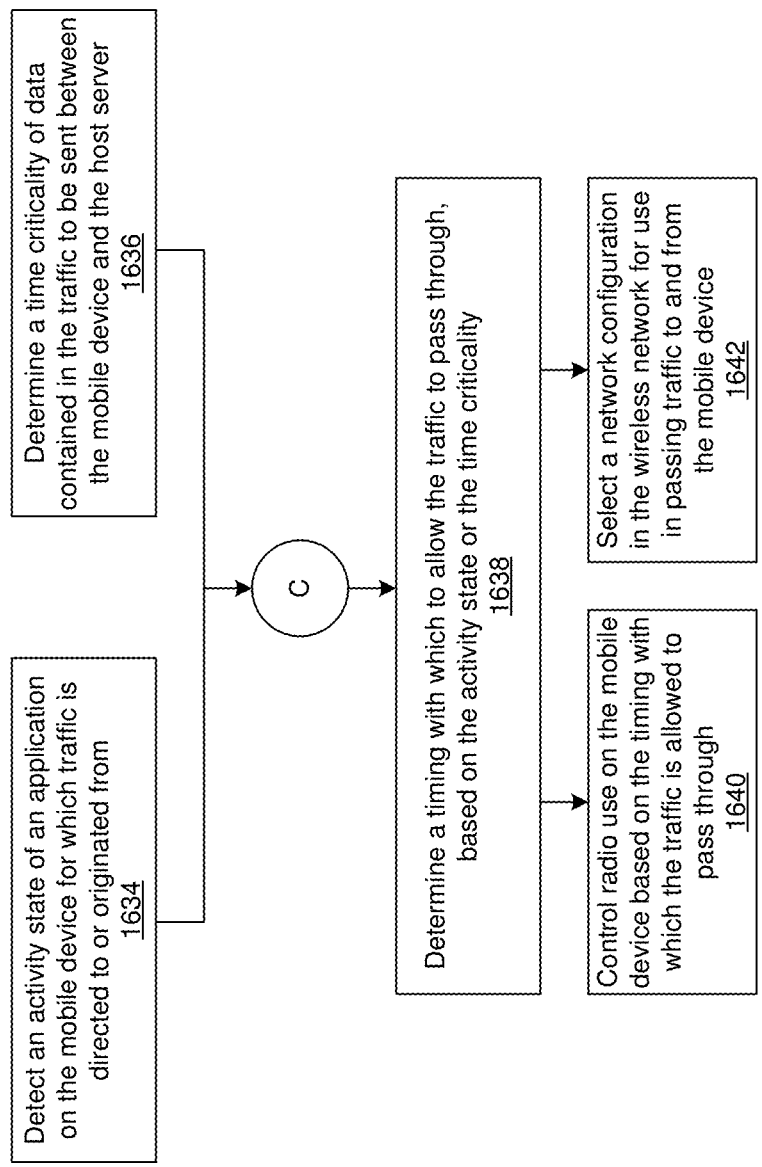
FIG. 16C depicts a flow chart illustrating an example process for implementing network access and content delivery policies based on application and/or traffic (data) categorization by a distributed proxy and cache system for providing APIs and API extensions to third party applications for optimizing and minimizing application traffic according to an embodiment of the subject matter described herein.

FIG. 16C depicts a flow chart illustrating sub-flow "C" in more detail. In the embodiment illustrated in FIG. 16C, the process for implementing network access and content delivery policies based on application and/or traffic (data) categorization may be triggered by detecting an activity state of an application on the mobile device for which traffic is directed to or originated from (step 1634) and/or determination of a time criticality of data contained in the traffic to be sent between the mobile device and the host server (step 1636.) In the embodiment illustrated in FIG. 16C, sub-flow "C" includes determining a timing with which to allow the traffic to pass through, based on the activity state or the time criticality (step 1638), followed by controlling radio use on the mobile device based on the timing with which the traffic is allowed to pass through (step 1640) and/or selecting a network configuration in a wireless network for use in passing traffic to and from the mobile device (step 1642.)

Figure 17:
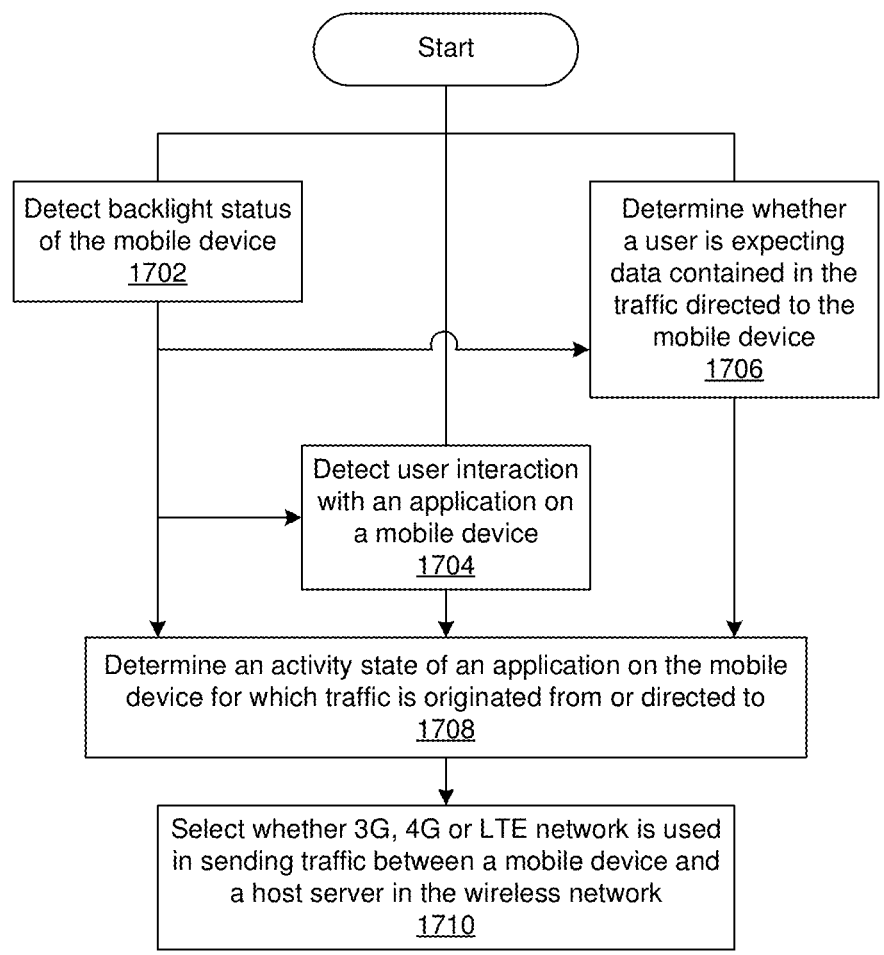
FIG. 17 depicts a flow chart illustrating an example process for network selection based on mobile user activity or user expectations by a distributed proxy and cache system for providing APIs and API extensions to third party applications for optimizing and minimizing application traffic according to an embodiment of the subject matter described herein.

FIG. 17 depicts a flow chart illustrating an example process for network selection based on mobile user activity or user expectations according to an embodiment of the subject matter described herein. In the embodiment illustrated in FIG. 17, the process for network selection includes detection of backlight status of the mobile device (step 1702), detection of user interaction with an application on a mobile device (step 1704), and/or determining whether a user is expecting data contained in the traffic directed to the mobile device (step 1706.) From any of these, the process may go to step 1708, which includes determining an activity state of an application on the mobile device for which traffic is originated from or directed to, and then to step 1710, which includes selecting whether a 3G, 4G, or LTE network is used in sending traffic between a mobile device and a host server in the wireless network.

Figure 18:
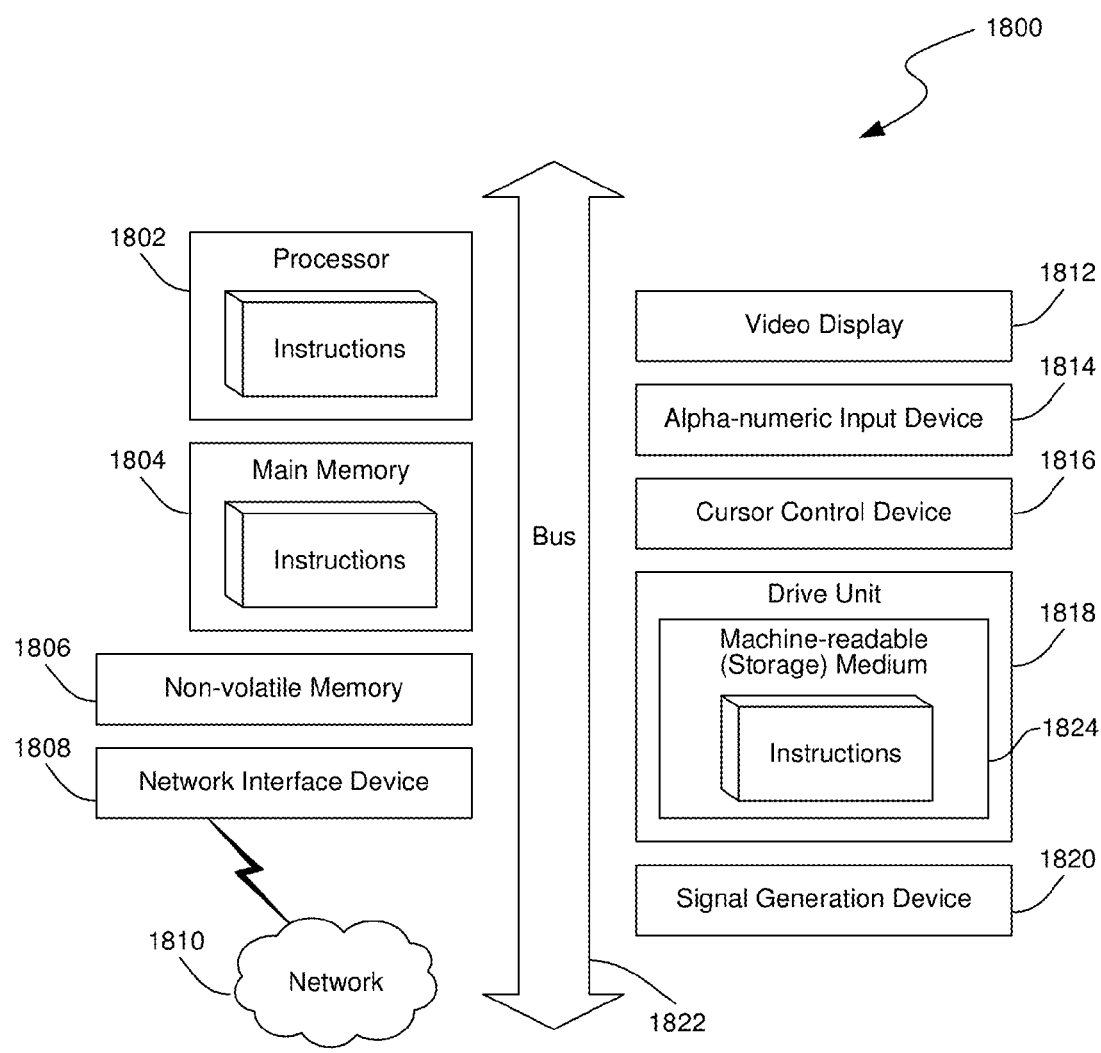
FIG. 18 shows a diagrammatic representation of a machine in the example form of a computer system within which a set of instructions, for causing the machine to perform any one or more of the methodologies discussed herein, may be executed within a distributed proxy and cache system for providing APIs and API extensions to third party applications for optimizing and minimizing application traffic according to an embodiment of the subject matter described herein.

FIG. 18 shows a diagrammatic representation of a machine in the example form of a computer system within which a set of instructions, for causing the machine to perform any one or more of the methodologies discussed herein, may be executed according to an embodiment of the subject matter described herein. In the embodiment illustrated in FIG. 18, system 1800 includes a processor 1802, a main memory 1804, a non-volatile memory 1806, a network interface device 1808 for connecting to a network 1810, a video display 1812, an alphanumeric input device 1814, a cursor control device 1816, a drive unit 1818, and a signal generation device 1820, some or all of which communicate via a system bus 1822. In the embodiment illustrated in FIG. 18, processor 1802 and main memory 1804 include memory for storing machine readable instructions. Drive unit 1818 includes a machine-readable storage medium 1824 for storing machine-readable instructions.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Figure 19:
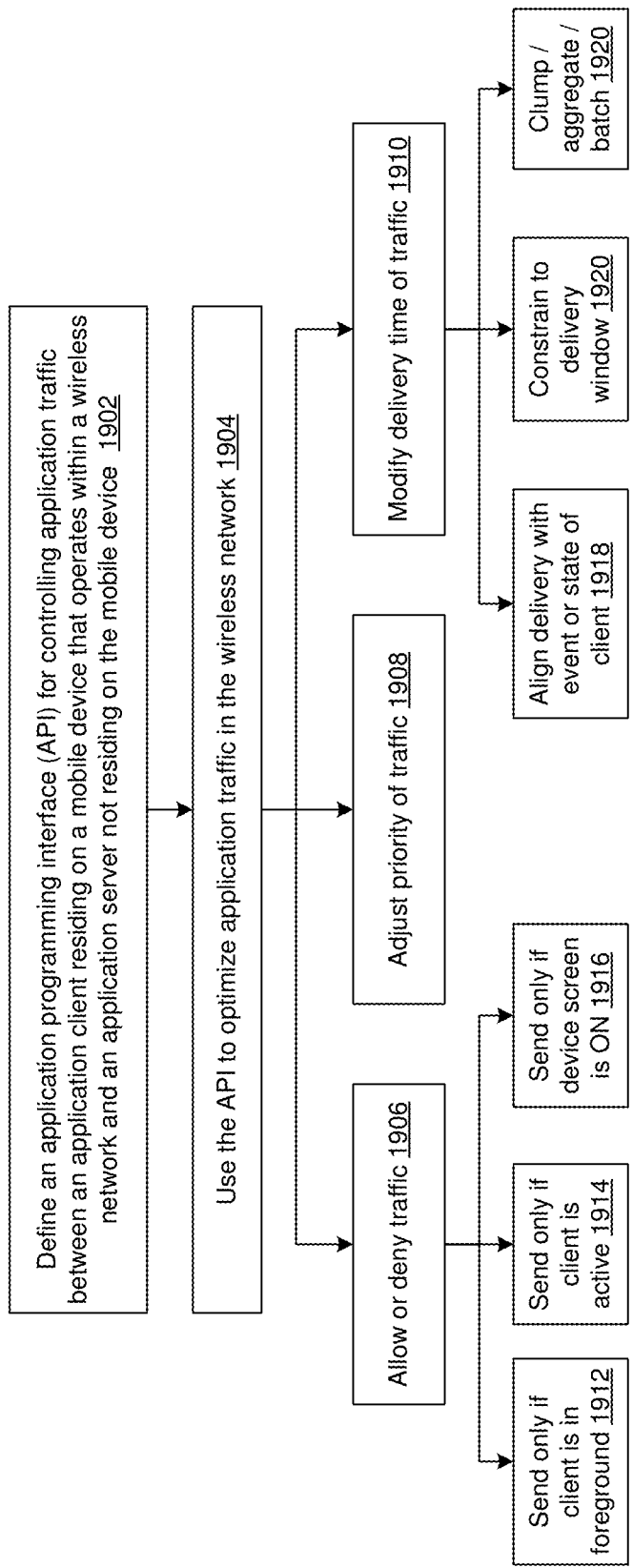
FIG. 19 is a flow chart illustrating an exemplary process for providing APIs and API extensions to third party applications for optimizing and minimizing application traffic according to an embodiment of the subject matter described herein.

FIG. 19 is a flow chart illustrating an exemplary process for providing APIs and API extensions to third party applications for optimizing and minimizing application traffic according to an embodiment of the subject matter described herein. In the embodiment illustrated in FIG. 19, the process includes defining an API for controlling application traffic between an application client residing on a mobile device that operates within a wireless network and an application server not residing on the mobile device (step 1902), and using the API to optimize traffic in the wireless network (step 1904.) In one embodiment, using the API to optimize traffic can include using the API to allow or deny traffic (step 1906), using the API to adjust priority of traffic (step 1908), and/or using the API to modify delivery time of traffic (step 1910).

In one embodiment, allowing or denying traffic can include sending traffic only if the client is in the foreground (step 1912), sending traffic only if the client is active (step 1914), sending the traffic only if the device screen is ON (step 1916). In one embodiment, modifying delivery time of traffic can include aligning delivery of the traffic with an event or state of the client (step 1918), constraining delivery of the traffic to a delivery window (step 1920), and/or clumping, aggregating, or batching traffic (step 1920.) Other optimization of traffic between the application client and application server is contemplated.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:
1. A method for optimizing and minimizing application traffic in a wireless network, the method comprising:
defining an application programming interface (API) for controlling application traffic between an application client residing on a mobile device that operates within a wireless network and an application server not residing on the mobile device; and using the API to optimize application traffic in the wireless network including controlling, by the mobile device, traffic sent by the application server to the mobile device, wherein using the API to optimize application traffic includes using the API for:
  providing a subscriber tiering and reporting service having a premium subscriber tier;
  providing delivery notification to a sending entity subscribing to the premium subscriber tier;
  sending a plurality of data packets together as a batch within a defined window of time, wherein the defined window of time is determined by a time criticality of the plurality of data packets;
  adjusting message priority for entities subscribing to the premium subscriber tier; and
  providing special traffic reporting to a reporting server based on a reporting policy received from a policy management server.

2. The method of claim 1 wherein using the API to optimize application traffic includes using the API for:
  controlling delivery of application traffic sent from the application client to the application server; and
  controlling delivery of application traffic sent between the application server and the application client.

3. The method of claim 1 wherein controlling delivery of application traffic sent between the application server and the application client includes at least one of:
  allowing or denying delivery of traffic to the application client based on a state of the mobile device;
  allowing or denying delivery of traffic to the application client based on a state of a network connection between the mobile device and the wireless network; and
  modifying a delivery time of one or more packets of data being sent between the application server and the application client.

4. The method of claim 3 wherein modifying the delivery time of one or more packets of data being sent between the application server and the application client includes at least one of:
  aligning transmission of the data packets with an event or state of the application client;
  sending packets to the application client when the application client is in the foreground and not sending packets to the application client when the application client is in the background;
  sending packets to the application client when the application client is active and not sending packets to the application client when the application client is inactive; and
  sending packets to the application client when a screen of the mobile device is on and not sending packets to the application client when the screen of the mobile device is not on.

5. The method of claim 1 wherein the application client uses the API to optimize application traffic.

6. The method of claim 1 wherein the application server uses the API to optimize application traffic.

7. The method of claim 1 wherein using the API to optimize application traffic includes using the API to redirect traffic through a client-side proxy located on the mobile device.

8. The method of claim 7 wherein the client-side proxy uses the API to optimize application traffic.

9. The method of claim 1 wherein defining the API includes defining non-standard extensions to an industry standard API, wherein the non-standard extensions are configured to allow a premium push service.

10. A system for optimizing and minimizing application traffic, the system comprising:
  a mobile device that operates within a wireless network, the mobile device including an application client that interacts with an application server not residing on the mobile device,
  wherein the mobile device supports an application programming interface (API) for controlling application traffic between the application client and the application server, and
  wherein the API is used to optimize the application traffic including controlling, by the mobile device, traffic sent by the application server to the mobile device that includes using the API to optimize application traffic includes using the API for:
    providing a subscriber tiering and reporting service having a premium subscriber tier;
    providing delivery notification to a sending entity subscribing to the premium subscriber tier;
    sending a plurality of data packets together as a batch within a defined window of time, wherein the defined window of time is determined by a time criticality of the plurality of data packets;
    adjusting message priority for entities subscribing to the premium subscriber tier; and
    providing special traffic reporting to a reporting server based on a reporting policy received from a policy management server.

11. The system of claim 10 wherein using the API to optimize application traffic includes using the API for:
  controlling delivery of application traffic sent from the application client to the application server; and
  controlling delivery of application traffic sent between the application server and the application client.

12. The system of claim 11 wherein controlling delivery of application traffic sent between the application server and the application client includes at least one of:
  allowing or denying delivery of traffic to the application client based on a state of the mobile device;
  allowing or denying delivery of traffic to the application client based on a state of a network connection between the mobile device and the wireless network; and
  modifying a delivery time of one or more packets of data being sent between the application server and the application client.

13. The system of claim 12 wherein modifying the delivery time of one or more packets of data being sent between the application server and the application client includes at least one of:
  aligning transmission of the data packets with an event or state of the application client;
  sending packets to the application client when the application client is in the foreground and not sending packets to the application client when the application client is in the background;
  sending packets to the application client when the application client is active and not sending packets to the application client when the application client is inactive; and
  sending packets to the application client when a screen of the mobile device is on and not sending packets to the application client when the screen of the mobile device is not on.

14. The system of claim 10 wherein the application client uses the API to optimize application traffic.

15. The system of claim 10 wherein the application server uses the API to optimize application traffic.

16. The system of claim 10 wherein using the API to optimize application traffic includes using the API to redirect traffic through a client-side proxy located on the mobile device.

17. The system of claim 16 wherein the client-side proxy uses the API to optimize application traffic.

18. A computer program product for signaling optimization in a wireless network utilizing proprietary and non-proprietary protocols, the computer program product comprising:
 a non-transitory computer readable storage medium having computer readable code embodied therewith, the computer readable code comprising: computer readable program code configured for:
 defining an application programming interface (API) for controlling application traffic between an application client residing on a mobile device that operates within a wireless network and an application server not residing on the mobile device; and
 using the API to optimize application traffic in the wireless network including controlling, by the mobile device, traffic sent by the application server to the mobile device, wherein using the API to optimize application traffic includes using the API for:
  providing a subscriber tiering and reporting service having a premium subscriber tier;
  providing delivery notification to a sending entity subscribing to the premium subscriber tier;
  sending a plurality of data packets together as a batch within a defined window of time, wherein the defined window of time is determined by a time criticality of the plurality of data packets;
  adjusting message priority for entities subscribing to the premium subscriber tier; and
  providing special traffic reporting to a reporting server based on a reporting policy received from a policy management server.

19. The computer program product of claim 18 wherein using the API to optimize application traffic includes:
 controlling delivery of application traffic sent from the application client to the application server; and
 controlling delivery of application traffic sent between the application server and the application client.

20. The computer program product of claim 19 wherein controlling delivery of application traffic sent between the application server and the application client includes at least one of:
 allowing or denying delivery of traffic to the application client based on a state of the mobile device;
 allowing or denying delivery of traffic to the application client based on a state of a network connection between the mobile device and the wireless network; and
 modifying a delivery time of one or more packets of data being sent between the application server and the application client.

21. The computer program product of claim 20 wherein modifying the delivery time of one or more packets of data being sent between the application server and the application client includes at least one of:
 aligning transmission of the data packets with an event or state of the application client;
 sending packets to the application client when the application client is in the foreground and not sending packets to the application client when the application client is in the background;
 sending packets to the application client when the application client is active and not sending packets to the application client when the application client is in active; and
 sending packets to the application client when a screen of the mobile device is on and not sending packets to the application client when the screen of the mobile device is not on.

22. The computer program product of claim 18 wherein the application client uses the API to optimize application traffic.

23. The computer program product of claim 18 wherein the application server uses the API to optimize application traffic.

24. The computer program product of claim 18 wherein using the API to optimize application traffic includes using the API to redirect traffic through a client-side proxy located on the mobile device.

25. The computer program product of claim 24 wherein the client-side proxy uses the API to optimize application traffic.

26. The computer program product of claim 18 wherein defining the API includes defining non-standard extensions to an industry standard API, wherein the non-standard extensions are configured to allow a premium push service.

* * * * *